United States Patent
Roberts et al.

(10) Patent No.: US 7,329,351 B2
(45) Date of Patent: Feb. 12, 2008

(54) PROCESS AND APPARATUS FOR INCREASING BIOLOGICAL ACTIVITY IN WASTE TREATMENT IN BODIES OF WATER

(75) Inventors: Ricky Eugene Roberts, McCook, NE (US); James Rhrodrick Key, Lexington, NE (US); Griscom Bettle, III, Sarasota, FL (US)

(73) Assignee: Absolute Aeration, Lexington, NE (US)

( * ) Notice: Subject to any disclaimer, the term of this patent is extended or adjusted under 35 U.S.C. 154(b) by 30 days.

(21) Appl. No.: 11/446,023

(22) Filed: Jun. 1, 2006

(65) Prior Publication Data

US 2007/0039878 A1 Feb. 22, 2007

Related U.S. Application Data

(60) Provisional application No. 60/686,735, filed on Jun. 1, 2005.

(51) Int. Cl.
*C02F 3/00* (2006.01)

(52) U.S. Cl. ............... 210/620; 210/629; 210/150; 210/242.2; 210/220; 261/84; 261/DIG. 71

(58) Field of Classification Search ........... 210/220, 210/620, 629, 150, 242.2; 261/84, DIG. 71
See application file for complete search history.

(56) References Cited

U.S. PATENT DOCUMENTS

| 3,814,395 | A | * | 6/1974 | Kaelin ................... 261/87 |
| 3,979,294 | A | * | 9/1976 | Kaelin ................. 210/195.3 |
| 4,192,740 | A | * | 3/1980 | Savard et al. ............ 210/614 |
| 4,844,843 | A | * | 7/1989 | Rajendren ................ 261/30 |
| 5,021,154 | A | * | 6/1991 | Haegeman ............ 210/221.2 |
| 5,802,996 | A |   | 9/1998 | Baxter |
| 6,676,836 | B2 |   | 1/2004 | Mandt |
| 6,821,426 | B1 |   | 11/2004 | Hausin et al. |
| 7,178,677 | B1 | * | 2/2007 | McKinney ............... 210/513 |
| 2003/0127754 | A1 |   | 7/2003 | Ruzicka et al. |
| 2005/0061721 | A1 | * | 3/2005 | Tormaschy et al. ....... 210/121 |

\* cited by examiner

*Primary Examiner*—Chester T. Barry
(74) *Attorney, Agent, or Firm*—Scully, Scott, Murphy & Presser, P.C.

(57) ABSTRACT

A process and apparatus for increasing biological activity in waste treatment ponds and lagoons. In this process a floating fluid circulator having an annular space between nested frusto-conical surfaces is operated in a pond or lagoon. An aerator within the scope of the floating fluid circulator is provided. That aerator includes an upper float chassis having a frusto-conical configuration, a sectional diverter arranged in a lower portion of the upper float chassis, the sectional aerator having a lower diverter portion and motor driven means mounted on the upper float chassis connected to a rotatable impeller.

37 Claims, 33 Drawing Sheets

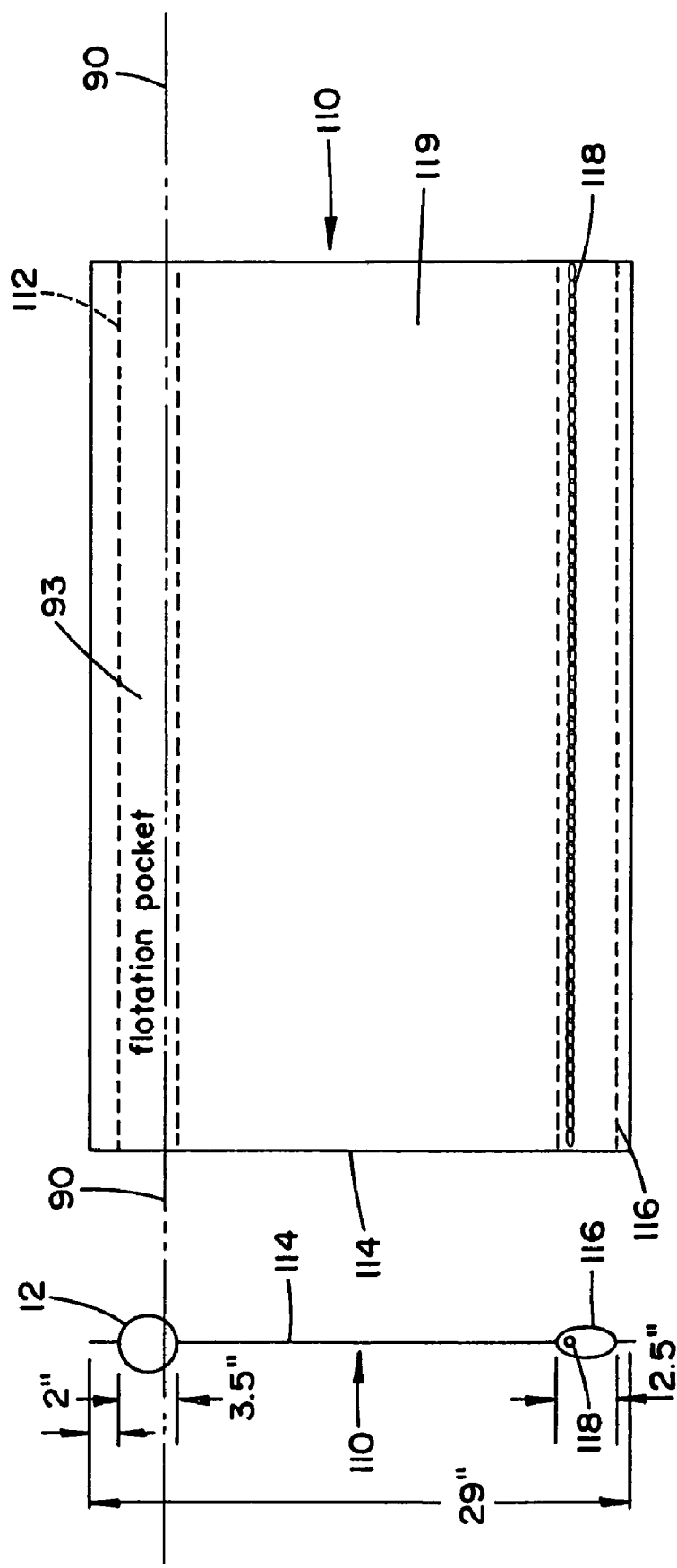

US 7,329,351 B2

PROCESS AND APPARATUS FOR INCREASING BIOLOGICAL ACTIVITY IN WASTE TREATMENT IN BODIES OF WATER

CROSS-REFERENCE TO RELATED APPLICATION

The present application claims benefit of U.S. provisional application Ser. No. 60/686,735, filed on Jun. 1, 2005.

BACKGROUND OF THE DISCLOSURE

1. Field of Invention

The present invention is directed to a process and apparatus for increasing biological activity in ponds and lagoons. More particularly, the present invention relates to a process and apparatus which generates discrete flows in ponds and lagoons resulting in greater biological activity and consequent increase in situ sludge digestion.

2. Background of the Prior Art

Waste treatment ponds and lagoons are commonly employed to pretreat agricultural and industrial waste in a relatively inexpensive manner. Their disadvantages are the large land mass they occupy and their slow speed. It is thus unsurprising that they are commonly sited in rural and other low cost locations. Although the location of the pond or lagoon solves the size problems associated with this waste treatment solution, the speed at which waste is eliminated by this expedient has not been satisfactorily addressed and is the subject of much current activity.

At present the detention time, for sludge and other waste deposited into ponds and lagoons, runs to about 3 weeks. Obviously this term limits the waste throughout and creates local environmental difficulty such as odor and human and farm animal health.

In view of these environmental problems many investigators have advanced processes and apparatus for accelerating biological waste degradation in waste treatment ponds and lagoons. A common expedient in these proposed solutions is the use of aerators for accelerating aerobic microorganism activity. A plurality of aerator designs, provided in U.S. Pat. Nos. 5,564,628; 4,734,235; 3,911,065; 3,797,809; 6,421,221; 6,227,525; 5,980,100; 5,737,562; 5,931,100; 5,510,022; 5,110,510; 4,859,327; 4,734,191; 4,540,528; 4,468,358; 4,350,648; 4,318,871; 4,242,199; 3,958,389; 3,833,173; 3,771,724; 3,739,986; and 3,835,926; and U.S. Patent Application Publication No. 2004/005590, emphasize the large number of such proposed solutions.

These devices, which include circulating aerators, are well known in the art. Of particular interest is an aerator with a floating open-topped dish provided with a solar-powered impeller and a draft tube for circulating sub-surface water along the water surface in substantially horizontal flow with an imbedded draft tube vortex breaker. This device is set forth in U.S. Pat. No. 6,439,853. A similar device, disclosed in U.S. Pat. No. 6,432,302, situates the impeller above the draft tube. In U.S. Patent Application Publication No. 2002/0001529 the upper lip of an open-topped dish is slightly below the water surface. The device taught in U.S. Patent Application Publication No. 2005/0155922 is equipped with horizontal intake with a single circulation zone disposed above the thermocline, the line of demarcation between higher and lower temperature in ponds and lagoons and/or a single circulation zone which eliminates the thermocline. Finally, U.S. Patent Application Publication No. 2003/0127754 teaches a device of the type taught in the '853 patent provided with means for introducing air bubbled in a draft tube, below the impeller, through a diffuser, to increase the oxygen content of the water.

These devices all distribute sub-surface water by freely flowing sub-surface water parallel to but below the water surface. An impeller is used to move sub-surface water to the surface. That is, the prior art emphasizes that wave formation is effectual in a rotating impeller rather than in the chassis to which the impeller is attached.

What these devices share in common is the aeration of the aerobic zone of a waste treatment pond or lagoon. As taught in "Pond Doctor Engineering Brief", however, a waste treatment pond or lagoon includes facultative and anaerobic zones, as well as an aerobic zone. That disclosure emphasizes that purification occurs faster in the aerobic and facultative zones because bacteria and plants degrade more pollutants in the presence of nutrients, oxygen, heat and light, which are all present in the aerobic and facultative zones.

As such, the absence of agitation of the anaerobic zone explains the limited success of prior art processes and devices for accelerating waste treatment in ponds and lagoons. Thus, there is a strong need in the art for a process and apparatus for mixing oxic and anoxic zones in waste treatment ponds or lagoons which would cause " . . . useful life forms to flourish in the regions of the pond where their particular diets can be readily satisfied", as set forth in the Pond Doctor technical article.

BRIEF DESCRIPTION OF THE INVENTION

A new process and apparatus has now been developed which provides increased biological activity in waste treatment bodies of water, e.g., pond, lagoons, lakes reservoirs, basen, or any enclosed body of water in which waste treatment is dumped. The process and apparatus of the present invention involves fluid circulation which generates non-linear radial flow in an annular space when an impeller attached to the circulator rotates in a unilateral direction, e.g., clockwise. The wave action of the generated flow is magnified by the accompanying curtailing movement of the circulator resulting in a dramatic increase in the amount of oxygen injected into the waste treatment body of water, e.g., pond or lagoon.

A further inventive feature of the present invention is mixing very small air bubbles with waste treatment water in the body of water to produce a low density fluid which increases sludge settling rate. This increases the rate of oxidation of wastewater nutrients and results in sludge clarification. As the clarified sludge falls from the water surface it is trapped between the low density layer wherein air is entrapped in water and the higher density water free of oxygen. In this facultative zone the sludge is digested both aerobically and anaerobically.

In accordance with the present invention a floating fluid circulator is provided. That fluid circulator includes an upper portion of a float chassis in the form of the frustum of a cone, i.e. a frusto-conical shape, and a diverter having a form of an inverted frusto-conical shape forming an interior annular space there-between, said circulator being in mechanical communication with a submerged non-rotating wave producing means.

In further accordance with the present invention a process of increasing biological activity in a waste treatment body of water, e.g., pond or lagoon is provided. In this process an impeller, connected to a floating fluid circulator, said circulator comprising a pair of nested frusto-conical surfaces which form an interior annular space there-between, is rotated such that fluid below the fluid surface moves in a direction toward the fluid surface whereby said circulator moves upward until said impeller loses its prime whereupon said annular space is filled with a mixture of air and water and said mixture is emitted therefrom and a wave is generated by the downward movement of said circulator into said waste treatment fluid.

BRIEF DESCRIPTION OF THE DRAWINGS

The present invention will be better understood by reference to the accompanying drawings of which:

FIGS. 16 and 17 are end and side views, respectively, of a floating curtain or boom in place in a body of water;

DETAILED DESCRIPTION

Figure 1:
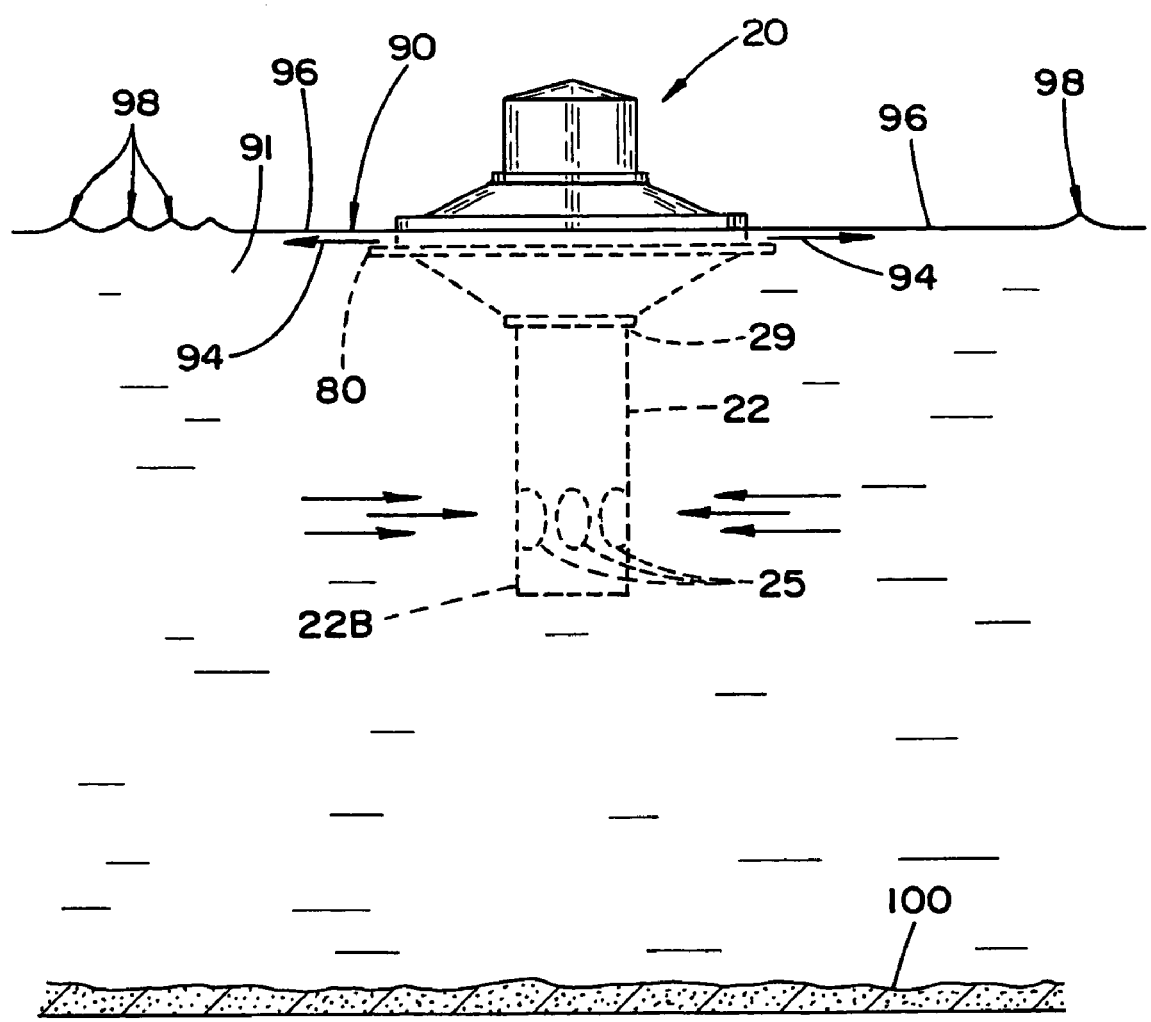
FIG. 1 is a side view of an aerator of the invention floating in liquid with the optional intake tube extended.

Turning now to the drawings, FIG. 1 shows a floating fluid circulator 20, alternatively described as aerator 20, floating in a body of liquid 91 (hereinafter, "water" as an exemplary liquid) and operating. Optional intake tube 22 is attached to the lower portion of aerator 20 via fitting 29 and partially extended or sized to position its bottom end 22B and horizontal intake ports 25 approximately midway between the water surface 90 and the bottom 100. (Such a bottom may be earthen, clay, concrete or of other material typical of waste treatment bodies of water, e.g., ponds and the like, and may be lined with clay, rubber or polymeric materials.) Since the aerator/mixer embodiments disclosed herein are suitable for use in almost any body of liquid, there is no intent to limit their employment to particular bodies such as ponds, reservoirs, lakes, lagoons or the like, but some of these terms may be used in the following description for illustrative, nonlimiting purposes. Suitable solid tubing can be corrugated on the outside and smooth inside, fabricated of polyethylene or other suitable polymeric materials, and can be easily cut to the desired length. Such tubing is widely available commercially, in diameters ranging from about 24 inches upward, from ADS of Hilliard, Ohio.

Liquid is pumped from the horizontal intake ports 25 through intake tube 22 by an impeller 38 inside the unit and shrouded by fitting 29 (not shown here), through the aerator 20 and outward over outflow lip 80 as shown by arrows 94 to produce an outward radial and substantially laminar flow of liquid 96 from all sides of aerator 20 along surface 90 of the water. A portion of the water flow flows over the laminar shelf, thus producing a "wave effect" of expanding circular waves 98 which may range from minimal height to as much as six inches in height. Although shown as large wavelets rising above water surface 90 for clarity, theses waves would have the normal sinusoidal form, with peaks and troughs.

Figure 2:
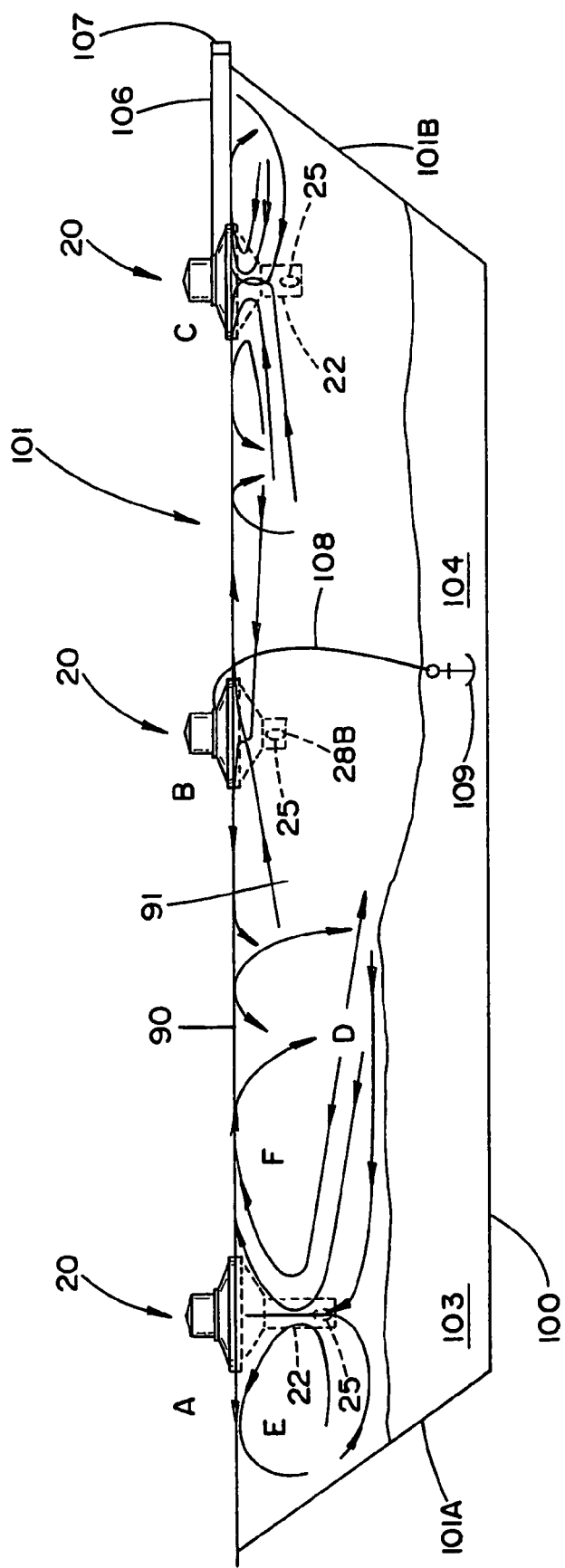
FIG. 2 is a side view of the aerator of FIG. 1 illustrating different positions in a pond, different lengths for the intake tube and underwater currents set up during operation.

FIG. 2 shows aerator 20 operating in a pond 101 having a water surface 90 and bottom 100. The pond shown is a "facultative" pond designed to reduce odors and reduce biological oxygen demand ("BOD"), TSS (Total Suspended Solids) nitrogen, phosphorus and sludge 103 on bottom 100. A facultative pond or lagoon is considered a body of water with characteristics that are typical of both aerobic and anaerobic bodies. There may be enough dissolved oxygen in the first two feet of relatively clear water to support aerobic decomposition, but in the dark area near the bottom where no dissolved oxygen is available the decomposition processes are necessarily anaerobic. Facultative biological organisms can function in either aerobic or anaerobic zones of such a body, but they are usually found in a somewhat stratified area between the two zones. So long as aerobic conditions prevail in the upper strata of the body, it should not have objectionable odors.

Aerator 20 in position A, near left bank 101A, has an intake tube 22 positioned to place horizontal intake ports 25 near the upper surface of a sludge accumulation 103 so as to minimize the sludge layer. Curved arrows E and F indicate the underwater water flow generated by the aerator's operation. Curve D indicates the upper surface of an "anoxic" zone 104 in which the water is low or lacking in dissolved oxygen. Curve E is a circulating flow set up by water entering horizontal intakes 25 and exiting aerator 20 on the surface. Arrow F indicates laminar flow along the surface 90. The laminar flow initially has a thickness approximately the depth of lip 80 below surface 90, thinning as it proceeds outward and is joined by induced underwater flow. Aerator 20 in position B has the intake tube removed so as to take in water through diverter intake 28B near the central surface of the pond, while aerator 20 in position C has an intake tube 22 just long enough so as to take in water through intake ports 25 near right bank 101B of pond 101 and slightly below its surface 90. This illustrates how the aerator can be positioned, adjusted and operated to best effect in a given pond or other body of water. Depending upon the depth of the body of water, intake tubes can be sized or extended to reach from about 2 to about 30 feet below the surface. Aerator 20 can be connected to the pond bank as in position C by suitable mooring line (s) 106 and mooring post (s) 107, or can be anchored (position B) by suitable anchor lines (s) 108 and anchor 109. Various types of anchors can be used according to the bottom type.

Figure 2A:
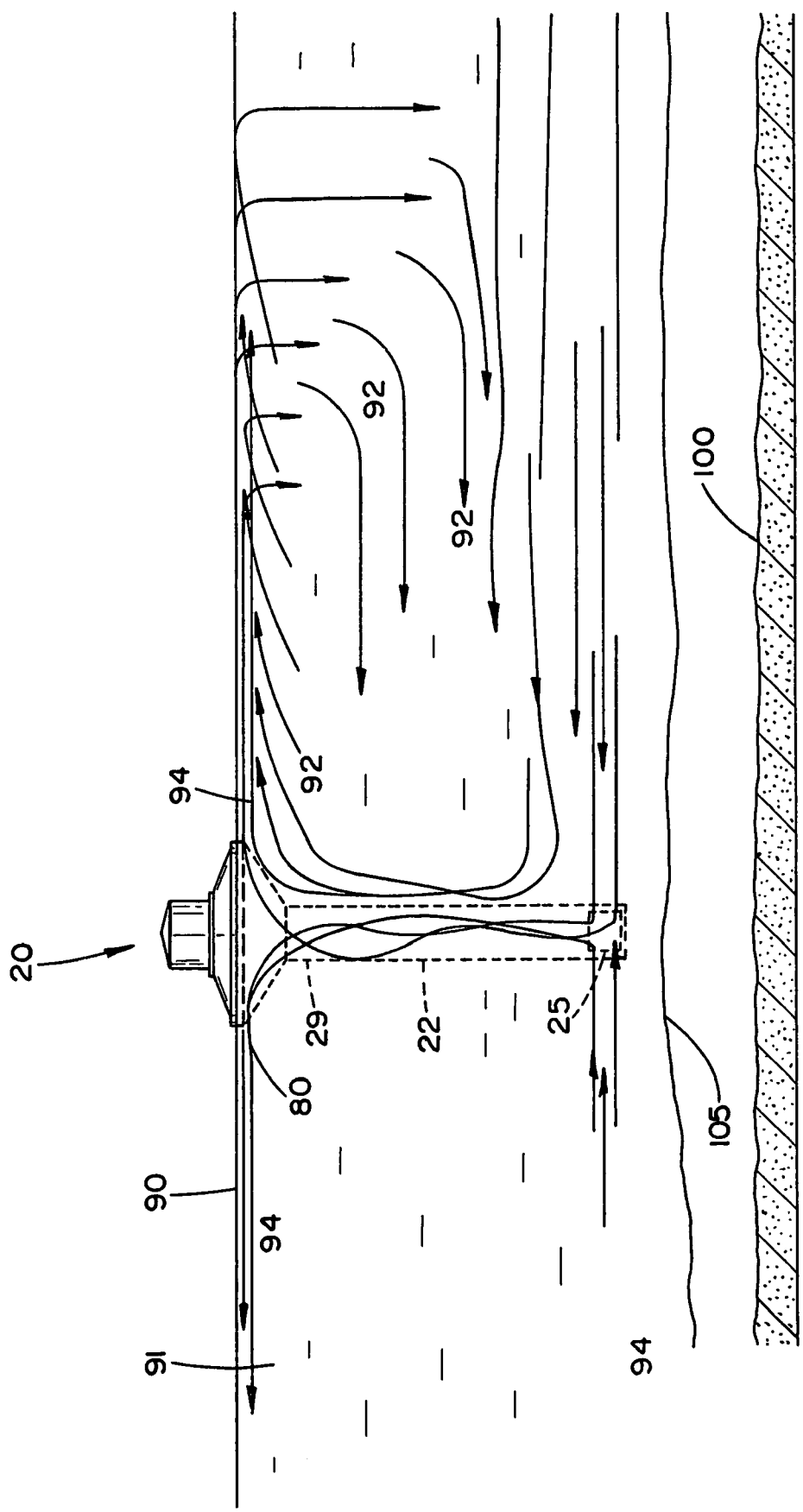
FIG. 2A is a side view of the aerator of FIG. 1 with the intake tube extended to near the pond bottom.

In FIG. 2A, aerator 20 has intake tube 22 extended into water 91 to a depth placing horizontal intake ports 25 just above thermocline 105 (a boundary between different temperature zones). Within a pond or other body of water, there can be as much as 20 deg. F. difference across a thermocline, which tends to interfere with upward and downward flow of water. The operation of the aerator sets up both direct flow currents through the aerator, indicated by arrows 94, and indirect flow currents, indicated by arrows 92. In bodies of fresh water such as drinking water storage, water can be drawn from beneath such thermoclines for mixing or aeration over a wide area with a single aerator, accomplishing the objective with fewer units and/or less operating time. Such use of aerators can help to prevent the typical "turnover" or inversion of thermal layers with seasonal changes.

Figure 3:
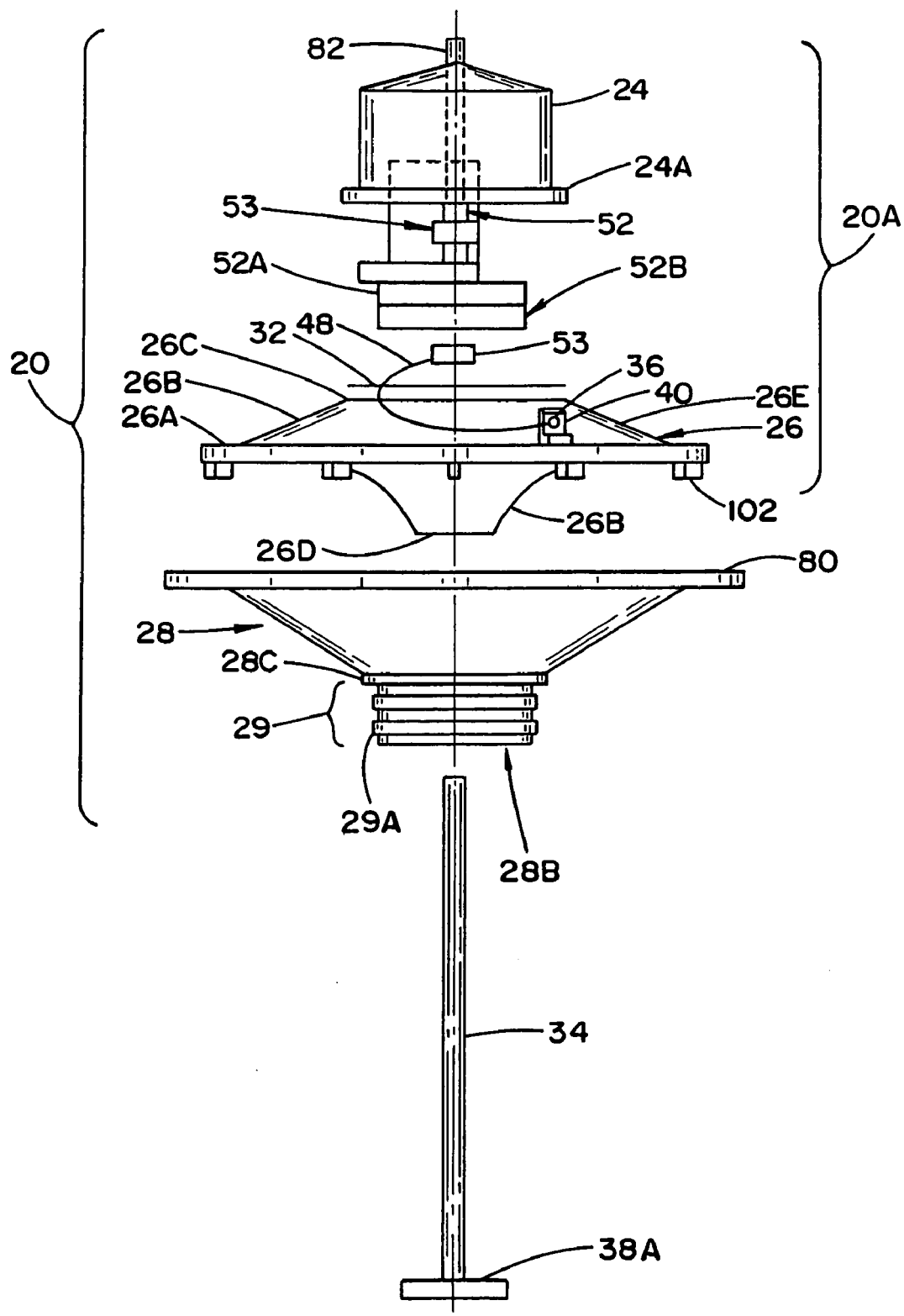
FIG. 3 is a side exploded view of the aerator unit.

FIG. 3, an exploded view of aerator 20, illustrates most of the unit's components and their interaction. Diverter 28, the lower portion of the unit, includes an inverted frusto-conical shell of substantially circular cross section and substantially straight sides. It has a protruding edge around its upper periphery, outflow 80, which serves to guide water discharged from aerator 20 into laminar flow along the water surface 90. The lower, narrowest portion of the diverter has a collar 28C, below which is located a substantially cylindrical standard connection fitting 29, including concentric ridges 29A. Diverter intake 28B is located inside connection fitting 29. These components are discussed in detail below. Drive shaft 34 extends through diverter intake 28B and mounts at its lower end an impeller hub mount 38A to which is removably attached the impeller 38 including impeller 38A and a plurality of blades (not shown here). Drive shaft 24 is made of stainless steel or a similar strong, corrosion-resistant alloy, and is about 1½ inches in diameter in a present embodiment.

Mounted above the diverter 28 is the aerator upper assembly 20A, with a float chassis 26, first including an upper frusto-conical shell 26E connected to a flat circumferential rim 26A mounting plate 32 is mechanically attached to top surface 26C of float chassis 26 for use in mounting internal components discussed below. The lower attached portion of float chassis 26 is sectional diverter 26B, resembling an inverted frustum of a cone but having substantially parabolically curved sides inside and out. The upper edge of sectional diverter connects to the bottom of float chassis rim 26A. A plurality of supports 102 are integrally attached to the bottom of rim 26A to separate it from the outflow lip 80 when the float chassis 26 and diverter 28 are joined with mechanical connectors, as described below.

When assembled, the aerator 20 includes a motor cover 24 with covering 24A to protect the electric motor and other components, this cover being removably attached mechanically to the top of float-chassis 26. A lifting rod 82 is attached to the unit (as described below) to facilitate moving the assembled unit. Lubrication for the rotating parts is provided by a Petromatic™ grease cup 40 held by grease cup holder 36 fastened atop the outer rim 26A of float chassis 26, with a grease line 48 directing grease to bearing 53. An electric motor 52 is mounted on motor mounts 52B and connects to gear reducer 52A to drive impeller 38 at a suitable speed via drive shaft 34.

Figure 4:
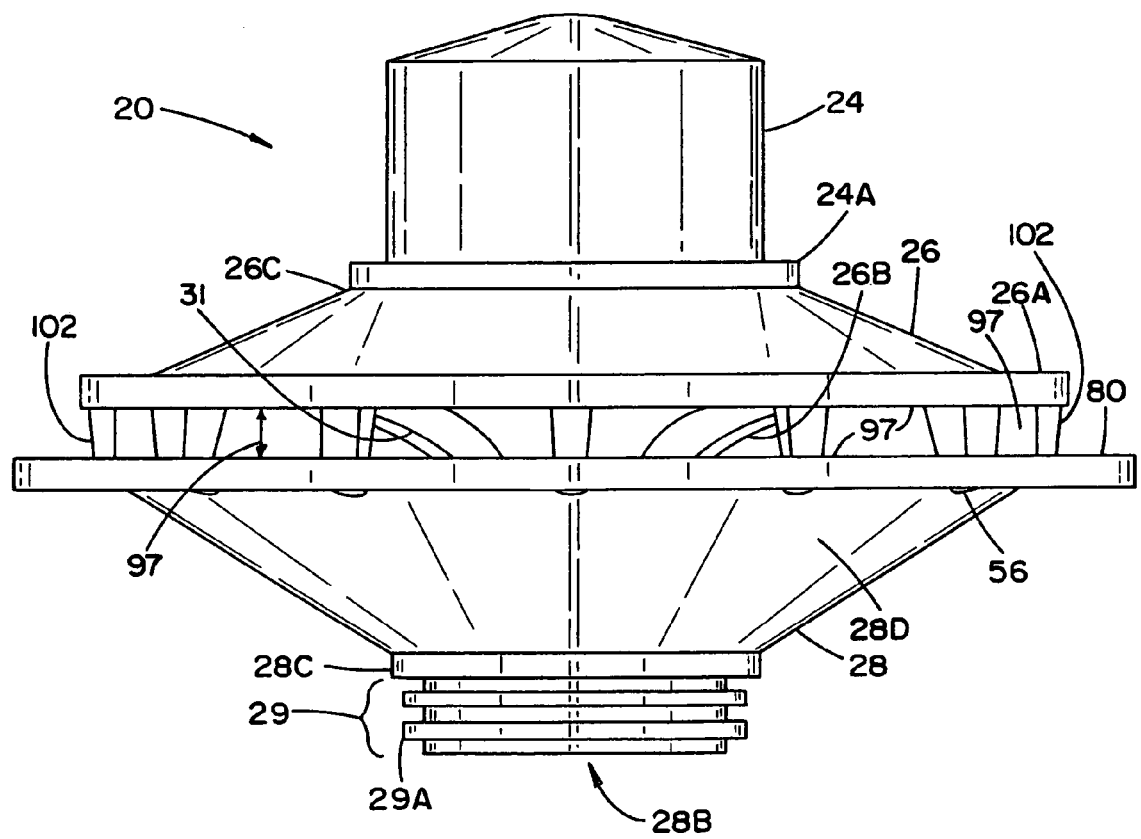
FIG. 4 is a detailed side view of the aerator unit.

FIG. 4 is a detailed view of the assembled unit, including motor cover 24, float chassis 26 and diverter 28. Cover 24, comprising covering 24A, is removably mechanically connected to the upper surface 26C of float chassis 26. Supports 102 are preferably molded as integral parts of the underside of rim 26A of float chassis 26, but can optionally be fabricated separately and attached by any suitable mechanical means. Float chassis 26 and diverter 28 are mechanically connected by bolts 56 or other suitable mechanical connectors passing through bolt holes 56A (shown in FIG. 4) from the underside of outflow lip 80 into the undersides of supports 102. Supports 102 are of a height appropriate to optimize the flow of water discharged through the outflow spaces 97 between the underside of rim 26A of float chassis 26 and outflow lip 80 of diverter 28, and are streamlined, as shown and discussed below. In one embodiment, space 81 is about four inches and outflow lip 80 is about six inches wide.

From the diverter intake 28B, within which impeller 38 operates (as shown below), water taken up by the aerator enters a progressively narrowing annular passage defined by the conical interior of diverter 28 and the parabolically curved exterior of the sectional diverter 26B, then emerges through outflow spaces 97 onto outflow lip 80 to flow in omnidirectional laminar flow fashion onto the surface 90 (not shown here) of the water in which the unit floats. The buoyancy of the aerator is designed so that it floats at a level such that water surface 90 is above outflow lip 80, with water covering at least a portion of outflow spaces 97, and water surface 90 lying at about the level of the underside of chassis lip 26A or lower. This produces a laminar flow of water initially having a thickness of about that of outflow spaces 97.

The width of outflow lip 80 can be varied in different models to optimize the production of laminar flow for various volumes and rates of discharge. For example, a four inch outflow space and six inch outflow lip are effective in producing laminar flow for a discharge of about 7 million gallons/day (MGD) using about 2 horsepower. When the unit is operating in aeration mode, the multiple plane surfaces of diverter 28 (28D) and the sectional diverter 26B (31), both producing polygonal cross sections, are helpful in producing bubbles in the water which contribute to better mixing and aeration.

If desired for ease of fabrication or effects on the flow of water through the unit, either or both of the diverter 28 and sectional diverter 26B can have polygonal cross sections (e.g., octagonal or similar polygons having equal sides numbering 10, 12 or more. FIG. 4 illustrates such edges 31 of a sectional diverter 26B (visible between the float chassis 26 and diverter outflow lip 80), and similar diverter faces 28D, being essentially trapezoidal flat sections. As an alternative to such polygonal-based shapes, components including motor cover 24, float chassis 26 and diverter 28 can be shells forming solids of revolution. Such components could be easily produced by "spinning" of aluminum or aluminum alloys or by the molding of polymer composites by various suitable methods. Presently it is preferred to produce such components as the float chassis and diverter by rotational molding of suitable thermoplastic polyolefins such as polyethylene and polypropylene. A preferred material is linear low density polyethylene (LLDPE), which is known for its long life, durability and resistance to UV light. Due to the corrosive effects of water and impurities therein, suitable grades of stainless steel or other corrosion-resistant metals are presently preferred for fabrication of some components. Such components can be fabricated by any suitable means, including sheet metal bending, welding, riveting and the like.

Connection fitting 29 below diverter collar 28C at the bottom of diverter 28 includes concentric ridges 29A and diverter inner surface 28A inside (not shown in FIG. 4). Water can be taken up directly through diverter intake 28B or through an intake tube 22 with horizontal intake ports 25 at the bottom 22B, as shown in FIGS. 1,2 and 2A. Fitting 29 is designed to mate with a fitting for corrugates intake tube 22. As mentioned above, intake tube 22 can be commercial plastic drain pipe cut to length, with horizontal intake ports 25 cut into the lower end. Collapsible tubing having a similar outer appearance but comprising a springy helical coli frame (or suitable spring metal or plastic) covered with strong sheet plastic or waterproof or water resistant material can be used to provide intake tubes which are retractable and extensible. Such tubing is available commercially in suitable sizes from various sources, including ABC Industries, Inc. of Warsaw, Ind.

Any suitable mechanical means can be used to retract and extend such tubing within its normal physical limits, such as a plurality of cords, cables or the like attached to the tube bottom, thence passing through suitable guides at the top and taken up by suitable reel means, which can be either manually or electrically driven, either individually or simultaneously.

Figure 5:
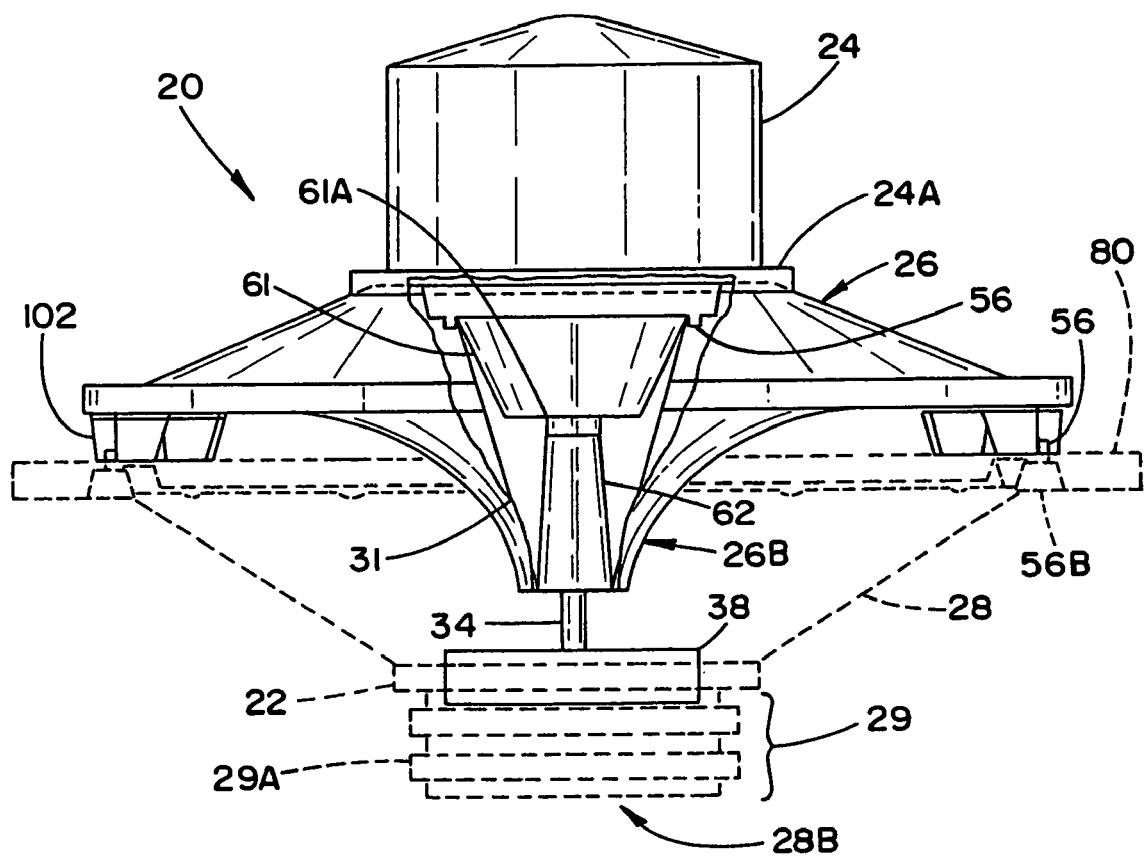
FIG. 5 is a partial cutaway view of the aerator unit.

FIG. 5 illustrates additional details of aerator 20, with motor cover 24 attached to the upper portion of float chassis 26 via covering 24A and suitable mechanical connectors. Individual faces 31 of sectional diverter 26B can be seen, and drive shaft 34 extends only into the interface between upper connector 29 and the lower portion of diverter 28. Impeller 38 (shown schematically) thus operates in a position which is shrouded by these components, effectively directing the flow of water into the annular path defined by the conical interior of diverter 28 and the curved exterior of sectional diverter 26, whether an intake tube 22 is attached or absent. Optionally, recesses 56B can be provided in the underside of outflow lip 80 of diverter 28 to facilitate the placement of bolts 56 or other mechanical connectors to connect outflow lip 80 to supports 102. Portions of float chassis 26 and sectional diverter 26B are cut away to show inner components: mounting plate attachment 60, at the top of which mounting plate 32 is attached by bolts 56, inverted frusto-conical section (abatement cup) 61 with partial bottom surface 61A and drive shaft column 62, which increases in diameter from top to bottom. Both spaces 61 and 62 are shaped as illustrated to facilitate removal of float chassis 26 from its mold.

Figure 6:
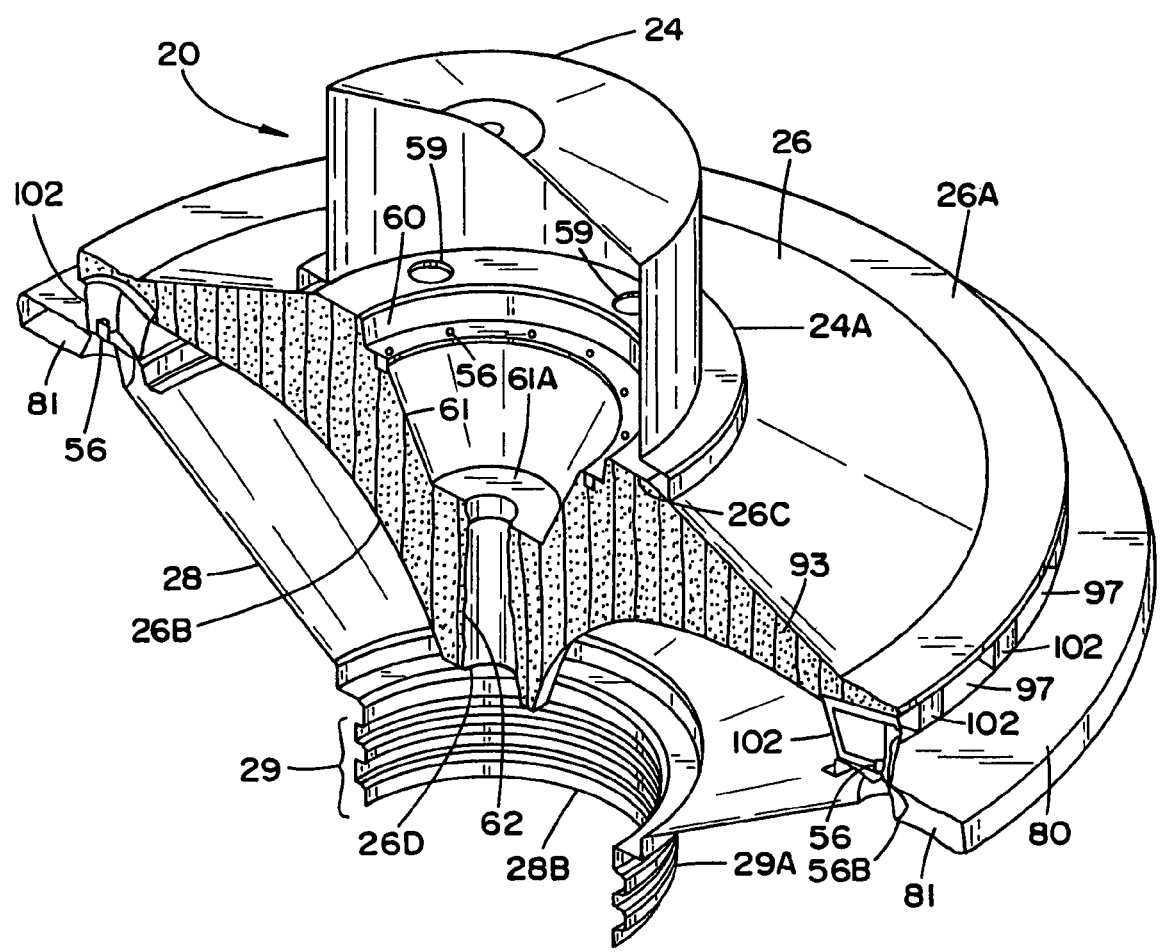
FIG. 6 is a perspective sectional view of the aerator unit.

FIG. 6 is a sectional perspective view of the assembled diverter 28, float chassis 26 and motor cover 24. Cover 24 is removably attached via covering 24A to the upper portion 26C of float chassis 26, and float chassis rim 26A is mechanically attached to the upper rim of diverter 28 via supports 102 and bolts or other suitable mechanical fasteners 56. Inside cover 24, plastic spin holes 59 are placed in the upper portion of flotation chassis 26 for the introduction of polymer beads after the molding of chassis 26 for generating a closed-cell foam. As seen in FIG. 5 as well, mounting plate attachment 60 provides a connection point where abatement cup 61 is attached by bolts 56 or other suitable mechanical fasteners. Both attachment 60 and cup 61 have the shape of inverted frustums of cones. Attached to flat bottom 61A of abatement cup 61 is a shaft column 62 extending to the bottom 26D of sectional diverter 26B of floatation chassis 26.

The portion of the assembled unit bounded by the lower surface of the upper conical shell 26E of flotation chassis 26 and upper (inner) surface of sectional diverter 26B is preferably filled with a suitable closed-cell flotation foam such as Styrofoam to provide buoyancy even in the event of leakage of water into this space. The foam can be generated by introducing a suitable quantity of beads of a suitable polymer such as polystyrene or certain polyolefins such as polyethylene or polypropylene, then introducing steam to melt the polymer and convert it into a closed-cell foam which expands to fill the complete cavity. Once sufficient foam is generated, the plastic spin holes 59 are sealed. The inside 29B of fitting 29, forming the annular ribs 29A, and diverter intake 28B can be seen in this view. Outflow lip 80 of diverter 28 can be hollow, as indicated by open spaces 81.

Figure 7:
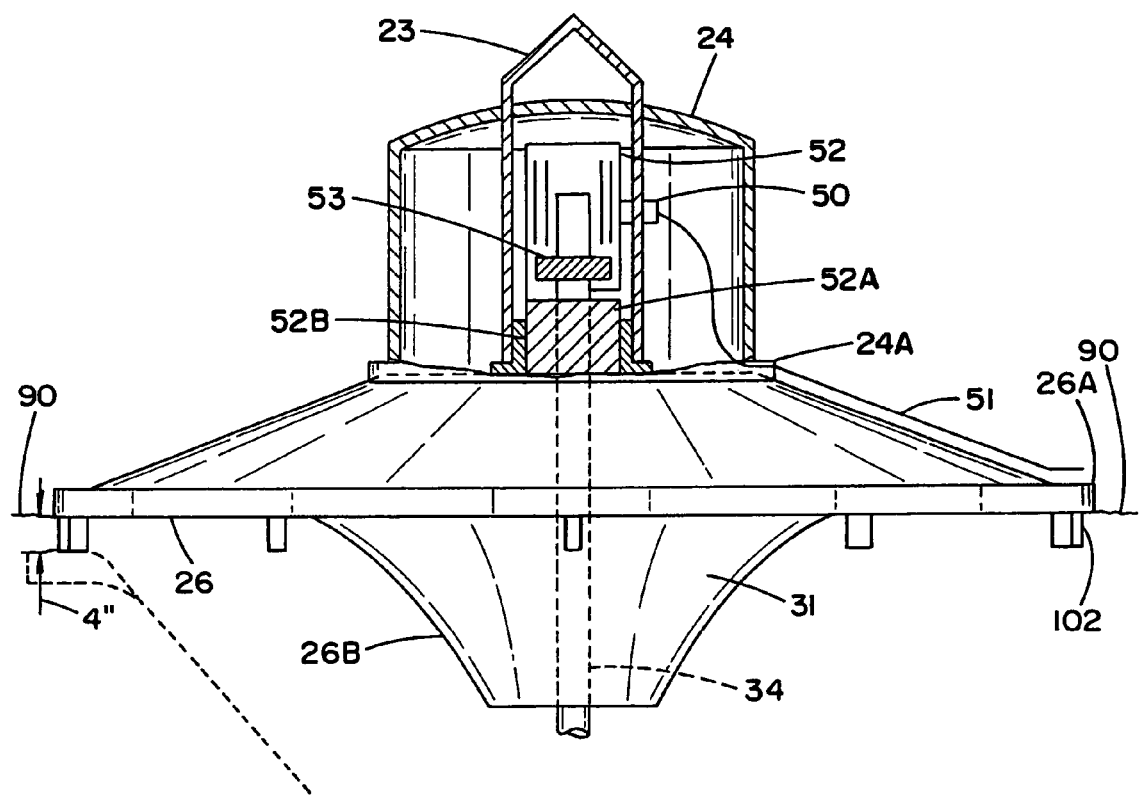
FIG. 7 is a side sectional view of the upper section of the aerator, including motor cover, motor and related components.

FIG. 7, a partial sectional view of flotation chassis 26 and cover 24, illustrates lifting fixture 23, which is mechanically attached to motor mounts 52B and used for lifting the unit, either partially or fully assembled. In an embodiment, lifting fixture 23 is made of ½ inch stainless steel rod. A suitable electric motor 52 provides power through bearing 53 and gear reducer 52A. Motors having sealed bearings can be used to eliminate the need for external lubrication systems such as shown in FIG. 3. AC power at 230 or 460 volts is provided via connection/switch box 50 and power cable 51, which is in turn connected to shore power. Normal grounding, overload and fusing protection should be provided for the power supply, with insulated ring tongue connections used for making connections to the terminal block. The connection/switch box should include switching means for manually and/or automatically reversing the motor and drive shaft. Such switching means can also be provided at the point where shore power is connected.

A plurality of supports 102 are integral parts of float chassis 26, protruding just below float chassis rim 26A. Sectional diverter 26B protrudes below the lower surface of the upper portion of float chassis 26, and in this case has a plurality of faces 31 which are substantially flat in a lateral direction but curve from top to bottom, giving the sectional diverter a polygonal cross section. Drive shaft 34 passes from gear reducer 52A through sectional diverter 26B to the top of fitting 29 (not shown in FIG. 7), where the impeller 38 is mounted.

Figure 8:
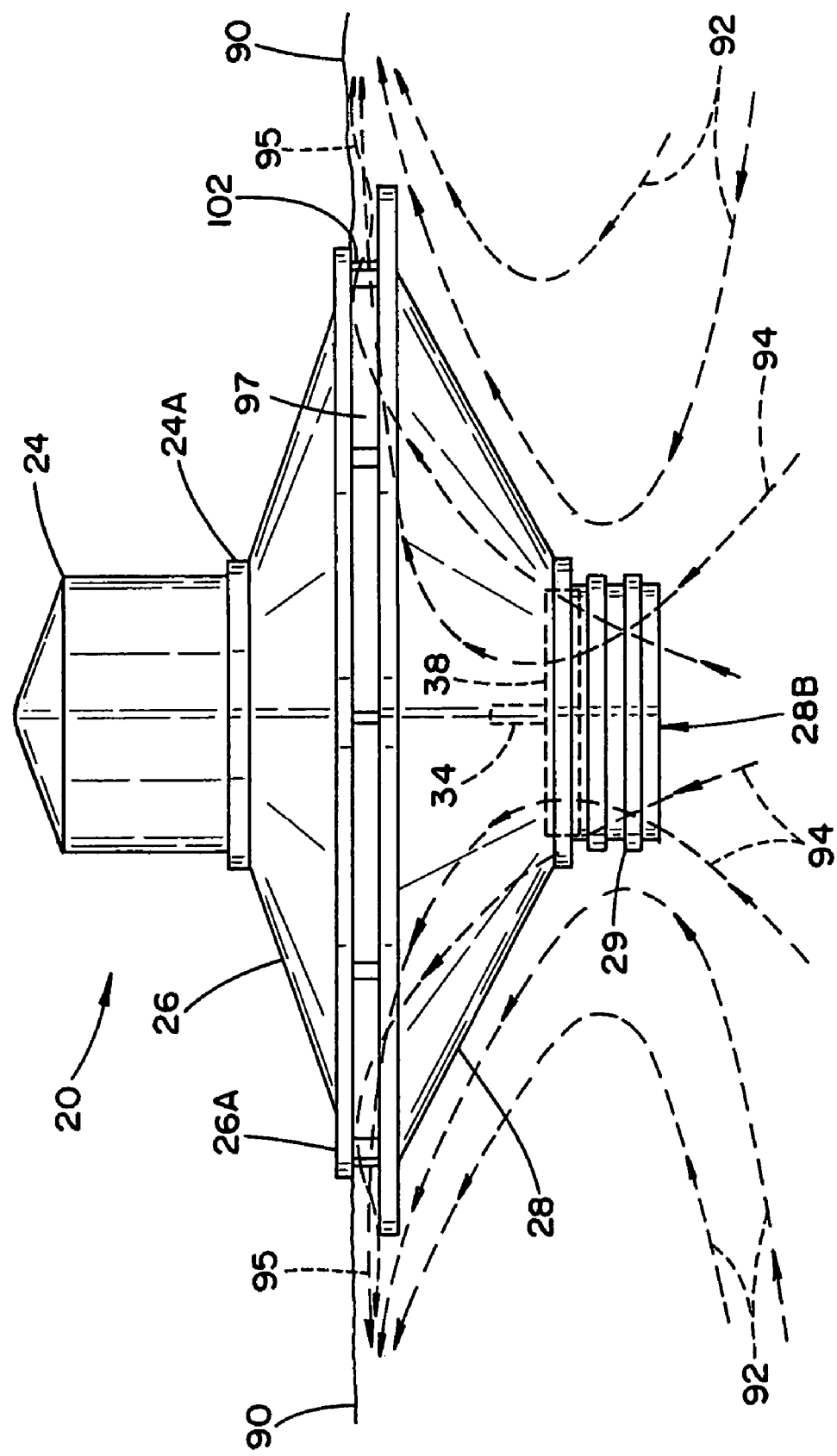
FIG. 8 is a side view of the aerator unit floating and operating in liquid, illustrating laminar flow of outflow liquid.

FIG. 8 shows the assembled aerator 20 operating in water, with water surface 90 just below the float chassis rim 26A. Motor cover 24 is attached via covering 24A to the upper surface of conical shell 26E of float chassis 26, which supports 102 (mounted just below float chassis rim 26A) connecting float chassis 26 to diverter 28. Impeller 38 is shown schematically near the top of fitting 29, where it is rotated by drive shaft 34. In this configuration, without an intake tube attached, water is taken up into diverter intake 28B from nearby in a substantially vertical direct flow, as indicated by arrows 94. This water passes through the annular region defined by the lower portion of sectional diverter 26B and the inner surface of diverter 28, exiting through the outflow spaces 97 between the bottom surface of float chassis 26 and the upper flat surface of diverter 28 (except as obstructed by supports 102), thence flowing over outflow lip 80 to produce a laminar flow radiating outward from the circumference of the unit, as indicated by arrows 95. Indirect flow patterns are indicated by arrows 92.

Figure 9:
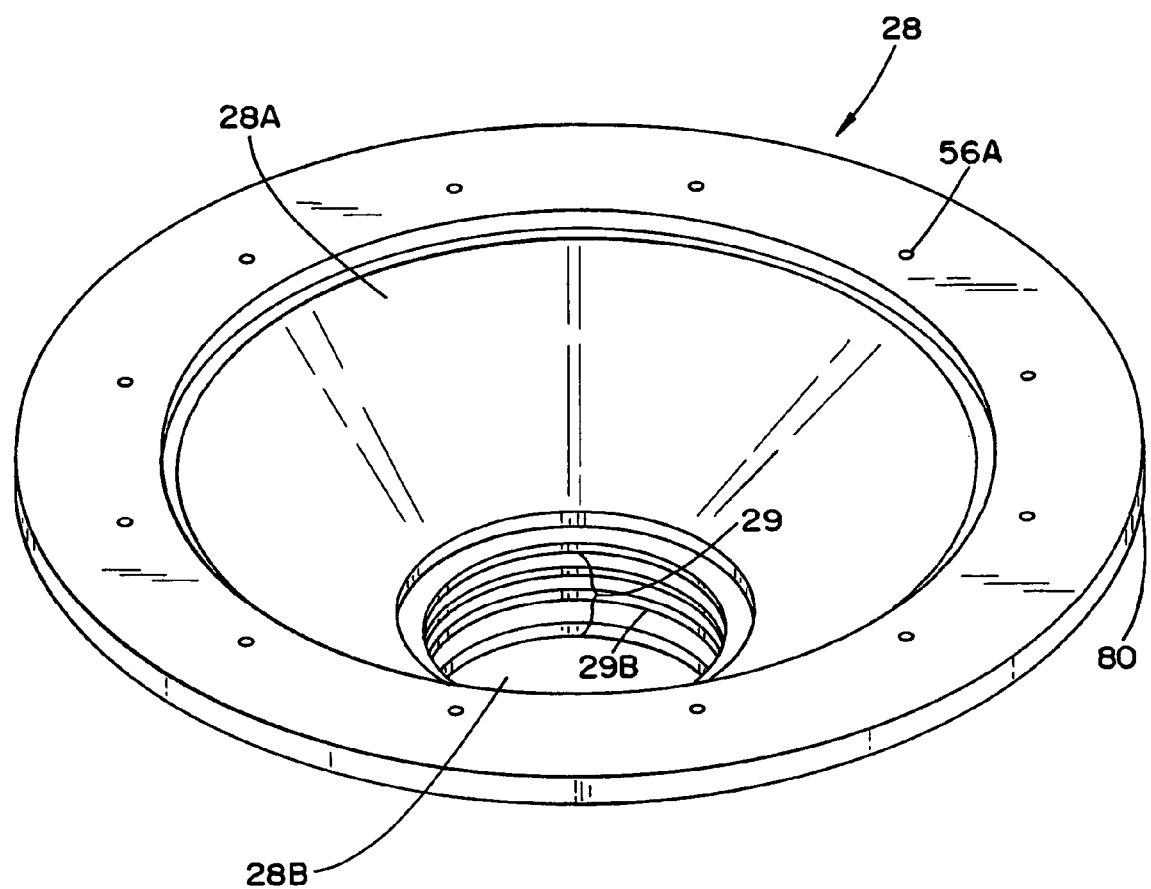
FIG. 9 is a perspective top view of the diverter of the aerator.
Figure 10:
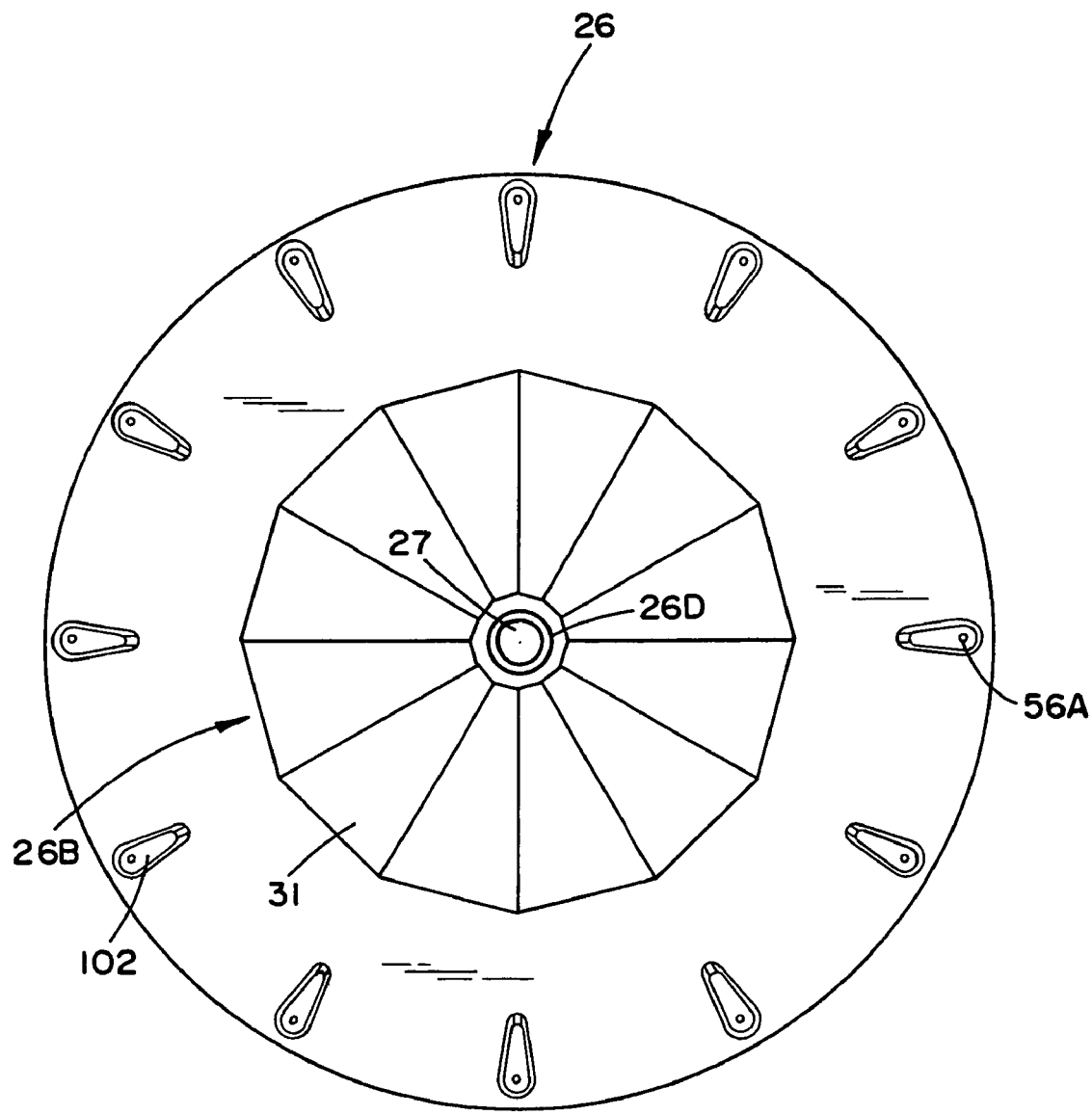
FIG. 10 is a bottom view of the float chassis of the aerator.
Figure 11:
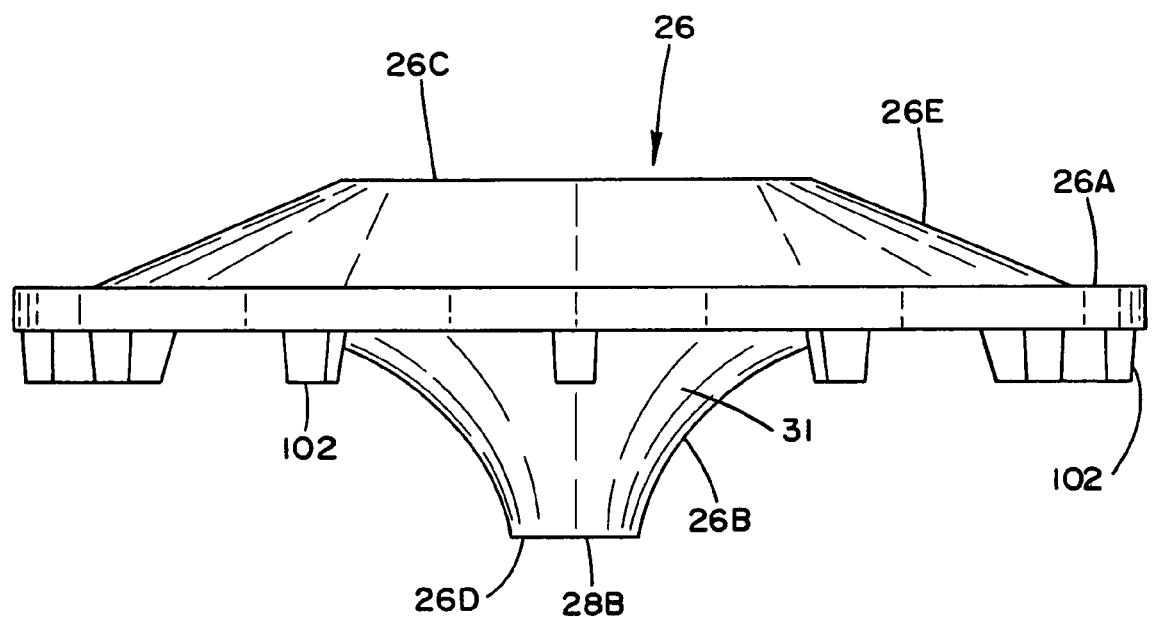
FIG. 11 is a side view of the float chassis of the aerator.

FIGS. 9, 10 and 11 provide more details of components of the unit. In FIG. 9 the outflow lip 80 of diverter 28 can be seen, as well as bolt holes 56A for attachment to supports 102 of the float chassis (not shown in FIG. 9). Inner surface 28A of diverter 28 and diverter intake 28B are visible, as is the inner surface 29B of fitting 29. FIG. 10 shows the bottom surface of float chassis 26 and the streamlined contours of supports 102 which are integral parts thereof. The teardrop contours shown produce desirable characteristics in the substantially laminar flow passing over outflow lip 80. Bolt holes 56A are provided in supports 102 for the attachment of diverter 28. Shaft column 27 is provided at the center of bottom surface 26D of sectional diverter 26B for the passage of the drive shaft. In this embodiment, twelve curved trapezoidal faces 31 of equal size form the sectional diverter 26B, providing the sectional diverter a cross section of a dodecahedron. This form of fabricating the sectional diverter 26B and/or diverter 28 (not shown in FIG. 10) can offer convenience and economy in manufacturing and also tends to produce additional aeration and mixing of the fluid as it passes from the bottom of the unit to the outflow lip 80 where laminar flow begins. The teardrop-shaped contours of supports 102 also produce desirable bubbling effects as water flows outward via outflow spaces 97.

FIG. 11 is a side view of float chassis 26 which shows supports 102, upper surface 26C of the frusto-conical portion 26E of this component, plus rim 26A. The form of sectional diverter 26B and the individual faces 31 can be seen, as well as bottom surface 26D of the diverter.

Figure 12A:
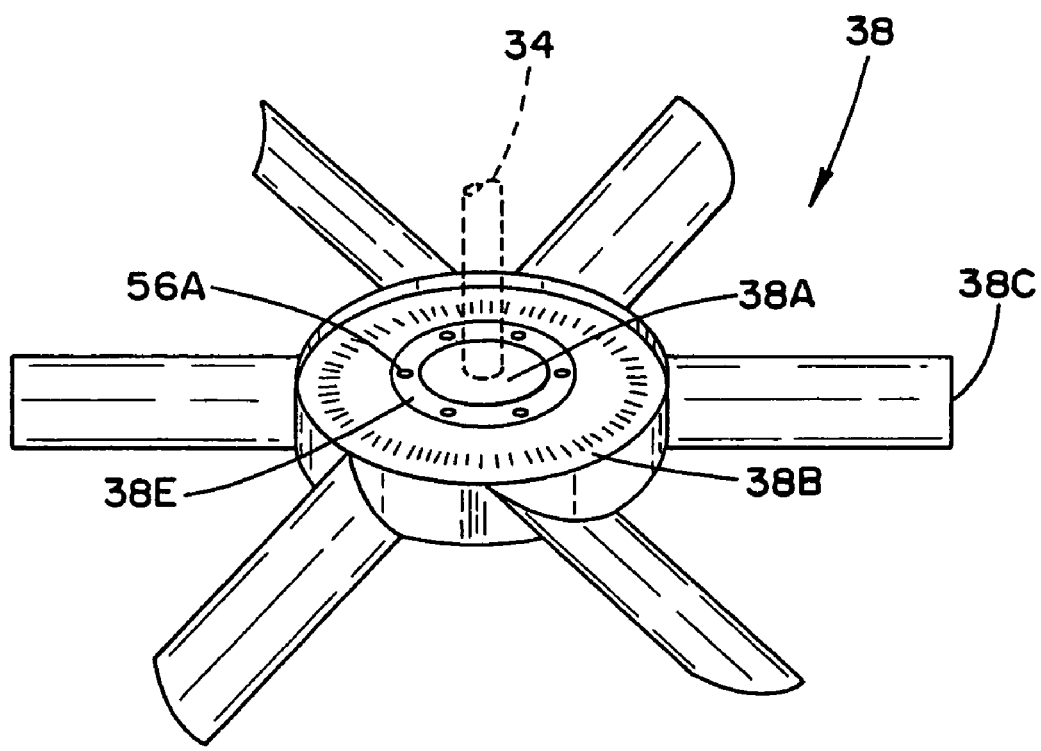
FIG. 12A is a perspective view of the impeller.
Figure 12B:
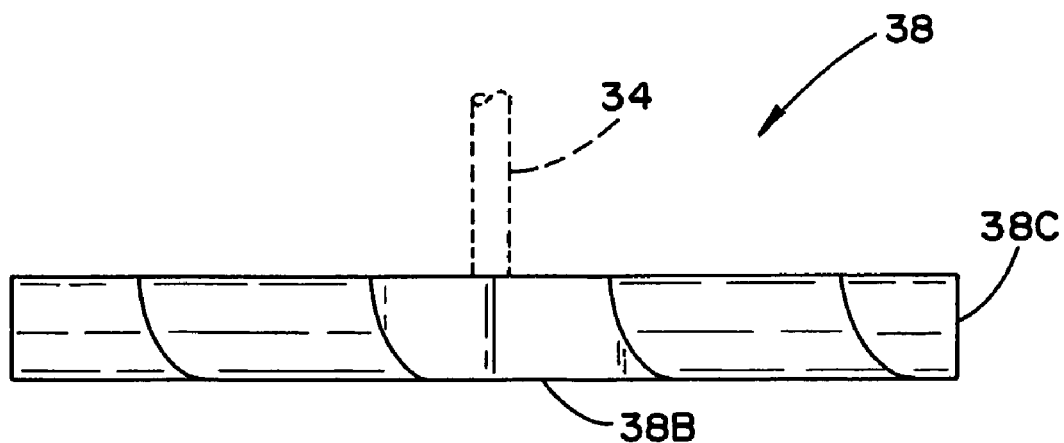
FIG. 12B is a side view of the impeller of FIG. 12A.
Figure 12C:
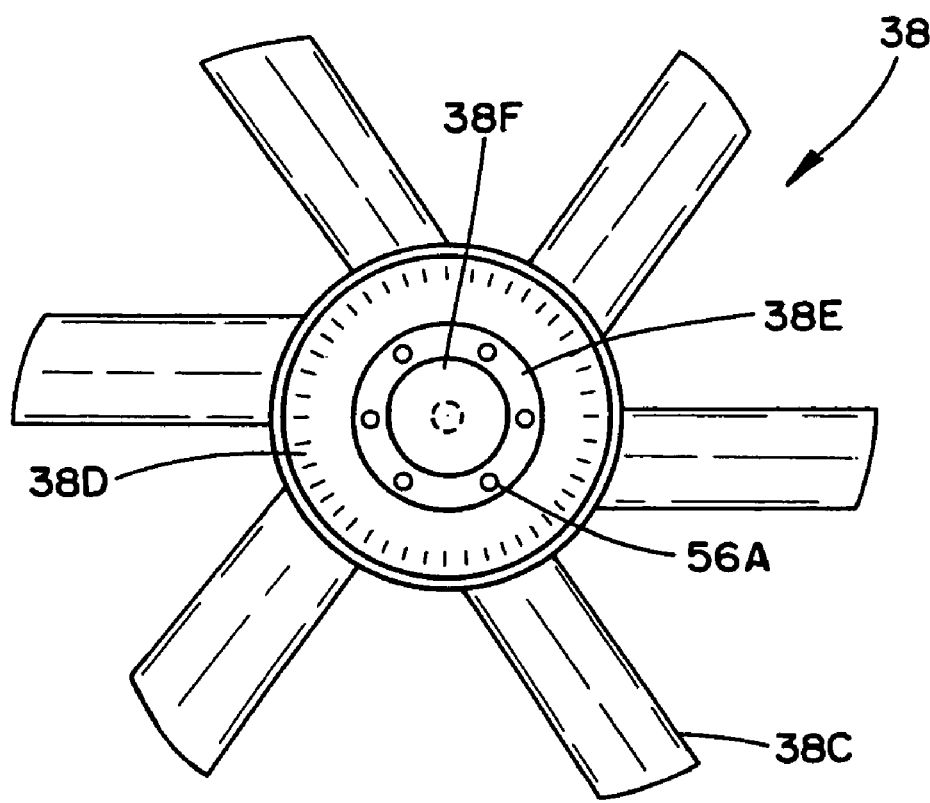
FIG. 12C is a plan view of the impeller of FIG. 12A.
Figure 12D:
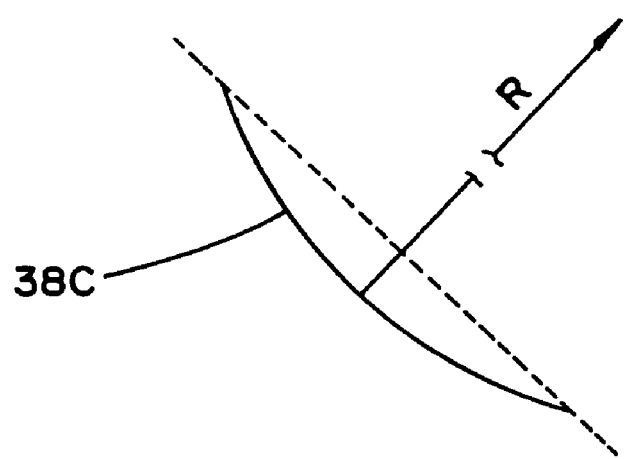
FIG. 12D is a sectional view of a blade of the impeller of FIG. 12A.

FIGS. 12A, 12B, 12C and 12D show impeller 38, having a hub mount 38A which is mounted on shaft 34, impeller hub 38B and a plurality (six as shown) of blades 38C mounted thereon. The impeller blades are oriented so that when the impeller is rotated counterclockwise as viewed from the shaft side as shown in FIG. 3, the blades would tend to cut their way forward through the water, with the thrust of displaced water rushing past the shaft. This will be considered a "right hand" impeller for the purposes of this discussion. An impeller of the opposite orientation could be used as well, if the direction of rotation were reversed. The impeller is preferably molded as an integral unit of a suitable thermoplastic polymer (which can contain reinforcing fibers, fillers or the like), including the blades 38C, hub 38E and its central portion 38D, within which a metal ring 38E for securing the impeller to the impeller hub mount 38A with bolts 56 (not shown here) or other suitable mechanical fasteners. The blades should be sufficiently flexible and resilient to flex slightly in operation, returning to their original form and orientation when at rest. As shown in FIG. 12D, the blades 38C are constantly curved from their attachment to hub 38B to their tips, usually circular curvatures having a radii ranging from about ten to about sixteen inches, preferably from about thirteen to about fifteen inches. The blade tips can be rounded if desired. The blades are also inclined slightly from vertical, preferably in a range of from about 1 inch to about 2 inches front height versus back height, as shown in FIGS. 12A and 12C, with the leading edge of one blade aligning approximately with that of the blade on the opposite side of the impeller. In an embodiment, the impeller has a diameter of approximately 24 inches (fitting within connection fitting 29) and a hub about 10.5 inches in diameter. An effective impeller can have a pitch-to-diameter ratio in the range of from about 0.05 to about 1.0. Such impellers have been used as cooling fans on truck engines, and are currently commercially available from Chicago Rawhide Company.

Figure 13:
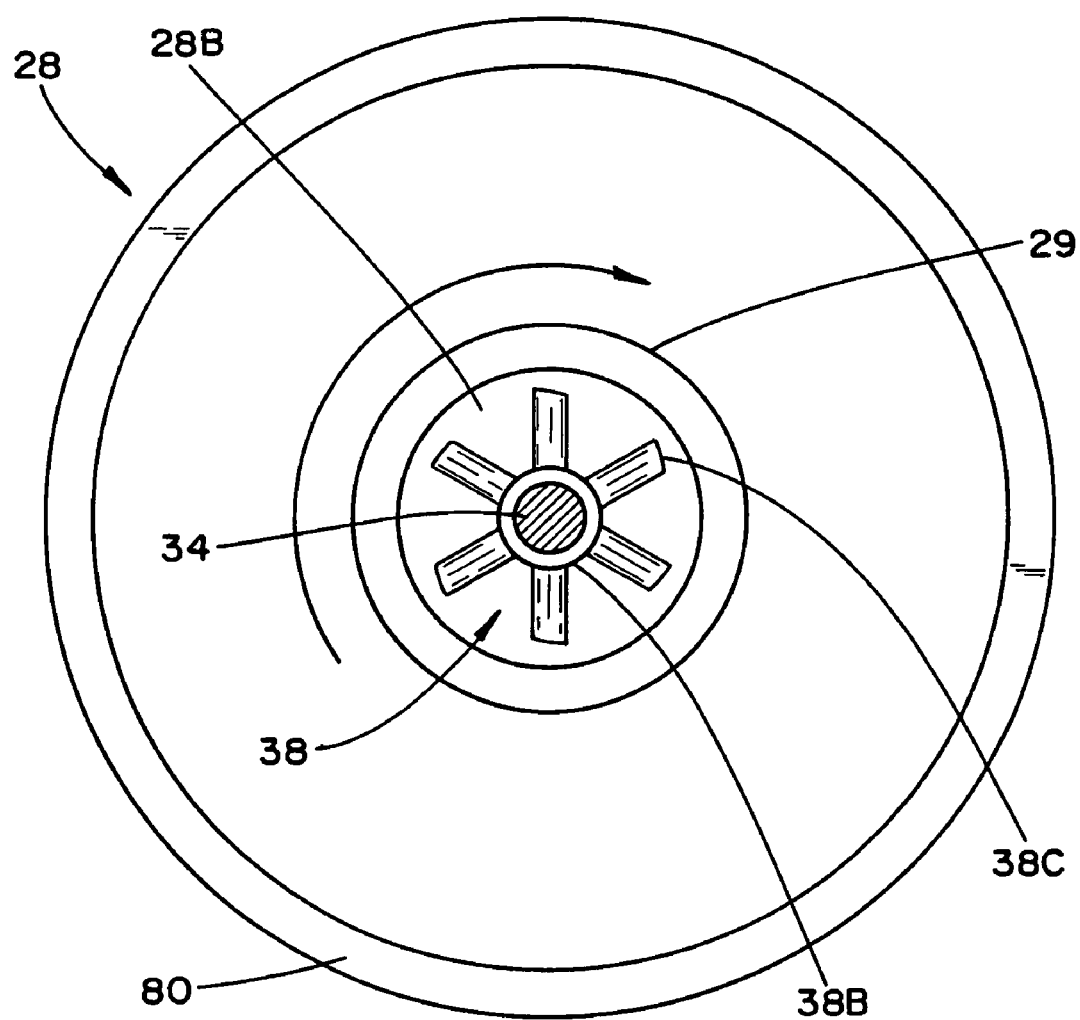
FIG. 13 is a sectional top view of the operation of the impeller of an aerator in aeration mode.

FIG. 13, a top view of the diverter 28 section while the aerator is operating in aeration mode, illustrates impeller 38 rotating clockwise within connection fitting 29. The effect of this rotation with the right hand blades of the present embodiment is to push the water downward. This may seem counterintuitive and potentially inefficient, but aeration can apparently be accomplished by reverse flow, which is generated by the pressure generated by the water displacement of the outside, gas-free water displacing annularly-disposed gas-water mixtures. While not wishing to be bound by theory, it is believed that water below the diverter 28 is forced to enter the diverter around the outer edge of impeller 38, thence passing upwards through the aerator and outward via the outflow lip 80. With present embodiments, it is estimated that there is about 60 to 65 percent less upward flow in this aeration mode than when the unit is run in mixing mode (with opposite rotation of the impeller).

Figure 14:
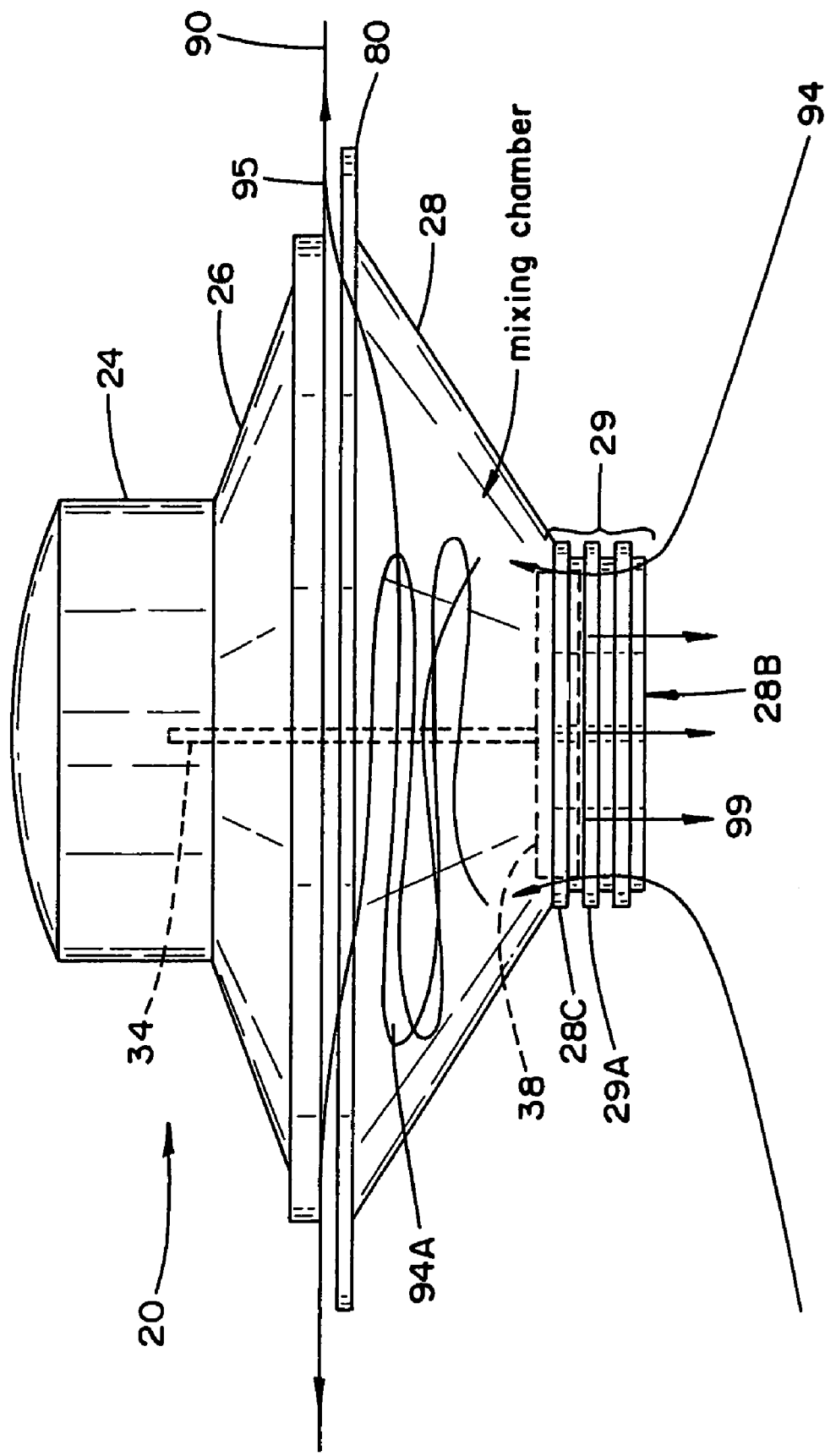
FIG. 14 is a side view of the aerator illustrating liquid mixing effects during aeration mode operation.

FIG. 14 illustrates the aerator 20 in partial sectional view, with sectional diverter 26C of float chassis 26 omitted for clarity. With impeller 38 rotating in a unilateral direction, e.g., clockwise as viewed from above in FIG. 14 in "aeration" mode, fluid is simultaneously pushed downward through intake 28B (indicated by arrow 99) and drawn directly into intake 28B within connection fitting 29 (as described above with reference to FIG. 13), thence propelled upward into the space between the sectional diverter and the inside of the inverted frusto-conical shell of diverter 28. A circular pattern of air-liquid mixing develops within this space, as indicated by arrows 94A, creating micro bubbles there before the fluid exits in laminar flow 95 over outflow lips 80 along liquid surface 90.

Surprisingly, it has been discovered that the present embodiment produces both mixing and aeration effects for the fluid in which it operates, and the proportions of these effects can be altered by changing the direction of rotation of the impeller. When using AC electric impeller motors provided with three-phase power, switching means for starting, stopping and reversing the motor (and impeller) can easily be provided at the shore power source. When the rotation of the impeller is reversed to drive water initially downward from the interior of diverter 28, a combination of aeration and mixing is obtained. Initial tests indicate that for example, with clockwise rotation of the impeller, for example, approximately 75 percent of the applied power is directed to aeration and about 25 percent is directed to mixing of the liquid in the pond or other body. When the impeller rotation is reversed to counter-clockwise, approximately 75 percent of the power is directed to mixing and about 25 percent to aeration. To obtain maximum mixing and aeration of the liquid contained in the pond or other body, timing means can be incorporated into the power switching system to provide for periodic reversals. For example, reversal of the impeller about every four hours would allow for twelve hours of mixing and twelve hours of aeration per day, since about 25 percent aeration or mixing is taking place when the unit is operating to maximize the other function. Operating the aerator in either mode (based upon the design and rotation of the impeller) produces aeration, but when run in aeration mode, oxygen is added by agitating and mixing the water. In the mixing mode, aeration is completed by the use of laminar flow over the water surface, keeping the water in contact with the atmosphere for relatively long periods of time. For example, Table I below compares the proportions of power applied to mixing and aeration and the resulting liquid flow through the aerator in the two modes:

TABLE I

| Mode Selected | Power to Mixing | Power to Aeration | Liquid Flow (Gallons/day) |
| --- | --- | --- | --- |
| Mixing | 75 percent | 25 percent | 7,000,000 |
| Aeration | 25 percent | 75 percent | 2,500,000 |

Figure 15:
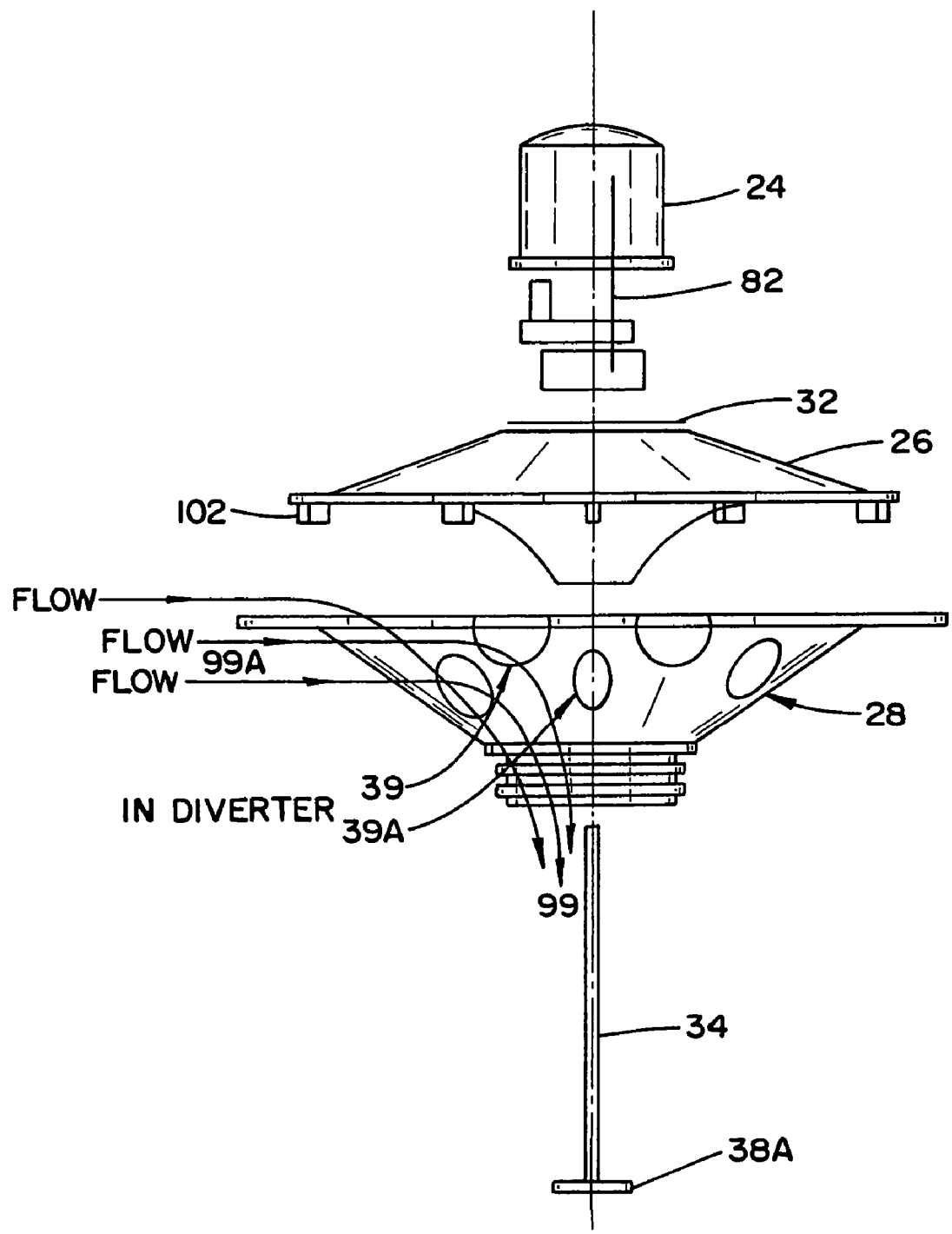
FIG. 15 is a side exploded view of the aerator illustrating modifications suitable for increasing mixing effects during operation.

If desired, as shown in FIG. 15, this increased aeration effect can be obtained by cutting loops 39 into the edges of outflow lip 80 and/or cutting a plurality of holes 39A into the conical shell of diverter 28. When such holes are cut into the diverter, hinged flaps or covers can be attached to at least some of them to permit stopping the flow through the diverter walls when more mixing is desired. Such flaps or covers can be controlled with water pressure or manually via suitable rods, cables or the like.

One or more aerators can be placed in a body of fluid by any suitable means, but as the present embodiment weighs over 500 pounds, it would be practical to use a front end loader or similar equipment, or use a crane to lift and lower the unit via a lifting road 2. As discussed above, the aerator unit(s) can be moored to the shore or side of the liquid body or anchored in place, with electrical power provided from shore via suitable cable connections.

For large bodies of liquid, multiple aerators can be emplaced and operated to achieve desired results of aeration and/or mixing. Certain equipment and techniques can also be used to enhance their effectiveness. For example, FIGS. 16 and 17 illustrate a vertical curtain or boom presently referred to as a "wave-boom" which can be floated in the liquid to reflect laminar flow and wavelets emanating from at least one aerator. This device differs from both conventional "lagoon curtains" and oil booms, as the wave boom reaches at least two feet down into the water, while an oil boom normally reaches only about six inches from the surface and a lagoon curtain often reaches from the liquid surface to the lagoon bottom. (An oil boom typically refers to a shallow floating curtain that prevents oil or other floating liquid from dispersing across a body of water and possibly contaminating other areas. Curtains can be arranged to extend from the surface to the bottom of a body of water to subdivide it into sections, but are expensive and time-consuming to install.) FIG. 16 shows the wave boom 110 floating in a body of liquid, with flotation section 12 (containing closed cell polymer foam 93) floating just above surface 90, a connecting section 114 extending downward to a chain (i.e., weight) pocket 116 containing metal chain 118 or other flexible weights which can be conveniently inserted into a loop or pocket 116 at the foot of connecting section 114 and sealed at least temporarily therein. FIG. 17 illustrates the form of the boom 110 and the placement of flotation and weighting material more fully. Such curtains or boom can be easily assembled from suitable types of woven or nonwoven fabrics, sewn or otherwise closed to retain the flotation and weighting materials. In addition, the flotation and/or weighting pockets can be used to hold and dispense bioaugmentation materials such as microbes to aid in the digestion or oxidation of nutrients or other impurities. In a present embodiment, UV-resistant 90 percent closed fabric is doubled and sewn throughout to form pockets for a 3.5 inch closed cell flotation device at the top and a 2 inch pocket on the bottom to retain a chain, cable or other weighting means. The internal space 119 between the layers of material can be employed to contain and disperse bioaugmentation materials, e.g., a growth microbe incubator which supplies microbes to occupy the water in the vicinity of the wave boom.

Figure 18:
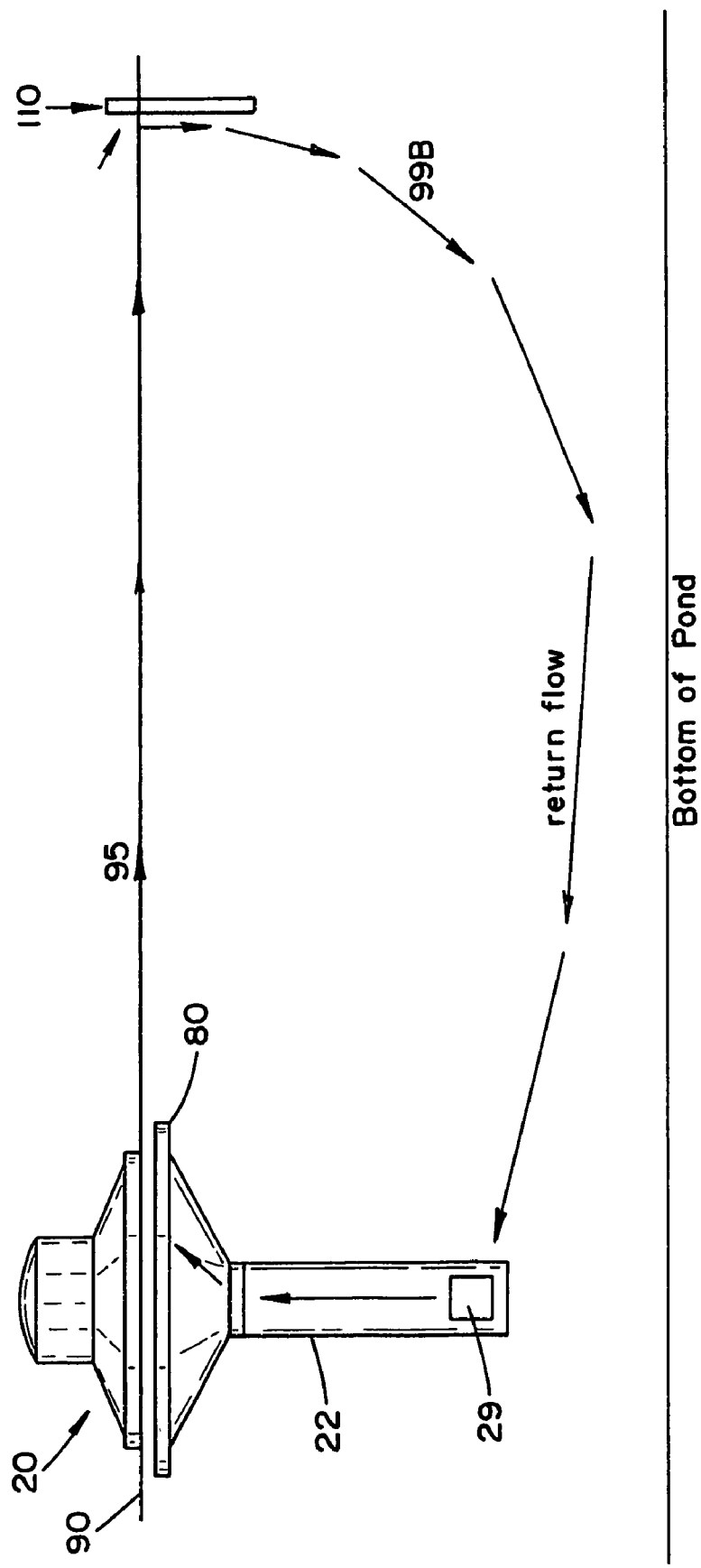
FIG. 18 is a side underwater view illustrating the effects of a floating curtain or boom in reflecting and redirecting the laminar flow of liquid produced by an aerator.

When in place in the liquid, such booms are capable of stopping or deflecting laminar flow currents from an aerator to provide a return flow to the aerator and provide additional aerating effects. For example, FIG. 18 illustrates an aerator 20 taking in liquid via horizontal intakes 29, pumping the liquid upward through intake tube 22 and producing a laminar flow 95 across outflow lip 80. When the laminar flow (and accompanying wavelets, not shown here) strike floating boom wave 110, the laminar flow 95 is deflected downward to form a return flow 99B which is again taken up by aerator 20, increasing the efficiency of aeration.

Figure 19:
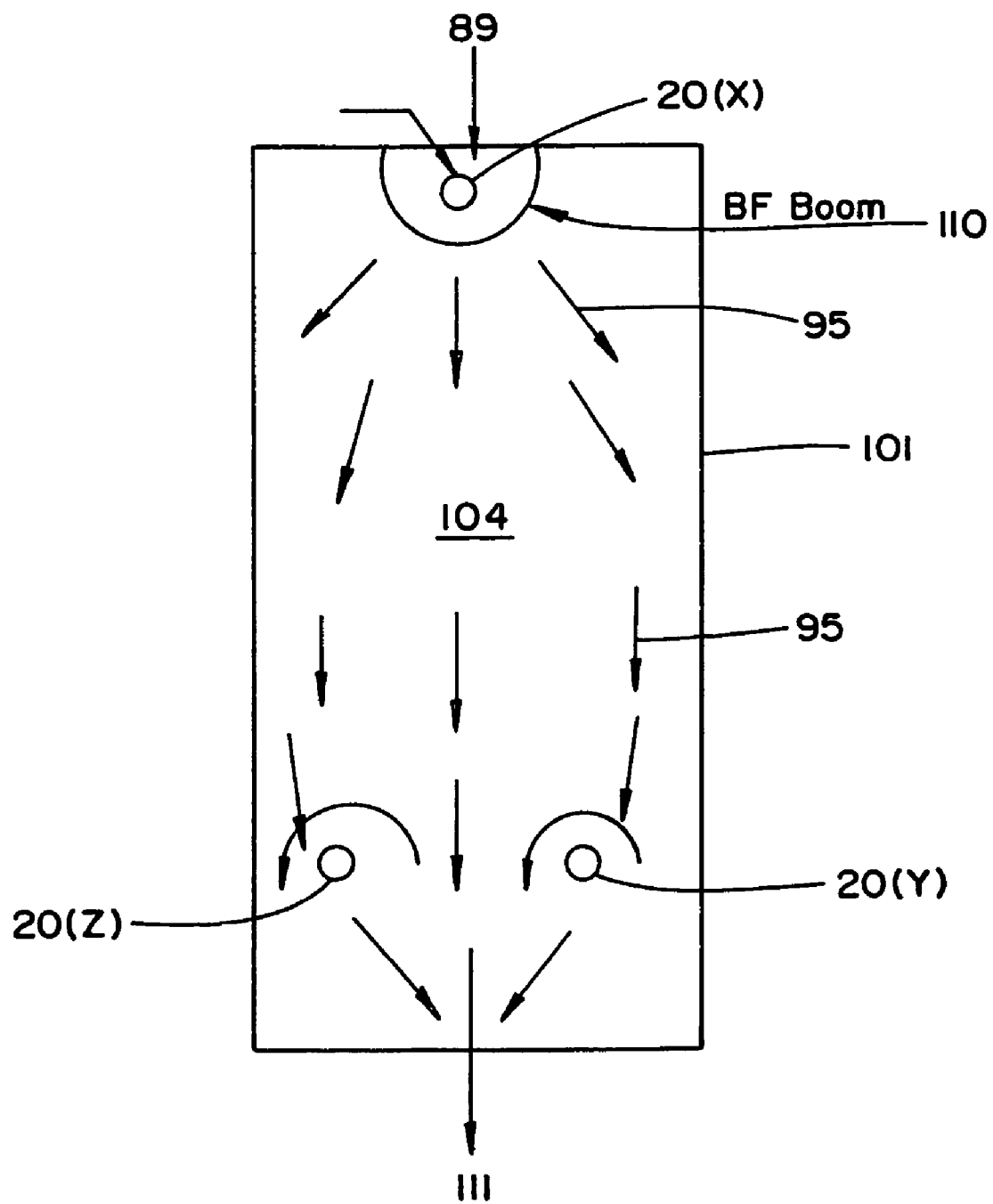
FIG. 19 is an overhead view of a square body of water with three aerators emplaced and partially screened by arc-shaped floating booms, illustrating their effects upon a stream of liquid entering the body and a portion of the liquid leaving the other side as effluent.

FIG. 19 illustrates a pond 101 or other body of liquid in which a number of aerator units and at least one floating wave boom are used to optimize the treatment of incoming waste-containing liquid 89 which is at least intermittently introduced at one end. The pond 101 is treated by aerator 20(x) operating in aeration mode which is contained within an arc-shaped floating wave boom 110. This combination can be considered to form a "constant stir tank reactor" (CSTR) within a body of liquid, creating a highly aerated, oxygenated liquid which will reduce the amounts of sludge, nutrients and suspended solids in the liquid over a reasonable period of operation. This aerator is allowed to operate for a period of time sufficient to fully mix and aerate the waste-containing liquid (perhaps three to six hours, depending upon the volume of the CSTR and the level of contamination of the incoming liquid) and can be reactivated as more waste enters the lagoon. Various advantages are obtained by installing and using an attached growth wave boom with an aerator to form a CSTR: cost effectiveness, a simple design which is easy to install fast response enabled by the short installation time, fast reaction of microbes within the CSTR and the ability to incubate specific microbes suited to the task at hand.

As waste water with a high dissolved oxygen (DO) content leaves the CSTR, the oxygen is used up rapidly due to the biological oxygen demand (BOD) in the water ahead, which contains nitrifying bacteria. As the resulting underwater current of water 95 proceeds across pond 101 passing through anoxic zone 104, where the liquid loses its contained nutrients, there is little oxygen left. Leaving the anoxic zone, the liquid current passes to two aerators 20 (Y and Z) operating clockwise in aeration mode in a facultative zone at the other end or side of the pond, where the treatment process is completed. Most of the flow 95 of liquid is again treated by the aerators Y and Z to remove any remaining nutrients and solids before passing out of the pond as effluent 111, which is cleaner and better aerated than incoming liquid 89. Preferably, the aerator and boom used to form a CSTR create a high level of DO (at least 2 ppm), and enough intense stirring or mixing enables photosynthesis to take place. Various waste material in the incoming liquid is used as nutrients by the biomass in the pond. The respiration by aerobic bacteria then leads the desirable aerobic activity, with the production of carbon dioxide, carbonic acid, water and hydrogen ions, producing a carbonate buffering pool to control alkalinity.

Figure 20:
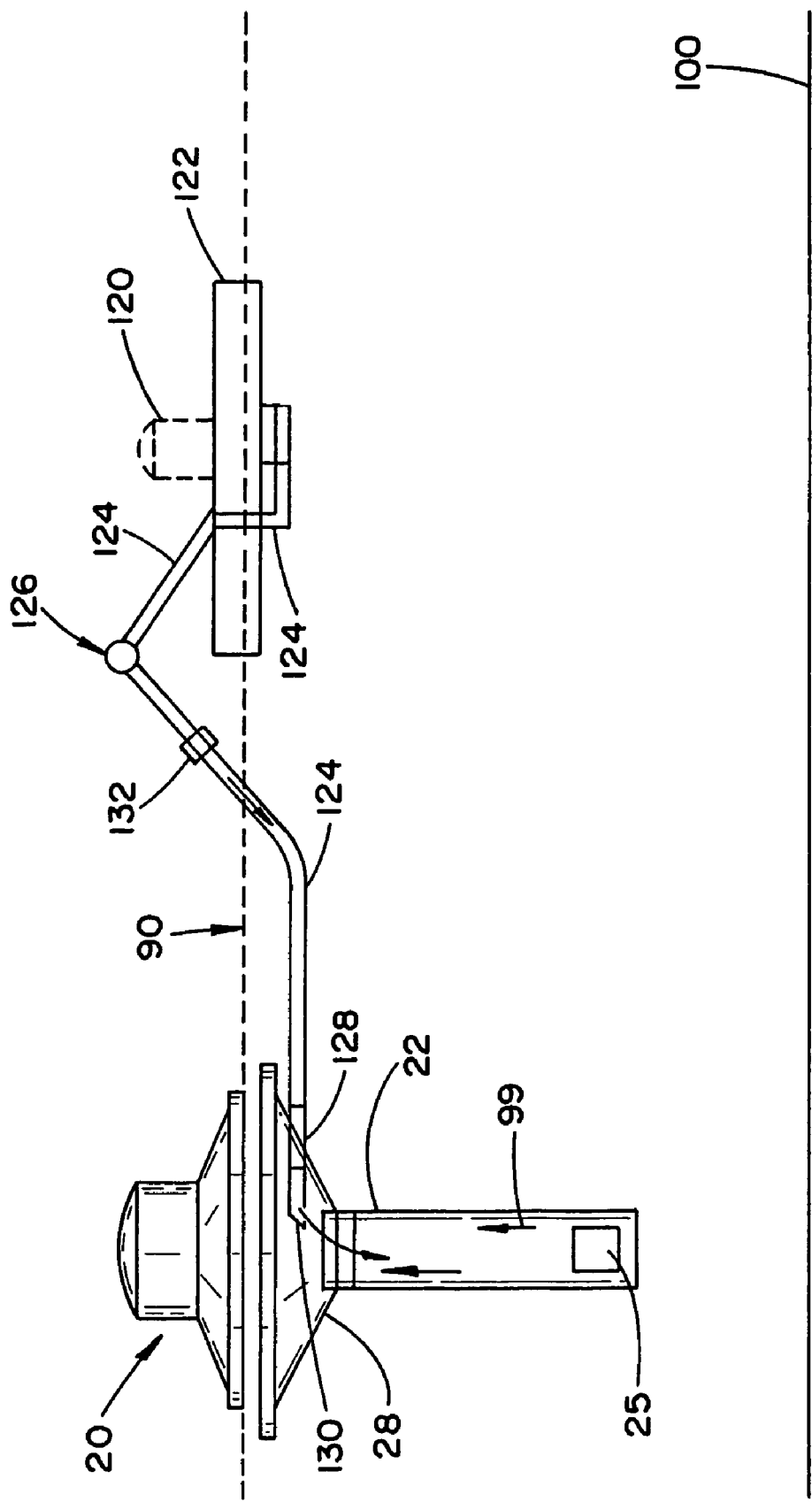
FIG. 20 is a side view of an aerator unit operating in water with supplemental aeration being provided by a floating blower introducing air to the diverter and/or a floating water pump employing venturi means to generate micro bubbles in water which is introduced into the diverter.
Figure 21A:
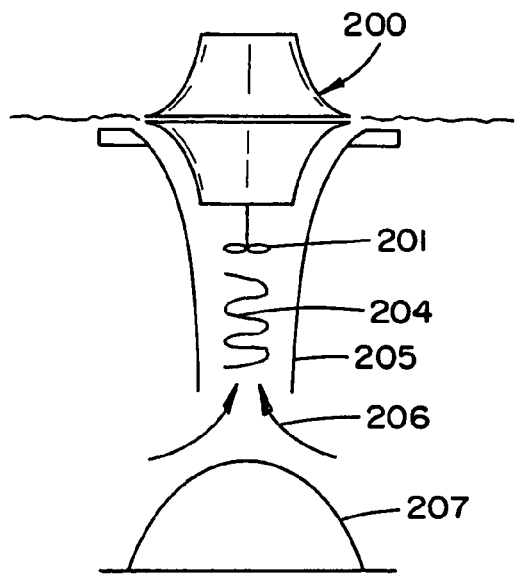
FIG. 21A is a schematic representation of the floating fluid circulator of Example 1.
Figure 21B:
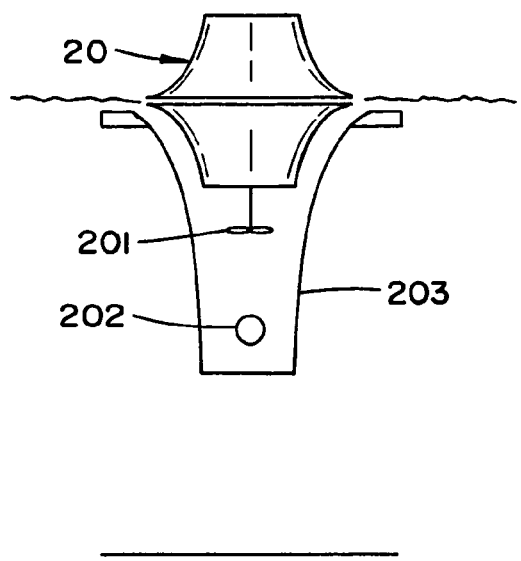
FIG. 21B is a schematic representation of the floating fluid circulator of Example 2.

FIG. 20 illustrates methods of supplemental aeration in the operation of the aerator. As shown, aerator 20 with intake tube 22 and horizontal intake ports 25 at the bottom is operating in mix mode, which would normally send water flowing over outflow lip 80 in laminar flow. The aeration process is supplemented by mounting an electrical pump or air blower (shown schematically) on a flotation device adjacent aerator 20, connecting the pump or blower 120 to an appropriate type and size of line 124 to carry the outgoing water or air to a water-activated venturi 126. Such venturi apparatus can be obtained commercially from the Mazzei Venturi Corp. of Bakersfield, Calif. Lines 124 continue from venturi 126, via connections 132 as required, to aerator 20, where the diverter 28 is pierced by a flanged pipe 128. An elbow or deflector 130 is provided at the inner end of flanged pipe 128 to direct the flow of the water or air to mix with upflowing water 99 within intake tube 22 and outward across outflow lip 80, as indicated by arrows 99. The result is to increase the dissolved oxygen content in the water to be treated.

It is emphasized that there is a difference between small bubbles and microbubbles. Small bubbles form when the circulator is operated in the aerate mode. The small bubbles cause water to flow upwards to the surface when the impeller rotates in the unilateral directions e.g., clockwise direction. However, when much smaller microbubbles are formed, for example, when streams from two venturis impinge into one another, the flow effect is opposite. Microbubbles in water form a two phase fluid which flows from the surface to the subsurface as would a single phase fluid when the impeller rotates in the unilateral directions, e.g., counter-clockwise direction. Moreover, the small bubble-containing fluid provides a discontinuous stream whereas the unseen to the eye microbubbles act as if it were a homogeneous stream.

An aspect of the present invention is directed to a process of a system of circulating wastewater such that its dissolved oxygen content is increased. A critical element in this process is the utilization of a floating fluid circulator of the type described above. That is, a nested and separated pair of frusto-conical surfaces wherein the planar area of the upper surface is different from the planar area of the lower surface is employed. That device lifts and expresses, i.e. ejects, circulated fluid, principally water radially from the annular space between the pair of nested frusto-conical surfaces.

Figure 39:
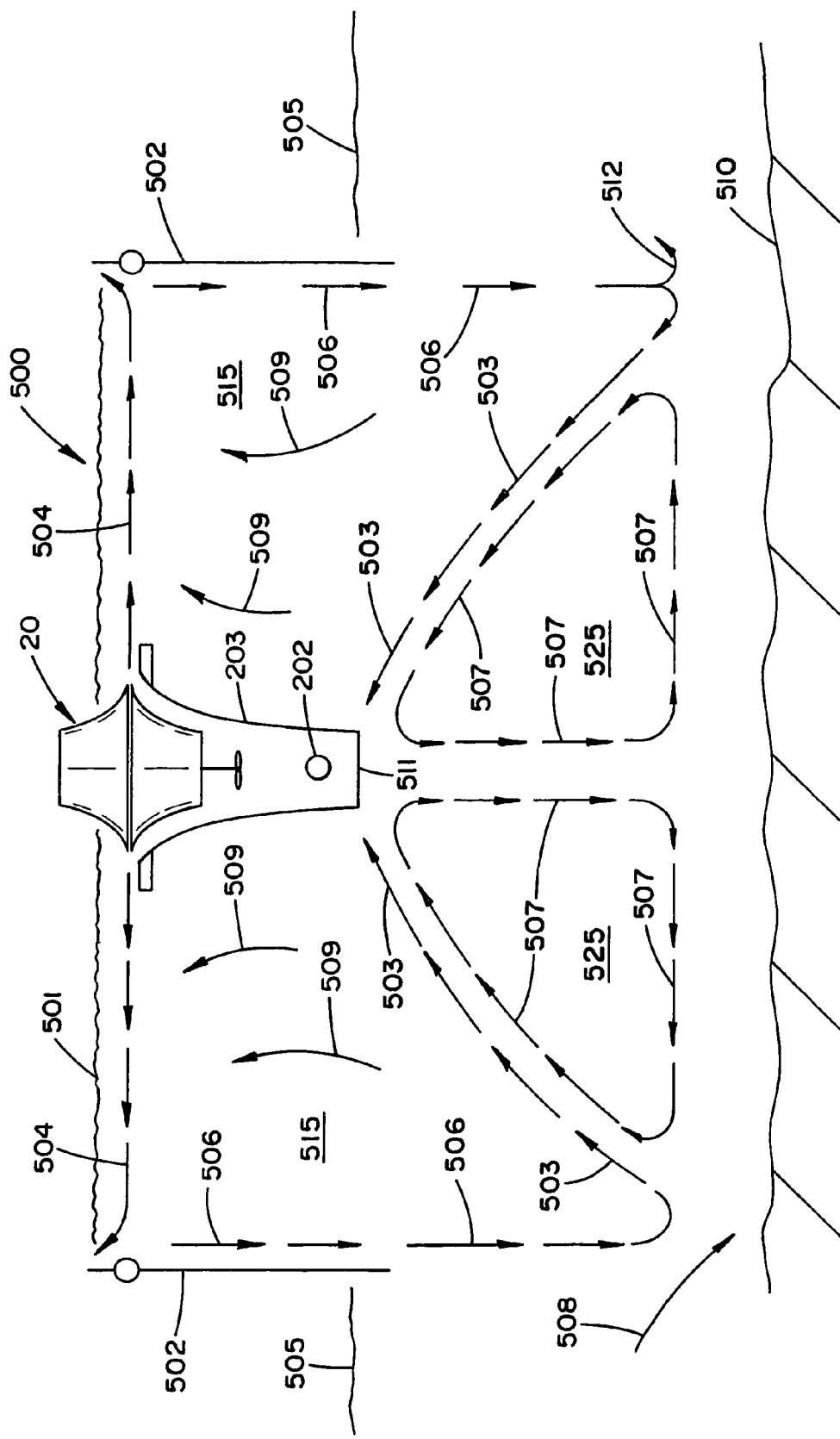
FIG. 39 is a schematic representation of an equalization tank in accordance with the present invention.

This process is depicted by the arrangement set forth in FIG. 39. The frusto-conical circulator 20, utilizing the same reference numeral as the device discussed in detail above, is a nested frusto-conical circulator providing non-laminar circulation that creates higher amplitude/higher surface area waves.

In operation, waste flows into a portion of a waste treatment body of water, which may be a pond, lagoon, basin or the like, denoted as an equalization tank (EQ) 500 where fresh influent 508 and treated influent are mixed together. It is emphasized that although terms of specific bodies of water are used hereinafter, since such bodies of water are most commonly employed in waste treatment operations, these terms should be understood to encompass all types of bodies of water utilized in waste treatment operations. The EQ 500 is a portion of the pond or lagoon whose surface is denoted by 501, bounded by a floating/bobbing curtain 502, e.g. a wave reflecting boom, which surrounds the floating fluid circulator 20. The circulator 20 pulls subsurface water 503 which is mixed with outside air. In aerate mode the mixing of subsurface water and air is discontinuous. That is, when the impeller of circulator 20 is rotating in the clockwise direction, e.g., the circulator 20 is in the aerate mode. The circulator 20 alternately sinks and rises as the impeller is first primed, then loses its prime and cavitates. This random reciprocating flow alternately brings water, then air, into the annular space between the pair of frusto-conical surfaces. Therein, air and water are churned together to form a frothy fluid having a density lower than pure water, e.g. a specific density of 1. The higher density outside water forces flow upward toward the lower density fluid in the annular space. The lower density fluid 504 exits the circulator 20 flowing horizontally in a radial direction. Unpumped subsurface water 503 flows upward by the radially expanded streamlines 504 emitting from the circulator 20. Thus, the flow produced by the circulator 20 is the sum of produced flow 504 from the circulator 20 and induced flow 509.

When the horizontal flow 504 impacts the border of the EQ 500, fluid accumulates at the interface between surface 501 and boom 502. Eventually the accumulation is great enough to create a hydraulic force to turn the horizontal flow 504 perpendicularly so that flow stream 506 moves downward to the bottom 510 of the pond or lagoon. The stream 506, often referred to as a circumferential "waterfall," occurs because there is no impediment to that flow.

It is emphasized that the definition of an EQ as being bounded by a circular boom 502 represents a preferred embodiment. That is, in its broadest definition an EQ requires only circulator 20. Without boom 502, the shore-lines of the pond or lagoon acts as a boom. Of course, in a large enough lagoon the effect is so slow in developing that the beneficial effect, easily observed in an EQ utilizing a boom, is minimized. However, in small ponds a boom may be unnecessary.

Returning to the waterfall of flow stream 506 in FIG. 39, when that flow impacts the hard-sludge-water interface 510, e.g. the bottom, that flow 503 ricochets toward the horizontal inlet 202 of circulator 20. The path is curvilinear creating a surface zone 515 bounded by the air-water interface 501, the waterfall 506 and the curvilinear flow 503. This surface zone 515 is roughly triangular in cross-section but is donut-shaped about the circulator 20, when viewed in plan. It is noted that flows 509 are induced in the surface zone 515.

The flow 503 along the curvilinear line induces a flow 507. Induced flow 507 recirculates toward the circulator inlet 202 but curves down toward the bottom and then toward the waterfall 506. Thus, induced flow 507, bounded by the curvilinear line 503, the bottom 510 and an imaginary line connecting the bottom and the base 511 of the draft tube 203, is, in effect, an induced current which does not come into contact with surface air.

Those skilled in the waste treatment art appreciate that the surface zone of the waste body of water, e.g., a pond or lagoon is aerobic or at least facultative. The sub-surface zone is anaerobic. The induced current 507 defines a sub-surface zone 525. The current 507 brings into intimate contact nutrients provided by sludge from bottom 510 to anaerobes present in sub-surface zone 525. This effects acceleration of the growth of usually slow growing anaerobes. It is noted that the operation of the circulator 20 also increases aerobic microbe activity to consume the increasing dissolved oxygen on surface zone 515.

The aforementioned design of an EQ 500, which is termed a tank in the preferred embodiment wherein boom 502 is utilized, is self-contained. Waterfall 506 is resistant to cross-flow. Flow can enter EQ 500 only by a waterfall evading pipe or at the upstream sludge-water interface, illustrated by flow stream 508. Flow can only exit EQ 500 at the downstream sludge-water interface, denoted by flow stream 512.

It is emphasized that inlet stream 508 to the EQ, referred to as the influent, and the exit stream 512, referred to as the effluent, flow below the thermocline 505. A thermocline is present in waste treatment bodies of water, e.g., ponds and lagoons having a depth of greater than about 5 feet wherein the temperature below the thermocline is lower than the temperature above it. As such, the circulator of the present invention represents a significant advance in the art.

The above analysis establishes that fluid egress from the boom enclosed zone, e.g. the EQ, to the remainder of the waste treatment body of water, e.g., pond or lagoon occurs below the thermocline. It should also be apparent that in those small number of cases when ponds or other small bodies of water having a depth of less than about 5 feet and where there is no appreciable change in temperature from surface to bottom, e.g. where there is no thermocline, the aforementioned analysis makes it apparent that fluid egress occurs below the waterfall induced by the operation of the circulator of the present invention.

In view of the barrier created by the thermocline, prior art circulators could stimulate aerobic and anaerobic activity in ponds and lagoons only by circulating the entire pond or lagoon to equalize temperature therein. Alternatively, those circulators could only circulate fluid above the thermocline since prior art circulators could not effectuate circulation below the thermocline.

This ability of the floating fluid circulator to stimulate flow above and below the thermocline permits increased biological activity over the entire body of water, e.g., pond or lagoon. This is so in that the effluent stream 512 exiting the EQ is microbe-rich, due to the mechanisms discussed above. The added microbes increase the bioactivity of the entire pond or lagoon.

It should be appreciated that the primary advance provided by the process of the present invention, utilizing the EQ mechanism, is the increase in anaerobic biological activity. Although the EQ mechanism increases aerobic biological activity, that increase is not as dramatic as the increase in anaerobic activity. However, supplementation of aerobic activity is another aspect of the process of the present invention.

This supplementation is preferably provided by impingement mixers of the type disclosed by U.S. Pat. No. 5,772,886, incorporated herein by reference. Briefly summarized, impingement mixers dissolve gas in liquid by impinging two or more streams of opposing flow substantially and directly one to the other wherein the two streams enter an impingement zone from conveying means of substantially the same shape wherein at least one of the streams is a gas-mixture and at least one of the streams passes through a venturi prior to impingement. The impingement of the two streams occurs over the water surface of the pond or lagoon. Since this impingement occurs above the water surface, the hydraulic pressure, is defined as the difference between the impingement elevation and the discharge elevation, is critical. As taught in U.S. Pat. No. 5,772,886, incorporated herein by reference, this elevation difference can be such that it offsets the pressure drop, e.g. the act of impinging and conduit transport to the circulator. Those skilled in the art recognize that a venturi is most efficiently operated when its back pressure is minimal. Thus, in a preferred embodiment the venturis are arranged so that there is no back pressure on them. As designed, the discharge from the impingement aerator discharges above the impeller and close to the impeller shaft of the circulator. It should be understood that discharge of the impingement stream below the impeller is feasible. However, such operation can only be had at the cost of higher energy expenditure.

Figure 40:
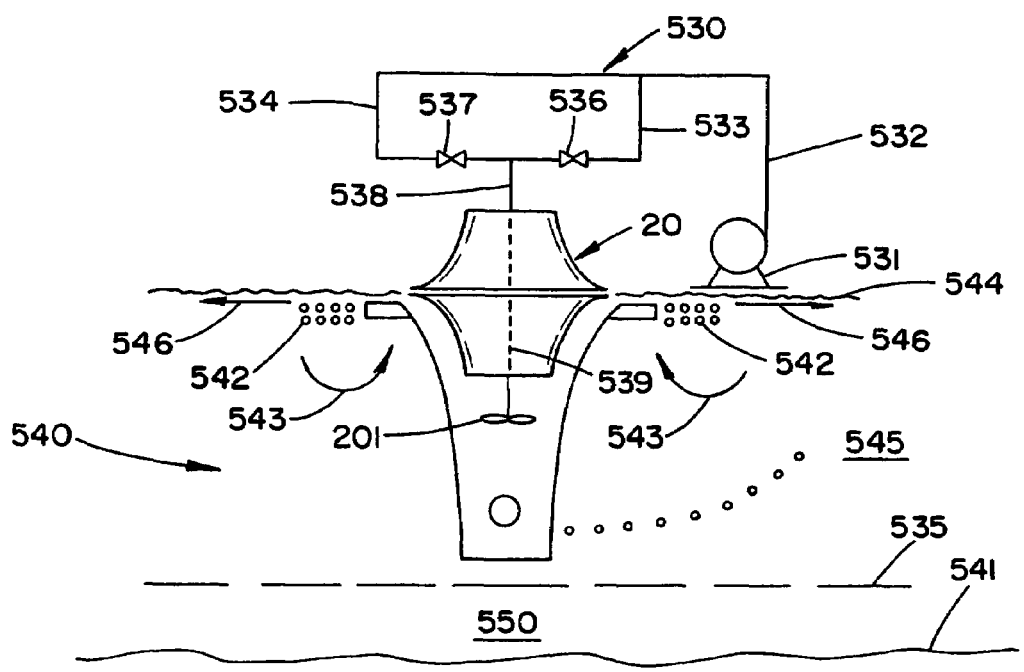
FIG. 40 is a schematic representation of the operation of an impingement aerator in cooperation with a floating fluid circulator.

This arrangement is illustrated in FIG. 40. Therein, an impingement mixer generally indicated by 530, which includes a pump on a floating platform 531 which draws surface fluid into conduit 532 which flows through conduits 533 and 534 in communication with venturis 536 and 537 respectively. The two streams impinge each other. In a preferred embodiment the two streams impinge each other at a combined velocity of 7 feet/second. The resultant impingement stream 539, exiting from conduit 538, denoted by dotted line, is introduced immediately above the impeller 201. This impingement stream introduction occurs is above the thermocline 535 of lagoon 540 whose bottom is denoted by 541.

In accordance with the explanation provided hereinabove, the impeller 201 mixes the impingement stream 539, which is very gassy water, with substantially gas-free water. Very few visible bubbles result from this mixing since the microbubbles are so small that they reflect light and are not visible to the human eye. Rather, they render the fluid opaque. However, at a concentric circle, at about 10 feet measured from the impeller shaft, large bubbles 542 create an effervescence that can be sensed by feel.

The above preferred embodiment wherein impingement mixers cooperate with the floating fluid circulator to produce an air microbubble-water stream which is fed into the annular space of the circulator illustrates another aspect of the present invention. The generalized aspect of the present invention exemplified by that preferred embodiment is the process of reducing the specific gravity of a waste treatment body of water obtained by operating floating fluid circulators in a waste treatment body of water when that circulator is in communication with a fluid generated by a gas-liquid mixing station.

It should be appreciated that this aspect of the present invention is independent of the circulator employed. That circulator need not be within the scope of those utilized in the present invention. They could be any circulator employed in waste treatment operations in the prior art. For example, any of the floating circulators of the prior art which include impellers attached to a drive shaft housed in a draft tube which draws water from below the surface and diffuses it at the surface, is within the contemplation of the circulator in this aspect of the process of the present invention.

Similarly, the gas-liquid mixing station of this aspect of the process of the present invention includes any device which produces air-water fluids, such as aerators but especially devices which effectuate formation of air microbubbles mixed with liquids, usually water, to reduce the specific gravity of a waste treatment body of water.

This aspect of the present invention is not employed to just aerate the body of water, common in the prior art, but, rather, to effectuate density differences which encourage the rapid sinking of solid waste to the bottom of the waste treatment body of water.

The dissolved oxygen (DO) in the opaque zone 542 is supersaturated because the air microbubbles resupply the adjacent water with oxygen as the aerobic microbes consume oxygen. The nitrogen in the air contributes to the effectiveness of the system by reducing the density of the opaque fluid. This phenomenon is accompanied by a low velocity induced flow 543 that moves upward toward lagoon surface 544. The induced flow 543 creates a horizontal velocity vector (not shown). After the escape of the large bubbles, this activity is substantially free of turbulence. Microbubble distribution is thus extensive since microbubbles are present in both horizontal flow (not shown) from the circulator 20 and induced horizontal flow 546.

Figure 41:
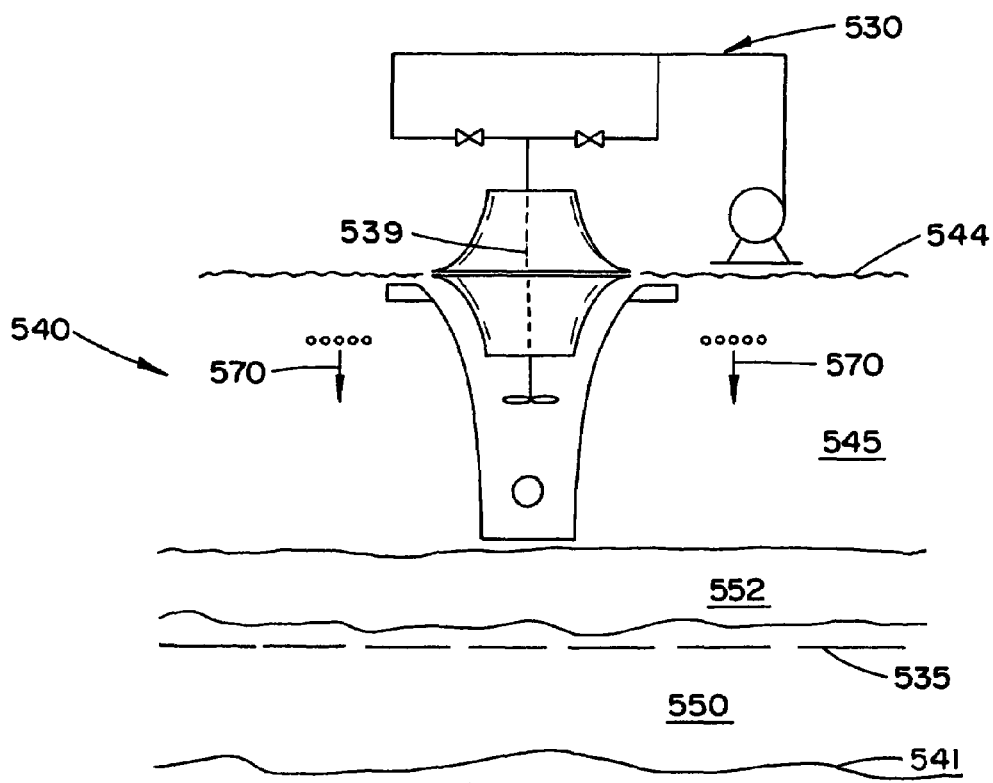
FIG. 41 is a schematic representation of the operation of the impingement aerator in cooperation with the floating fluid circulator showing biological activity.

The aforementioned arrangement produces increased biological activity, as illustrated in FIGS. 40 and 41. Aerobes consume the available oxygen, generating carbon dioxide gas and sludge particles 570 which sink, as denoted by downward directed arrows. The settling rate of sludge particles 570 follows Stokes law. Stokes law establishes that the settling rate of particles is proportional to the difference in density between the settling particle and the fluid in which the particle settles. In an environment wherein the fluid is dense, such as in a pure water environment, the driving force is minimal, causing very slow settling. In the arrangement of the present invention where impingement aerator 530 introduces large volumes of gas and water, e.g. zone 545, roughly defined as the depth from surface 544 to the thermocline 535, settling is very rapid. This is so because the density of the fluid in zone 545 is reduced, increasing the settling rate of particles 546. This rapid settling clarifies the surface water, e.g. zone 545. This phenomenon occurs in spite of the fact that the oxygen in the water is rapidly consumed by aerobic microbes. However, since about 80% of air is inert nitrogen, the fluid density in the lower portion of zone 545 becomes intermediate between the lower density in zone 545 before aerobic microbe activity and the higher density in the substantially air-free water in zone 550, the zone below thermocline 535 and above the bottom 541.

The intermediate density fluid sinks to the inlet of the circulator 20. Thus, as shown in FIG. 41, a three fluid zone is created: an air-rich fluid zone 545, a nitrogen-rich zone 552; and a substantially gas-free liquid zone 550.

As indicated above, the build-up in sludge produced by the aerobic bacteria is rapid due to the rapid settling rate and the ready availability of oxygen. When the sludge particles reach the nitrogen-rich zone the particles stop falling and a sludge blanket forms in zone 552 since the sludge cannot settle through high density zone 550. Due to the vibrant microbial activity in lagoon 540 the sludge layer formed in zone 552 is digested aerobically at its top level and anaerobically at its bottom level.

In a preferred embodiment to the present invention the fluid drawn from lagoon 540 for use in the operation of the impingement aerator 530 is drawn from a downstream location and the impingement fluid is released upstream thereof. The downstream location in a lagoon is relatively richer in microbes fully acclimated thereto. Thus, by strategic location of the impingement stream the acclimated microbial population can inoculate the entire lagoon. Attention is directed to Example 13 infra wherein this preferred embodiment is illustrated.

In another preferred embodiment a lagoon is sectioned off with wave reflecting curtains and lagoons equipped with EQ tanks replicated in series or parallel. Attention is directed to Example 15 where an example of this preferred embodiment is set forth.

It is emphasized that wave reflecting booms provide means for preparing EQ and otherwise sectioning portions of lagoons to promote biological activity in accordance with the discussion above.

Figure 42:
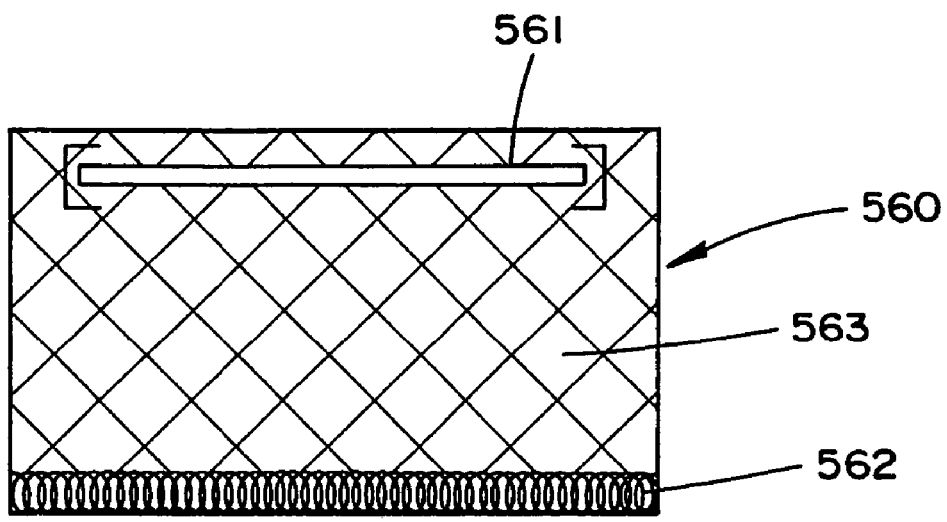
FIG. 42 is a schematic representation of a wave reflecting means.
Figure 43:
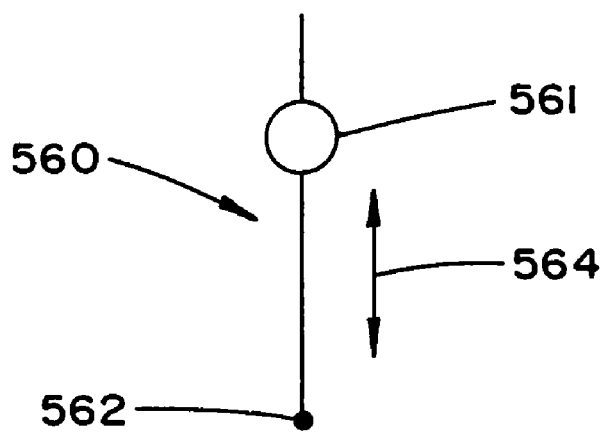
FIG. 43 is a schematic representation of the wave reflecting means, depicted in FIG. 42 as viewed in side elevation.

A preferred embodiment of a wave reflecting boom or beam is illustrated in FIGS. 42 and 43. Therein, such a device, depicted generally at 560, includes a float 561, to maintain device 560 at the surface of the pond or lagoon. The float is preferably a plastic, such as high density polyethylene (HDPE). A mesh material 563, attached to float 561, serves to deflect flows. The mesh material is preferably a strong fiber, such as nylon. The device 560 includes a chain 562 at its bottom to maintain device 560 in its fully extended shape. The chain 562 is preferably a corrosion resistant metal, such as stainless or galvanized steel.

The aforementioned design permits bobbing in place of the wave reflecting means 560 as indicated by arrow 564, as depicted in FIG. 43.

The following examples are given to illustrate the scope and spirit of the present invention. Because these examples are given for illustrative purposes only, the present invention should not be deemed limited thereto.

EXAMPLE 1

A floating fluid circulator 200, outside the scope of the present invention insofar as draft tube 205 was open at the bottom, was placed in a 20 feet deep, 5 acre dairy manure lagoon. The circulator was operated in the mix mode, e.g. counter-clockwise. Over time the vertically fed water drawn to circulator 200 resulted in the buildup of a conical mountain of sludge 207 ultimately resulting in plugging to tube 205.

EXAMPLE 2

The circulator 200 of Example 1 was replaced by circulator 20. Circulator 20 was identical to circulator 200 except that draft tube 203 replaced draft tube 205. Draft tube 203, in accordance with the present invention, included four inlets 202 which effectuated horizontal introduction of water. Over time the mountain of sludge dissipated and the quality of water improved.

ANALYSIS OF EXAMPLES 1 AND 2

Figure 22A:
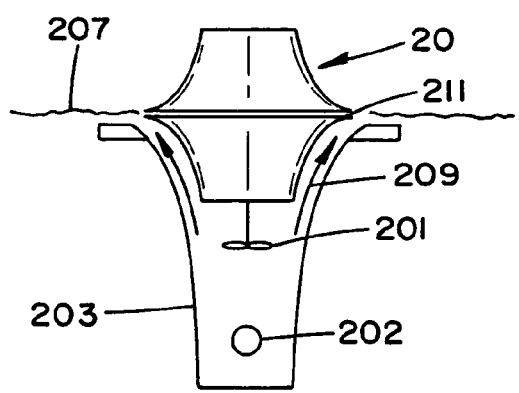
FIGS. 22A and 22B are schematic representations of floating fluid circulators in accordance with Example 3.

The impeller 201, as illustrated in FIG. 22A, imparts a swirl 204 to the fluid, drawn to it when the air-water fluid is introduced vertically into draft tube 205. In turn, this swirling induces swirling in the about to enter fluid. This swirling creates centrifugal forces which separate out microbe-rich solids which fall and deposit to form underwater sludge mountain 207.

When draft tube 203 was used fluid flowed horizontally into inlets 202 in a radial direction. No swirl was created so that no centrifugal force was created to separate solids which remained in suspension. This encouraged microbial growth, improving water quality and eliminating sludge buildup under the circulator 20.

EXAMPLE 3

A floating fluid circulator 20 was operated in mix mode. That is, impeller 201 was rotated in the counter-clockwise direction. In this rotation water flows in an upward direction, denoted in FIG. 22A by arrow 209. Specifically, the water flows from the sub-surface to the water surface 207. A slight repeating wave 207 is formed.

Figure 22B:
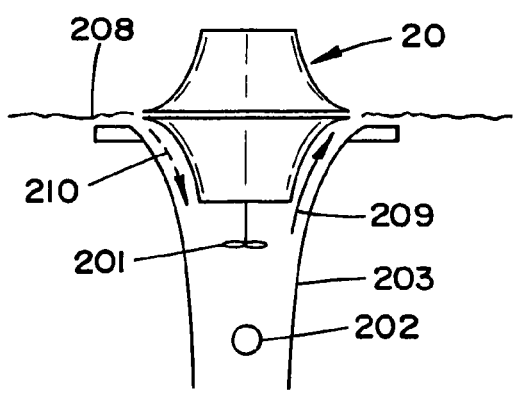

Another identical circulator 20 was operated in aerate mode. That is, impeller 201 was rotated in the clockwise direction. In this rotation water initially flowed in a downward direction indicated by arrow 210. Arrow 210 is denoted by broken lines to emphasize the transitory nature of that flow. Thereafter, the predominant water flow direction reversed and, as in mix mode, water flows upward, towards the surface, as indicated in FIG. 22B by solid arrow 209. Of significance, aerate mode generates erratic but bigger waves 208.

ANALYSIS OF EXAMPLE 3

In mix mode impeller 201 draws water in an upward direction, forcing the circulator 200 down. The buoyancy of the upper frusto-conical member eventually brings the circulator back up. The extended lower lip 211 causes wave formation as it bounces up and down. This perpetuating cycle causes continuing predictable wave propagation motion 207.

In aerate mode, impeller 20 initially forces water in a downward direction raising the circulator 200 up. When the upper surfaces rise above the water line, air is drawn into the annular space 212. The added air ultimately causes the impeller 201 to lose its prime. Impeller 201 mixes gas and liquid, e.g. air and water, to form a low density foam. The density of the outside water is now greater than the density of the annular foam. This density difference acts as a hydraulic driving force causing the aforementioned water direction reversal. Now water flows from sub-surface to the surface. With this upward water movement impeller 201 regains its prime. The impeller 201 again forces water down. However the aforementioned hydraulic force forces the chasis up. These forces continue opposing each other. Periodically, the impeller force is superior and the circulator is lifted, allowing more air in and creating a tsunami, e.g. an underwater wave, followed by a crash downward by the circulator 200. The pattern is repeated but is irregular. Usually a tsunami wave is generated about once a minute.

EXAMPLE 4

A 3 acre, 20 feet deep manure lagoon 229 servicing a 1,600 dairy herd was previously operated so that water was pumped out of its back end. Every few hours a 12 inch flush valve was opened and water cascaded down an alleyway for 40 seconds. Deposited manure was flushed into a lift station leaving a thin film of water on the concrete surface. The resultant slick surface caused some animals to fall and be hurt.

The manure was screened to remove solids, passed through a sand removal channel and the then grit-free flush was flowed into the lagoon.

Figure 23:
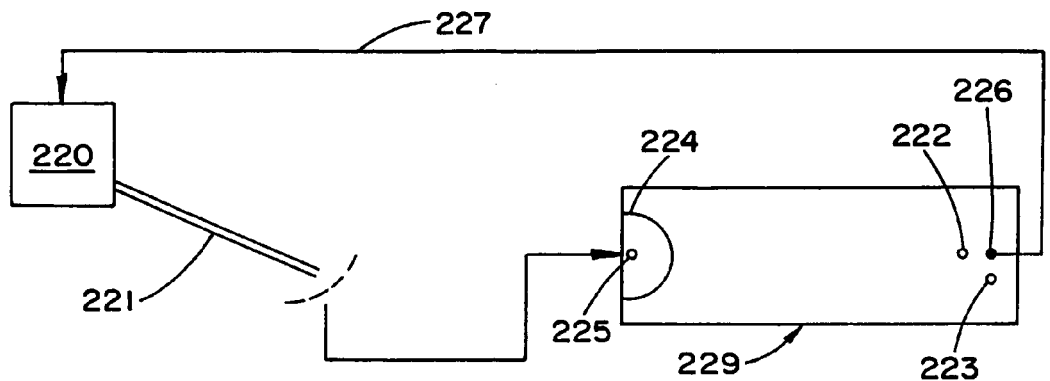
FIG. 23 is a schematic representation of the operation of a manure lagoon in accordance with Example 4.

An arrangement, schematically represented by FIG. 23, was designed. A floating fluid circulator 225 was placed near the inlet of the lagoon with an 150 feet floating wave reflective boom 224 disposed semi-circularly around the circulator. Each end of the boom was about 5 feet from the shore. Circulator 225 was operated in the aerate mode. Two additional circulators, circulators 222 and 223, were disposed adjacent to the return pump inlet 226. These circulators operated in the mix mode and were not surrounded by booms.

Prior to the installation of the circulators, the water returning to flush tank 220 was malodorous, slimy and solids-rich. Indeed the contents of lagoon 229 could only be removed halfway before the viscosity of the lagoon contents became too great to pump. After 1 year of operation in accordance with the system depicted in FIG. 23 the water was tan colored. Before installation, the water color was dark brown. The water odor was eliminated and annual lagoon pumping was not stopped or even disrupted because of thick sludge accumulation. Furthermore, hoof disease amongst animals on the farm where the lagoon was situated was reduced by approximately half The biological oxygen demand (BOD) and total nitrogen in the influent were reduced by about 50% in the area contained by the boom. BOD was reduced by about 25% and total nitrogen by about 5% in the remainder of the lagoon. The alleyways were no longer slick. Biological activity was so high that screened solids composting windrows, long trapezoidal rows of decaying solid material with moisture content greater than 50%, were obscured from view due to the water vapor emitted therefrom during cold weather operation. The pH of the water was 7.8. Visible gas was emitted from the lagoon only above the flat bottom of its inverted trapezoidal shape. No bubbles were seen on its sloped sides.

The lagoon, as suggested above, was pumped out once a year to remove solids and excess water. Over a 3 year period, beginning 19 months before the circulators were installed and ending after 17 months of operation, the mass of nitrogen applied to farmland per lagoon-water-treated acre, at a depth of 0.5 to 2 feet, was reduced by 52% while the number of cows serviced by the lagoon increased by 166%.

Figure 24:
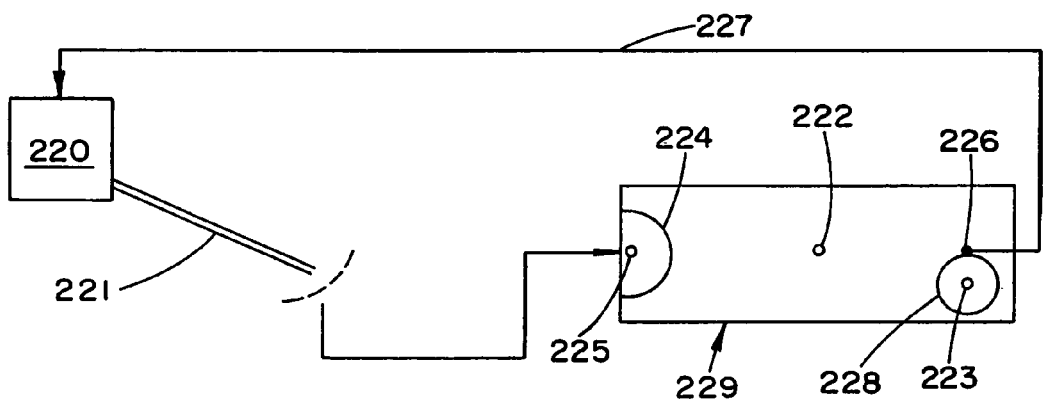
FIG. 24 is a schematic representation of another operation of the manure lagoon in accordance with Example 4.

The configuration depicted in FIG. 23, at the conclusion of these tests, is changed in accordance with that depicted in FIG. 24. In this new arrangement one of the circulators, circulator 222, is moved to the middle of the lagoon. The remaining circulator, circulator 223, is circumnavigated by a 2 feet deep floating wave reflecting means 229, e.g. a boom.

An analysis indicated a 75% drop in total nitrogen concentration in the lagoons, based on the nitrogen present in the influent prior to the introduction of circulators.

ANALYSIS OF EXAMPLE 4

The dramatically improved results stemming from the use of circulators is explained by the development, in the water inside boom 224, of an anaerobic sub-surface zone and a surface aerobic/facultative zone. Additionally, the annular volume immediately above the impeller, operating in the aerate mode, had a dissolved oxygen (DO) high enough to promote nitrifying bacterial growth. The wastewater in the lagoon 229 was circulated frequently within the boomed area so that significant amounts of ammonia were subjected to oxidation. This conversion of ammonia to nitrogen gas is advantageous when the water/sludge is annully sprayed on adjacent farm land. It is noted that operation in the mix mode does not provide a high enough DO to effectuate ammonia oxidation.

The total anaerobic count inside boom 224 is increased in the sub-surface zone. The increased anaerobic count digests the sludge in situ leading to generation of methane and carbon dioxide, which is evidenced by the bubbling seen above the flat bottom of lagoon 229. Long term hard sludge deposits are digested from the sides of the lagoon 229, allowing newly formed sludge to slide down to the flat portion of lagoon 229. The angle of repose of the newly formed sludge was reduced, allowing all sludge to flow off the sides to the flat bottom of the lagoon. Whereas lagoon 229, before the introduction of circulators, recirculated anaerobe-rich water, causing the alleyways to be slick and pathogen-rich, the new recirculated lagoon 229 recirculated aerobic-rich water. Thus, when the flush was completed, the remaining wet film was immediately biologically active due to the ready availability of oxygen in the air. Pathogens and anaerobes were destroyed by the fast growing aerobes, cleaning those surfaces.

This also explains the absence of noticeable odor. There is very little odor because the flushing water is rich in aerobes, rather than foul smelling anaerobes. Moreover, the thin layer on the alleyways surface permits large amounts of cleansing oxygen to be absorbed by the growing aerobes.

The flushed manure enters the lagoon in a first CSTR. Ingress to the first CSTR is by means of a well known fixed fluid communication means. Egress from the first CSTR materially affects the efficacy of the lagoon. The boom diverted flow ricochets from the sludge-water interface below the thermocline back to the floating fluid circulator. Thus, the introduced and biologically produced solids enter the remainder of the lagoon at the bottom of the water column, rather than at the top, below the thermocline. This has the desirable effect of keeping sludge down in the anaerobic zone, away from the aerobic zone. Thus, remediation occurs in the low cost anaerobic zone instead of in the high cost aerobic zone.

When the return water flows out of the back end of the lagoon, it is preferentially drawn from inside the second CSTR and from the aerated zone in the second CSTR. In the past, artisans either maintained the entire lagoon anaerobic or expended vasts amount of energy to make the entire lagoon aerobic. As illustrated by this example, only small sections of the lagoon are made aerobic, e.g. less than about 5% of the surface area of the lagoon, preferably less than about 2% of the surface area. The circulator at the inlet end, e.g. the first CSTR, separates solids and keeps them below the thermocline. The circulator at the outlet end, e.g. the second CSTR, oxygenates the water returning to the flush tank.

EXAMPLE 5

Two 4 acre lagoons, each 7 feet deep, denoted by reference numbers 230 and 231, were used to pretreat waste from a poultry processing plant. The lagoons processed a BOD of 600 mg/l and a flow rate of 600,000 gal/day. There were 9 surface aerators, denoted by reference numeral 571, in lagoon 230 but none in lagoon 231.

Operating conditions with this arrangement included an effluent having 100 to 150 mg/l BOD, 75% of the lagoons were sludge, the wastewater color was pink, the odor was unpleasant, the influent and effluent total Kjeldahl nitrogen (TKN) was 70 mg/l. The standard derivation of 21 sludge measuring points under these conditions summarized in Table 2.

TABLE 2

| Duration, Months | Standard Deviation, Sludge |
| --- | --- |
| 0 | 1.00 |
| 2 | 0.60 |
| 4 | 0.55 |
| 6 | — |

Table 1 establishes the movement of sludge in the lagoon. A declining standard deviation points out the reduction in the angle of repose of the sludge. Sludge that does not easily settle forms peaks, e.g. sand bars, and valleys. Peaks and valleys effectuate channeling and short circuiting. Short circuiting prevents all water from being treated for the same duration of time. This absence of uniform hydraulic retention time is highly undesirable. (It is noted that the 6 month data point was to be taken after the filing date of this disclosure.)

Figure 25:
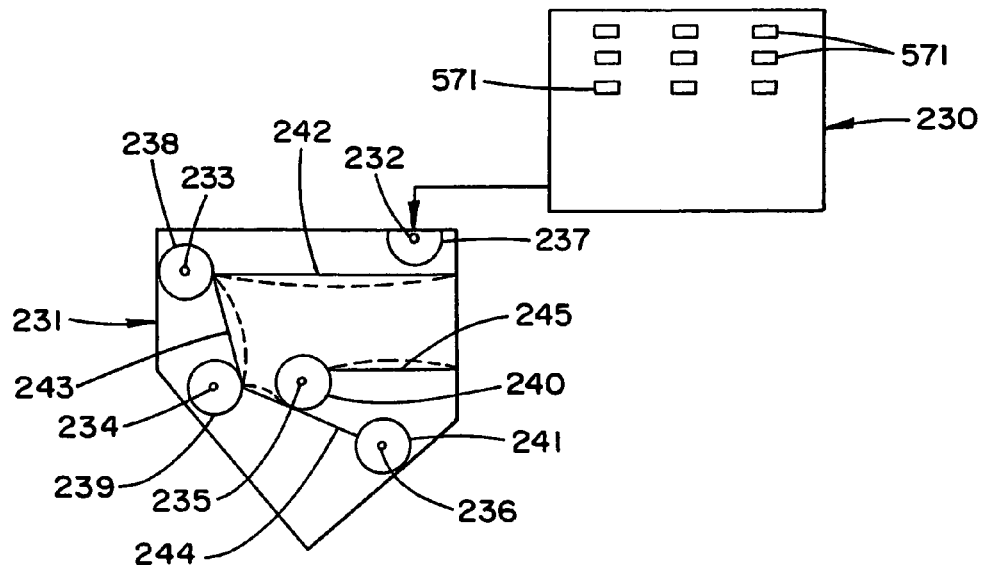
FIG. 25 is a schematic representation of a operation of a 2-lagoon wastewater operation in accordance with Example 5.

In accordance with the present invention five floating fluid circulators were introduced into the downstream lagoon, lagoon 231. Each of circulators 232, 233, 234, 235 and 236 were surrounded by 360° circumferential wave reflecting booms 237, 238, 239, 240 and 241, respectively. Curtains 242, 243, 244 and 245 were installed in lagoon 231 to provide four flow channels in series. Curtains, as used herein, are wave reflecting booms which extend from surface to bottom. This arrangement is depicted in FIG. 25.

The curtains as originally installed were straight. This is illustrated in FIG. 25 by the solid lines. However, immediately after start-up, the curtains bowed outward due to water pressure build-up. This bowing is illustrated by the dotted lines. It is noted that a portion of curtain 244 includes no dotted line since in that portion of lagoon 231 water pressure on either side of the curtain was in balance.

Four months after start-up sludge was reduced by 24.4% in lagoon 231. This reduction occurred uniformly with sludge deposits in the lagoon reduced at a rate of 1.4 inches per month.

A comparison of organism concentration within the reflective booms to corresponding water outside of and upstream of the wave reflective booms demonstrated that there was no difference in aerobic and facultative bacteria concentration inside and outside the reflective booms. The anaerobic count tripled.

ANALYSIS OF EXAMPLE 5

Bowing of curtains 242, 243, 244 and 245 after circulator introduction is caused by the fact that the circulators create a waterfall of reflected water which is a barrier to crossflow even though the reflective wave boom did not reach the bottom of the lagoon. The existence of back pressure establishes that the waterfall retained its flow integrity to the bottom of the lagoon. Influent entered the enclosed volume at the upstream edge of the sludge/water interface; effluent left at the downstream edge of the sludge/water interface and under the downstream thermocline.

The higher anaerobic microbe count substantiates the premise that the process of the present invention encourages anaerobic bacteria growth. This effect is substantiated by sludge reduction which is consistent with downstream settlement of the increased anaerobic count. The TKN was little changed because there were no measurable nitrification bacteria in lagoon 231. The BOD of the effluent was also unchanged. However, the reason for this was because increased BOD oxidation in the channels was offset by the increased BOD created by digesting sludge.

EXAMPLE 6

A manure lagoon at a dairy used manure to make compost. After a circulator, surrounded by a reflective curtain, was installed in the lagoon in accordance with the present invention, the time to generate a suitable compost was reduced by 25%. There was a 5 log reduction in undesirable E-coli concentration of the lagoon. Moreover, active biological mass was increased by an order of magnitude over activity in the absence of the circulator system.

The water from the lagoon was utilized in compost manufacture. Concentration of protozoa in the compost made from lagoon-recovered circulated water in accordance with the present invention was two orders of magnitude greater than compost made from lagoon-recovered non-circulated water.

ANALYSIS OF EXAMPLE 6

As indicated supra, mixing zones encourage bacterial growth. Non-pathogenic bacteria grow more rapidly than pathogenic bacteria. Thus, the growth of non-pathogenic bacteria caused a decrease in pathogenic population especially in view of their destruction by heterotrophic bacteria.

Protozoa feed on bacteria. The introduction of high bacteria content water into compost leads to the growth of protozoa population. In turn, high microbial activity, as manifested by increased protozoa population, accelerated the composting process.

EXAMPLE 7

A notched impeller is designed by conventionally cutting the top half at a 26 inch template to 24.25 inches. The bottom half, normally 24.25 inches, is cut down to 24 inches. The impeller is positioned such that the 24 inch section is in the draft tube.

Figure 26A:
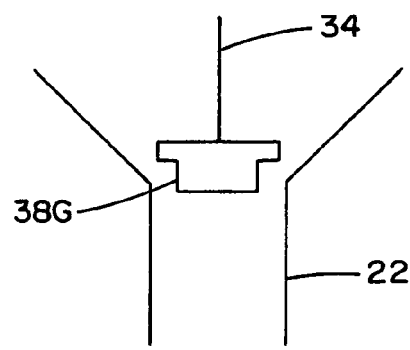
FIGS. 26A and 26B are schematic representations of modifications of the impeller design as set forth in Example 7.
Figure 26B:
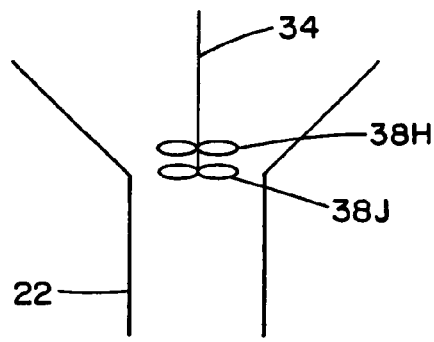

In this design, illustrated in FIG. 26, the impeller denoted by reference numeral 38G, connected to drive shaft 34, is disposed partially in draft tube 22 and partially above it. It is noted that the terms "intake tube" and "draft tube" are synonymous.

When impeller 28G replaces conventional impeller 38 on the same circulator, operating in the same lagoon environment, the maximum dissolved oxygen (DO) is increased by 0.2 mg/l in the aerate mode.

When two impellers 28H and 28J are attached to drive shaft 38, the same circulator, operating in the same lagoon environment, provides a maximum DO, operating in the aerate mode, that is increased by 0.1 mg/l, compared to the use of a single impeller

EXAMPLE 8

Figure 27A:
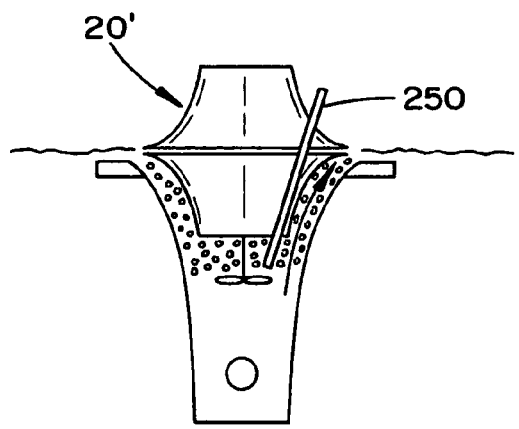
FIGS. 27A and 27B are schematic representations of modifications of floating fluid circulators, as set forth in Examples 8 and 9 respectively.

A circulator 20' within the contemplation of the present invention is modified to provide outside air in fluid communication with the annular space, e.g. about the drive shaft/impeller intersection. Specifically, a 4 inch hole is drilled into the top surface of the circulator 20' and a conduit 250 is introduced into that hole. The conduit 250 is welded to the circulator 20'. This arrangement is illustrated in FIG. 27A. Therein, the conduit 250, e.g. a pipe, a tube or the like, is disposed in communication with the atmosphere. When the impeller is in aerate mode the impeller creates a pressure less than atmospheric, drawing air from the atmosphere, further amplifying the lower density of the sub-surface water.

To test this concept circulator 20' of FIG. 27A is compared by first operating circulator 20' as designed. Thereafter, circulator 20' is operated with conduit 250 plugged. When the device is plugged the maximum DO is reduced by more than 3 mg/l.

EXAMPLE 9

Figure 27B:
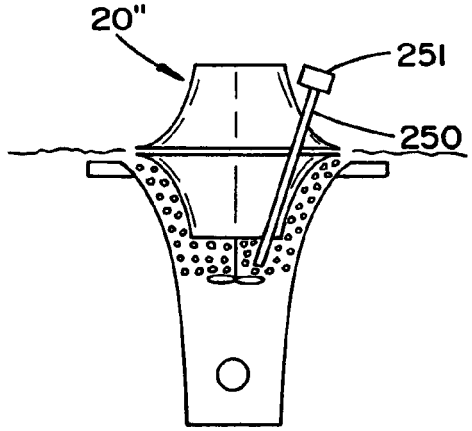

Circulator 20", otherwise identical to the design of circulator 20' of Example 8, is modified by adding a blower, e.g. 0.5 hp., in fluid communication with conduit 250. This arrangement is illustrated in FIG. 27B wherein blower 251 is provided. In this case the same comparison as that conducted in Example 8 results in a maximum DO increase of more than 5 mg/l.

EXAMPLE 10

A submersible pump 252 was disposed on a floating platform 253 and disposed adjacent to circulator 20', as defined in Example 8. Fluid was drawn by pump 252, through conduit 254 from the lagoon in which the pump was disposed and discharged into conduit 255 which conveyed the fluid to a pair of venturis, venturis 256 and 257. Venturis 256 and 257 were 2 inch Mazzei venturis manufactured by Mazzei Injector, Inc. The operation of the venturis is set forth in U.S. Pat. No. 5,772,866, incorporated herein by reference. The discharge from these venturis impinged each other. The resultant impingement stream exited through conduit 258 in communication with the circulator 20'.

Figure 28:
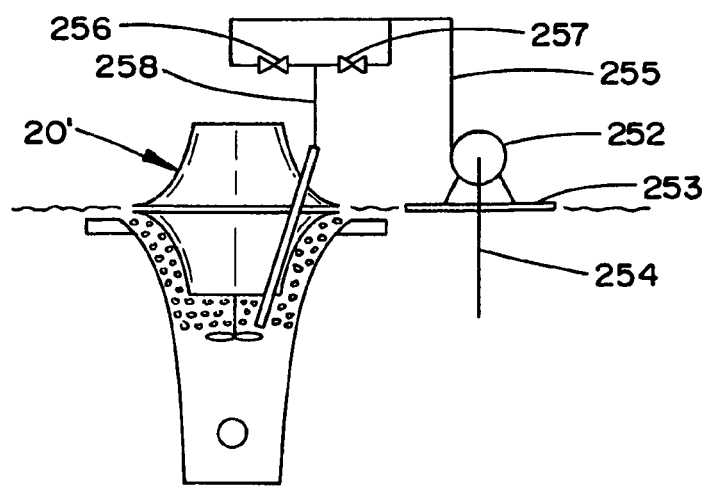
FIG. 28 is a schematic representation of the operation of Example 10.

Using this arrangement, depicted in FIG. 28, a maximum sustainable DO of 15 mg/l was obtained. This was 7 mg/l in excess of the oxygen-water saturation value. The DO was essentially constant at a circumference of about 250 feet from the circulator and a depth of 3 feet. This data was generated in the mix mode. The complete data generated by this example is graphically represented in FIG. 29.

ANALYSIS OF EXAMPLES 8-10

The circulator embodiment of Example 8 amplifies the effect of the circulator of the present invention in aerate mode by increasing even further the continuous intimate contact of air and water. The circulator 20' permits the presence of air at all times. Without this expedient air is available only when the upper frusto-conical surface of the circulator is out of water. The continuous availability of air increases the concentration of dissolved oxygen.

This effect is magnified in the circulator 20" of Example 9. When air is blown into the low pressure zone still more air is mixed with water further reducing the fluid density above the impeller. Flow through the circulator further increases due to the greater driving force provided by the greater density difference between water and the air-water fluid above the impeller.

The embodiment of Example 10 further emphasizes this effect. That is, the air-water mixture exiting from conduit 258 adds a large volume of water with its high DO content, e.g. 100 gpm. This addition adds further back pressure to the annular space and keeps the density low. With this substantially constant density difference driving force, flow through the circulator is more stable which is manifested by reduced circulator bobbing. The large volume of intimately mixed gas increases the volume of DO.

The impingement mixer, e.g. the venturis, also provides a uniform pumpable low density fluid. The impeller, remaining in mix mode, pushes microbubbles and water horizontally along the surface. Aerobic microbial activity begins to consume the oxygen present, slightly increasing the specific gravity of the gas-water mixture. As the increasingly dense fluid moves away from the circulator, it begins to sink, falling to the thermocline. Eventually, the intake demands of the circulator bring the now denser fluid back to the horizontal intake openings of the circulator. All the oxygen is not consumed, however, so that the entire water column above the thermocline is supersaturated with dissolved oxygen. This supersaturation is the result of the continued presence of oxygen microbubbles.

Figure 29:
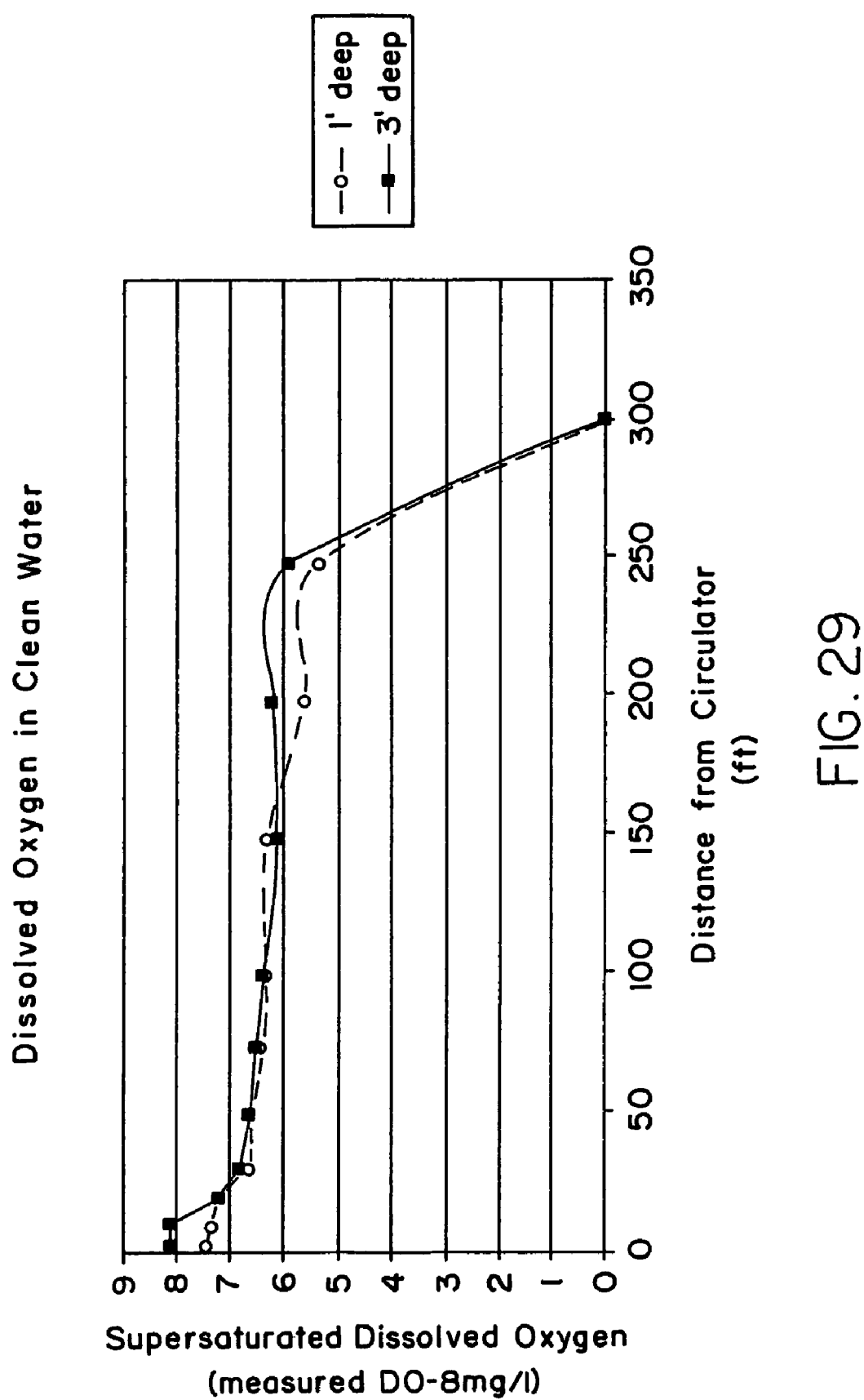
FIG. 29 is a graph indicating dissolved oxygen as a function of distance from the floating fluid circulator in Example 10.

This is borne out in FIG. 29. FIG. 29 establishes an initial higher DO up to 10 feet from the circulator. This increase is due to the presence of large bubbles effervescing out of the water column. The change in water column color 250 feet away from the circulator is due to light reflecting from the microbubbles.

EXAMPLE 11

Three floating fluid circulators were installed in series in a 4-acre lagoon and operated in the aerate mode. The BOD was measured. The positioning of the circulators was reconfigured so that the fluid in lagoon 260 was required to flow in a tortuous path. Again, the BOD was measured. The rate of BOD reduction, $(BOD_{effluent}-BOD_{influent})/BOD_{influent}$, was increased by 15% when a non-tortuous path was employed.

Figure 30:
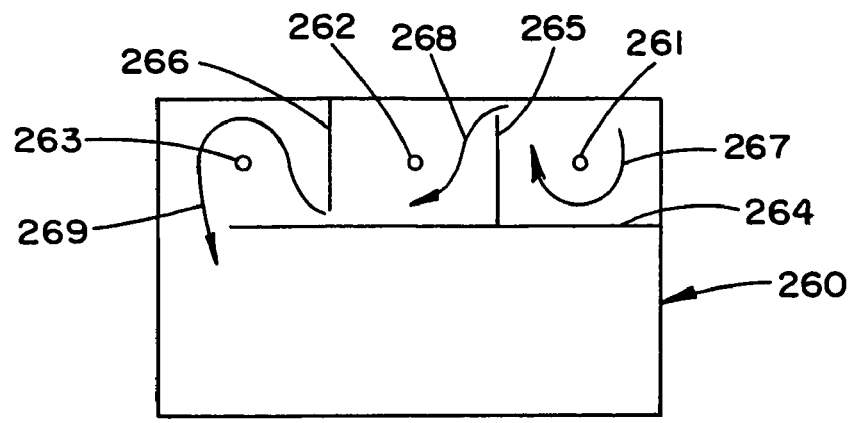
FIG. 30 is a schematic representation of the configuration of circulators providing a tortuous path in accordance with Example 11.
Figure 31:
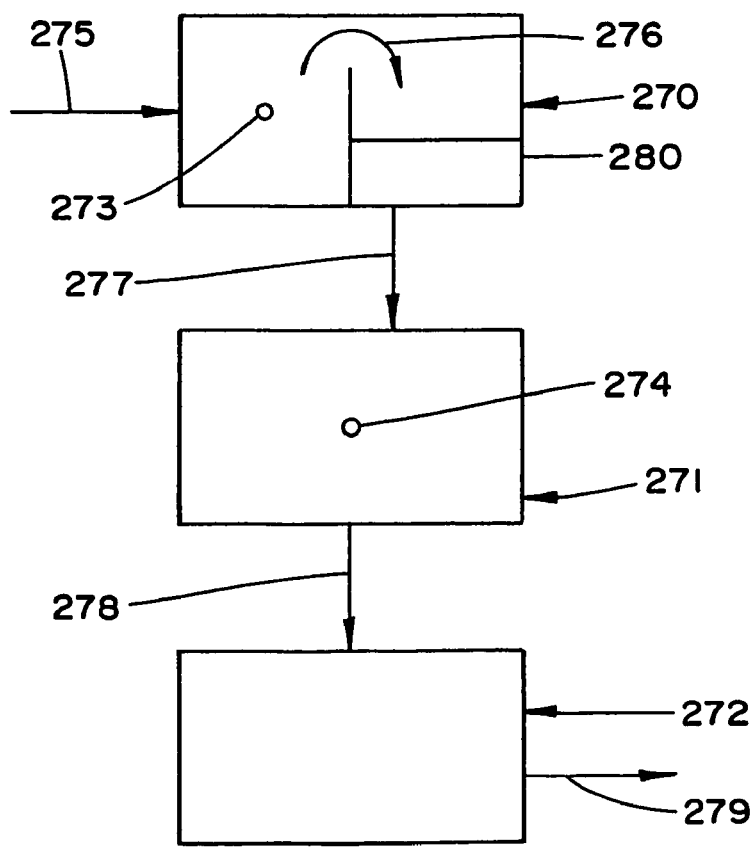
FIG. 31 is a schematic representation of the lagoon system of Example 12.
Figure 32:
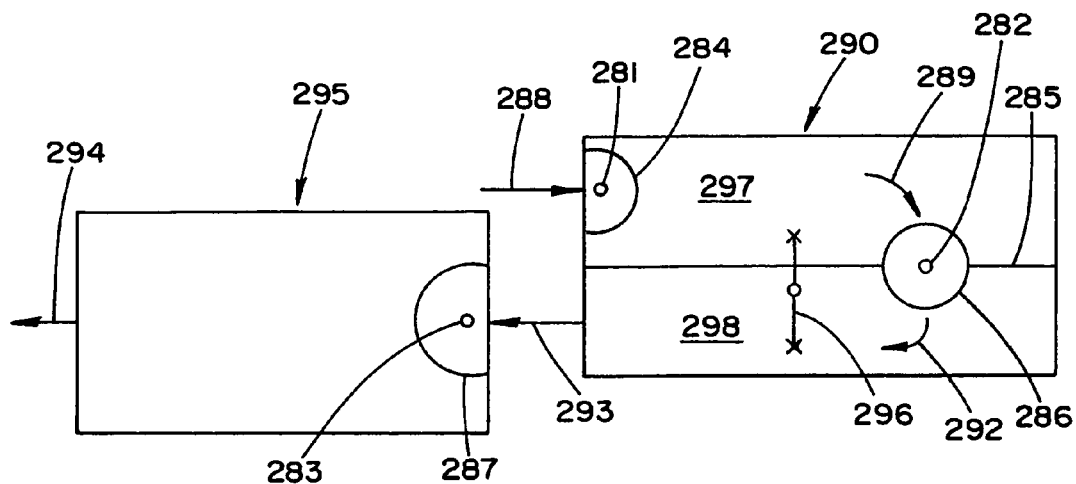
FIG. 32 is a schematic representation of the lagoon system of Example 13.
Figure 34:
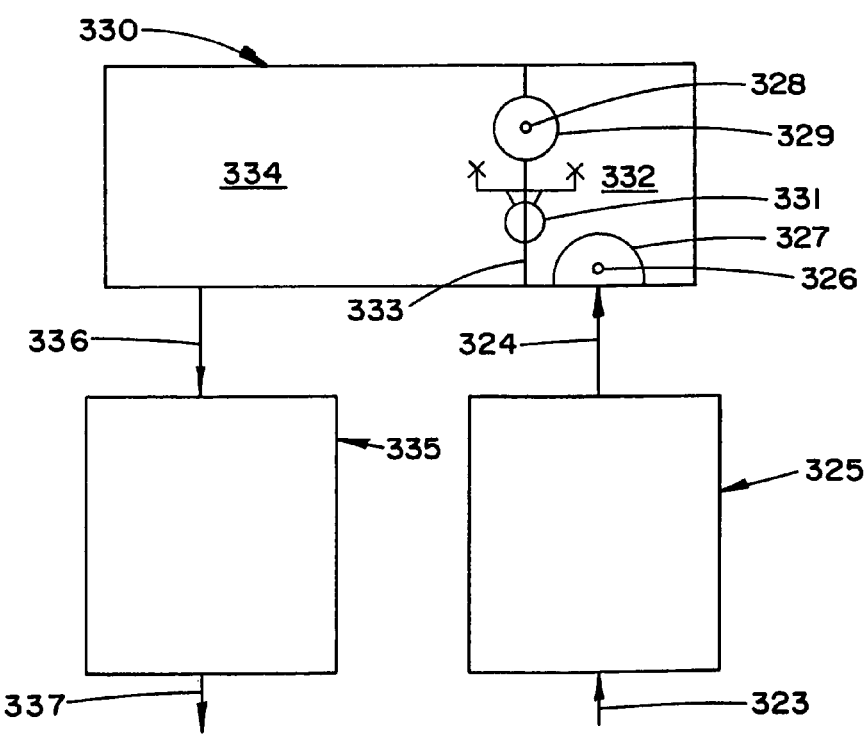
FIG. 34 is a schematic representation of the lagoon system of Example 15.

The tortuous path utilized is depicted in FIG. 30 wherein circulators 261, 262 and 263 were disposed with curtain wave deflectors 264, 265 and 265 in lagoon 260 to effectuate the tortuous path illustrated by arrows 267, 268 and 269.

ANALYSIS OF EXAMPLE 11

BOD reduction rate was increased employing a nontortuous path. The use of three circulators encircled by three wave reflecting booms provide doughnut shaped surface zones which are non-tortuous. When a tortuous path is utilized the surface zone is sinesoidal. The sinesoidal shape encompasses a greater fluid volume than the sum of the fluid volume in three EQs defined by the "doughnuts" formed by circulators and the cylindrical booms. Therefore, the sinusoidal orientation permits more time for biological activity to occur at a given flow rate. However, the oxic zone is broken up by the "escape route," reducing but not destroying the efficiency of the system.

EXAMPLE 12

A municipal lagoon system for treatment of waste discharged from about 150 homes utilized a three lagoon in series configuration. In operation, waste 275 was introduced into the first lagoon 270. Lagoon 270 was provided with a linear wave deflection boom 280 which separated lagoon 270 into approximately two equal halves. A circulator 273 was disposed in the upstream half of lagoon 270 into which waste 275 is introduced. Waste flowed from the upstream half to the downstream half and into the second lagoon, lagoon 271, as indicated by arrows 276 and 277, respectively. This flow was encouraged by the design of the boom 280 which did completely reach across the lagoon.

Lagoon 271 was provided with a circulator 274 which, unlike the aerate mode operation of circulator 273, was operated in mix mode. Circulator 274 was situated in the center of lagoon 271. The waste from lagoon 271 flowed downstream into lagoon 272 as indicated by arrow 278. Lagoon 272 was not provided with any circulators and acted as a settling tank from which the waste stream exited as depicted by arrow 279.

The biological oxidation demand (BOD), total Kjeldahl nitrogen (TKN) and total suspended solids (TSS) were measured and all were within acceptable limits. There were no odors emitting from the lagoon system. Sludge levels declined over time compared to an earlier period when no circulators were in use.

ANALYSIS OF EXAMPLE 12

The circulator 273 operating in upstream lagoon 270 created a surface and sub-surface zone. This increased bacterial growth permitted non-odor causing microorganisms to proliferate over malodor-causing microorganisms, such as sulfate-reducing anaerobic bacteria (SRB). These malodor forms increased in the sub-surface zone and were dispersed downstream where they digested sludge in situ. Carbonaceous BOD (cBOD) was reduced in lagoon 270 which, in turn, reduced the carbon load in lagoon 271. The waves generated by circulator 274 therein, moreover, increased oxygen availability to a DO level of more than 2 mg/l. This oxygen level permitted ammonia oxidation in that middle lagoon.

It is noted that no odor was emitted from the lagoons because no turnover of lagoons 270 and 271 occured since the circulators in those lagoons reduced density difference therein. Although downstream lagoon 272 was not provided with any circulators, and thus turnover of that lagoon occurred in the spring and fall, that turnover did not result in odor emission since the stream 278 from lagoon 271 did not supply lagoon 272 with SRBs insofar they were eliminated in lagoon 271 by the operation of circulator 274.

Because suspended solids were discharged below the thermocline in lagoon 290, the surface water above the thermocline was clearer. This permitted light to penetrate into the water allowing algae photosynthesis of oxygen. The algae-generated oxygen oxidized the nitrogen in the lagoon to produce nitrates. The circulator in downstream lagoon 295 kept the surface fluid in motion. This surface motion inhibited filamentous, floating algae growth thus avoiding a notorious source of unwanted suspended solids.

EXAMPLE 13

A municipal lagoon system is used to treat waste. The system included two lagoons in series. The upstream lagoon 290 is divided into two parallel sections, first section 297 and second section 298, by a dividing curtain 285. Municipal waste 288 is introduced into one of the two sections. A floating fluid circulator 281 surrounded by a half-round wave reflecting boom 284 is installed at the inlet where waste 288 is introduced into lagoon 290. The waste stream downstream of this circulator, waste stream 289, next contacts a second circulator, circulator 282, about which is a round floating wave reflecting boom 286. Circulator 282 and boom 286 are built into the dividing curtain 285. The waste stream 292, downstream of circulator 282, moves to the outlet and into the inlet 293 of a second, downstream lagoon, lagoon 295. Lagoon 290, it should be emphasized, includes a floating pump 296. Pump 296 returns water from the surface zone of second section 298 back into first section 297 and supplies 4 pairs of impingement aerators of the type described in Example 10.

The stream 293 entering downstream lagoon 295 from lagoon 290 immediately encounters third circulator 283 surrounded by a circumferential wave reflector 278. The remainder of lagoon 295 serves as a settling lagoon.

Waste 294 leaving second lagoon 295 easily meets BOD, TKN and TSS limits.

ANALYSIS OF EXAMPLE 13

Two strategies utilized in the waste management industry are combined in this waste treatment example. Downstream acclimated microbes are reintroduced upstream so that acclimated microbes, which better digest sludge than unacclimated microbes, operated over the whole of the lagoon by the expedient of recycling. The procedure utilized in Example 13 also meets a second strategy used in lagoon systems. That strategy is to increase holding time to permit microbes to acclimate in situ. This too is accomplished in Example 13 by sectioning lagoon 290 into two. This increases the duration of waste treatment therein. Increased oxygen availability, a major aspect of the present invention, additionally satisfies good waste management practice. The circulators serve to provide this function.

EXAMPLE 14

A very large urban waste lagoon system encompassing three lagoons, each 14 feet deep and totaling 25 acres, utilizes the present invention. In the first upstream lagoon, lagoon 300, four rows of floating fluid circulators enclosed by circular reflective booms, rows 302, 303, 304 and 305, are disposed between four rows of floating fluid circulators with attached aerators, rows 306, 307, 308 and 309.

The middle of the three lagoons in series, lagoon 310, have an identical configuration, a row of the circulators enclosed by circular booms followed by a downstream row of four circulators with attached aerators. The reflector-boom rows are rows 312, 313, 314 and 315. The reflector-aerator rows are rows 316, 317, 318 and 319.

The downstream lagoon, lagoon 320 are, for the most part, a settling pond, provided as it is with only one row 322 of three circulators surrounded by circular booms.

Each row of three parallel circulators is surrounded by circular boom including a surface to bottom curtain which extends from side berm to side berm. The curtain connects the wave reflecting booms. As such, traverse water flow is blocked. All flow is thus defined by enclosed mixing zones. As stated earlier, the waterfall formed by reflected flow creates resistance to crossflow and equalizes flow between the three circulators. Water is expelled equally in a radially direction at the downstream end of the reflective booms, at the sludge/water interface.

The rows of circulators provided with impingement aerators fill the surface surrounding the circulator with microbubbles. Nitrification bacteria thrive in this high dissolved oxygen environment.

Figure 33:
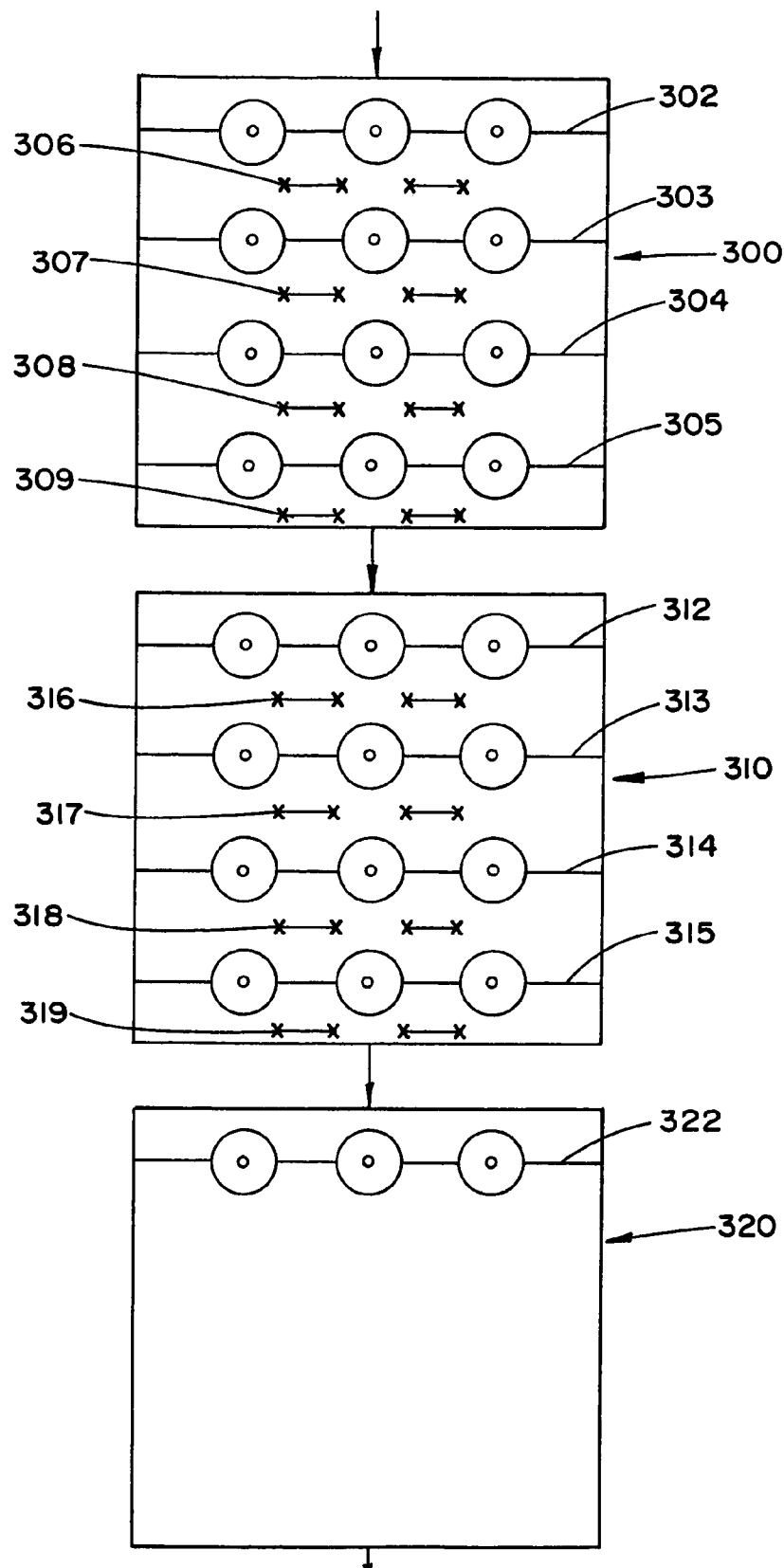
FIG. 33 is a schematic representation of the lagoon system of Example 14.
Figure 35:
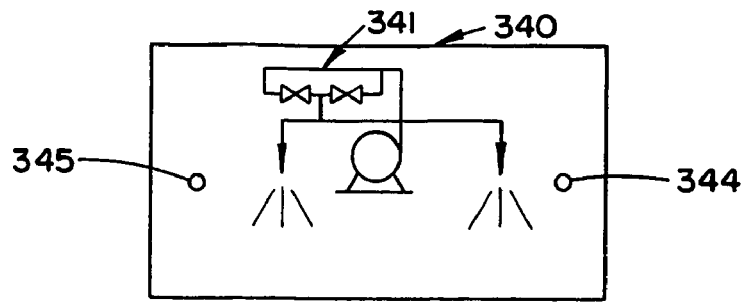
FIG. 35 is a schematic representation of the run-off pond of Example 16.

The satisfactory waste disposal effectuated by this system provides a maximum DO of 7 mg/l utilizing the aforementioned circulators and aerators having a total horsepower of 337 hp. Before the installation of this system, illustrated in FIG. 33, waste was treated in this lagoon system in which the first upstream lagoon was partially mixed with prior art aerators, whose total energy demand was 4,000 hp. Thus, the system of this example provides as effective a waste treatment procedure, utilizing 93% less energy, than the earlier prior art process.

ANALYSIS OF EXAMPLE 14

The dramatic reduction in energy to provide water disposal utilizing the process of the present invention is due to the disproportionate DO provided by the wave action initiated by the floating fluid circulators which create surface area for oxygen dissolution and the disposition of microbubbles. Partially digested solids are deposited below the thermocline where they are digested anaerobically. Thus, much of former aerobic-load is physically removed to an anerobic zone for remediation. Anaerobic remediation is more cost effective than aerobic remediation. In Example 14, the increase in anaerobic count offsets the slower kinetics, allowing achievement of remediation goals at lower cost. Oxygen dissolution by the impingement aerators, which supplemented oxygen supplied by the wave action of the circulators, supplied high DO fluids to the lagoons which aided nitrification bacteria activity.

An important contribution to energy reduction is the partition of the waste in the waste treatment lagoon into three layers: an upper aerobic layer above the lagoon thermocline; an intermediate BOD layer between the thermocline and the sludge layer; and a bottom sludge layer. This desirable separation is effectuated by the bottom discharge from the CSTR. Hard to settle solids are introduced into the lagoon below the thermocline. BOD waste above the thermocline must remediate with oxygen. BOD waste below the thermocline, the mass of BOD waste that must be oxidized with oxygen, is reduced. In this manner total oxygen demand in the lagoon is decreased compared to the waste systems of the prior art. In those systems solids are introduced into the lagoon at or slightly below the surface. The solids must then settle through the thermocline into the sludge layer increasing the oxygen requirement which could only be provided at high energy expense.

The prior art process utilized previously, the partial mix lagoon process, injected excessive volumes of oxygen into the upstream lagoon. However, the term "excessive" is the operative word. Aerobic microbes can only grow at a finite rate. The shortage of such microbes resulted in a goodly percentage of unused oxygen which was lost to the atmosphere.

EXAMPLE 15

A waste treatment lagoon system is used only in summertime. This system is designed to overcome filamentous algae growth which exceeds total suspended solids (TSS) limits. To overcome this problem the middle lagoon of a three lagoon in series system is redesigned. Specifically, waste 323 is introduced into upstream lagoon 325 wherein waste is untreated. The waste stream 324 leaving lagoon 325 enters middle lagoon 330, a 9-acre lagoon. Therein, a first floating fluid circulator 326 and a surrounding reflecting wave boom 327 is installed at the inlet and a second floating fluid circulator 328, about which a surrounding wave boom 329 is disposed, is provided as part of a curtain 333 separating the lagoon into upstream section 332 and downstream section 334. A pump 331 conveys water upstream from downstream section 334 to upstream section 332 to recycle fully conditioned microbes back to the inlet and feed impinging aerators. The water 336 exiting downstream section 334 is conveyed to downstream lagoon 335, which acts as a settling tank.

With this configuration the algae sank and was destroyed as sludge. Testing of the wastewater 337 exiting lagoon 337 established that the water was within TSS limits.

ANALYSIS OF EXAMPLE 15

Algae, which are difficult to eradicate, are reduced by the addition of circulators of the present invention in combination with microbubble generators. Algae and water have approximately the same density. The aerator/circulator combinations, which are continuously operated, reduces the density to a distance of about 250 feet. This causes the algae to sink to the thermocline bottom where it is digested in situ. The reduction of the algae results in a reduction of TSS levels.

EXAMPLE 16

A 3 acre, 7 foot deep run-off pond 340 stores storm water and additional materials entrained by water from nearby houses and a golf course. Pond 340 gives off offensive odors and is filled with algae.

To overcome this problem, two circulators, circulators 344 and 345, are introduced into pond 340 at either end. In addition, a venturi-aerator, attached to a 10-hp pump, is installed in the middle of the pond to recirculate and aerate the pond water.

This operation results in algae disappearance from the pond and the elimination of malodor emitting therefrom.

ANALYSIS OF EXAMPLE 16

The disposition of two circulators at opposite ends of the pond and a venturi aerator therebetween forces the stagnant pond to flow. Algae do not thrive in flowing water. Moreover, the aerator and circulators reduces the specific gravity of the water causing the algae to sink. The higher DO levels imparted by these expedients oxidizes the malodor causing agents.

EXAMPLE 17

A two-lagoon system was operated by a municipality. Unfortunately, both lagoons were foul; floating balls of fat were visible about every 3 feet and swimming turtles therein left green wakes.

Figure 36:
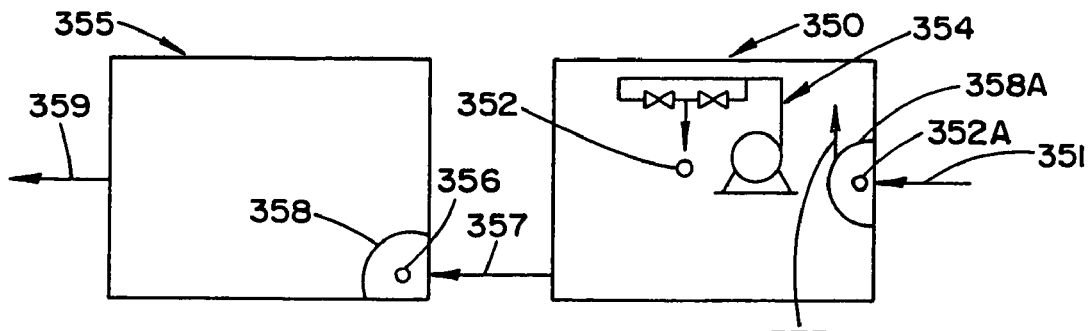
FIG. 36 is a schematic representation of the lagoon system of Example 17.
Figure 37:
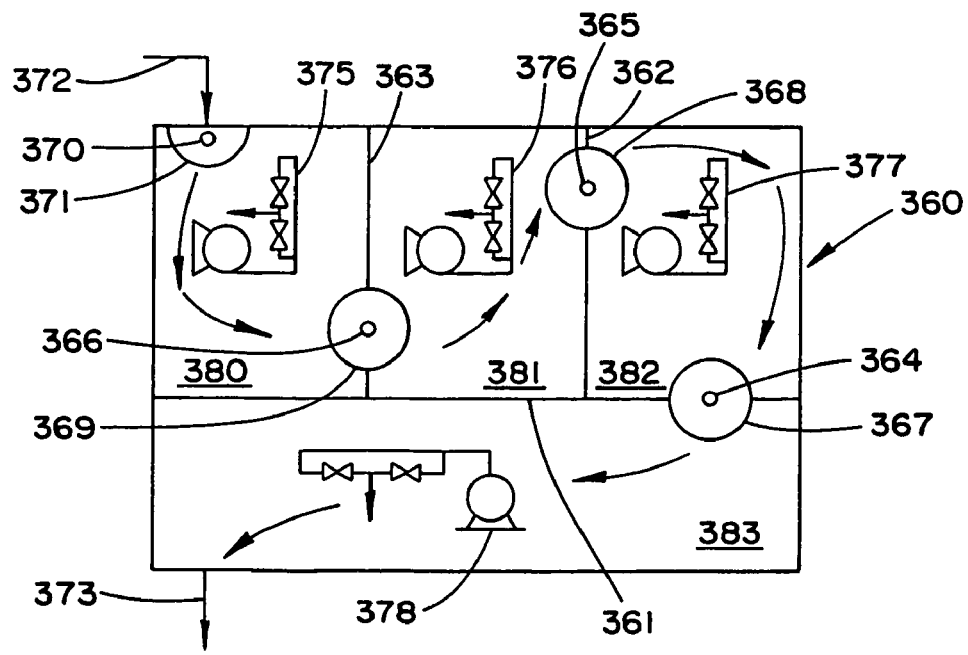
FIG. 37 is a schematic representation of the upstream lagoon of Example 18.

To rescue this system a circulator in aerate mode, circulator 352A, with a surrounding wave reflecting boom/curtain 358A, was disposed about a submerged inlet for a waste stream 351 into first lagoon 350. The boom/curtain 358A constituted a floating wave reflecting boom (about 25%) and the remainder, about 75% of the surrounding wave reflecting boom/curtain 358A, was a surrounding curtain. The boom/curtain 358A was disposed such that fluid egressing from this inlet equalization zone was aimed at the upper right corner of lagoon 350, as illustrated by arrow 573 in FIG. 36. This resulted in presenting that flow with a tortuous path back towards the exiting stream 357. A floating fluid circulator 352 was disposed in the middle of lagoon 350, adjacent to an impingement aerator, generally indicated at 354. In addition, a second floating fluid circulator 356 was disposed at the inlet of lagoon 355, disposed downstream of lagoon 350, circulator 356 was surrounded by a floating boom and a floating silt curtain 358 to prevent water from immediately escaping to the outlet 359 of lagoon 355.

After only 4 days of operation of this system clear water depth increased from 1 inch to 1.5 feet, the balls of fat disappeared and the malodor was gone. After 10 days of operation hard sludge percolated off the lagoon bottom; after 3 weeks lagoon 350 was free of floating algae. After 6 weeks both lagoons met permit requirements.

ANALYSIS OF EXAMPLE 17

The expedients introduced into the lagoons increased microbial activity, which, in turn, digested the balls of fat and the hard sludge. The density of the water in lagoon 350 was reduced by the combination of the venturi aerator and the circulator permitting the sinking and subsequent elimination of the algae.

It is noted that the longer period required for remediation of lagoon 355 was due to lesser reduction of the water density therein. Thus, rapid settling did not occur. This was due to the use of only one circulator and boom disposed in an extreme corner of the lagoon.

EXAMPLE 18

The lagoon system of Example 5 services a poultry processing facility. Example 5 describes the remediation of downstream lagoon 231. After the completion of the treatment of that lagoon, upstream lagoon 360 is treated. To save cost, circulators, wave reflecting booms and aerators are redeployed to lagoon 360.

Four channels, channels 380, 381, 382 and 383, are constructed utilizing linear wave reflecting booms, denoted by reference numerals 361, 362 and 363. Three circulators, surrounded by circular wave reflecting booms 367, 368 and 369, respectively, are situated along the linear wave reflecting booms. A fourth circulator, circulator 370, surrounded by semicircular boom 371, is disposed at the inlet where waste stream 372 is introduced into lagoon 360. Four pump-venturi aerators, aerators 375, 376, 377 and 378, are disposed in lagoon 370, one in each of the four channels created by the linear booms. The waste stream 373 exits lagoon 370 and enters lagoon 231.

As a result of this treatment scheme sludge in lagoon 360 is reduced, malodor is eliminated and the color of the water in the lagoon goes from pink to a brown-green color. After 6 months ammonia concentration is reduced by almost 75%.

ANALYSIS OF EXAMPLE 18

The first three channels, channels 380, 381 and 382, reduces cBOD because of oxygen addition in these sections which is effectuated by the action of the aerators and circulators. The pH, moreover, increases to an alkaline 7.8. Higher alkalinity, although essential for nitrification, does not necessarily lead to that result. In addition to alkalinity, nitrification requires a requisite population of nitrifying bacteria. Industrial lagoons, of which this is one, do not always have a diverse microbial population. Lagoon 360 has few nitrification bacteria. Thus, ammonia levels are initially unchanged. Over time, however, improving conditions for nitrification bacteria leads to their growth and the requisite nitrification bacteria population comes into existence. At that time the bacteria in channel 383 oxidizes the ammonia. It is emphasized that activity in channels 380, 381 and 382 oxidizes carbon waste.

The operation of downstream lagoon 231 completes the waste disposal process by denitrifying the low ammonia-high nitrification waste stream 373 that exited lagoon 360.

EXAMPLE 19

A municipal treatment system processed 6.5 million gallons of waste per day. This was accomplished by processing the waste equally through 5 lagoon trains. Each train included four lagoons in series. Thus, there were a total of 20 lagoons in the treatment system.

Figure 38:
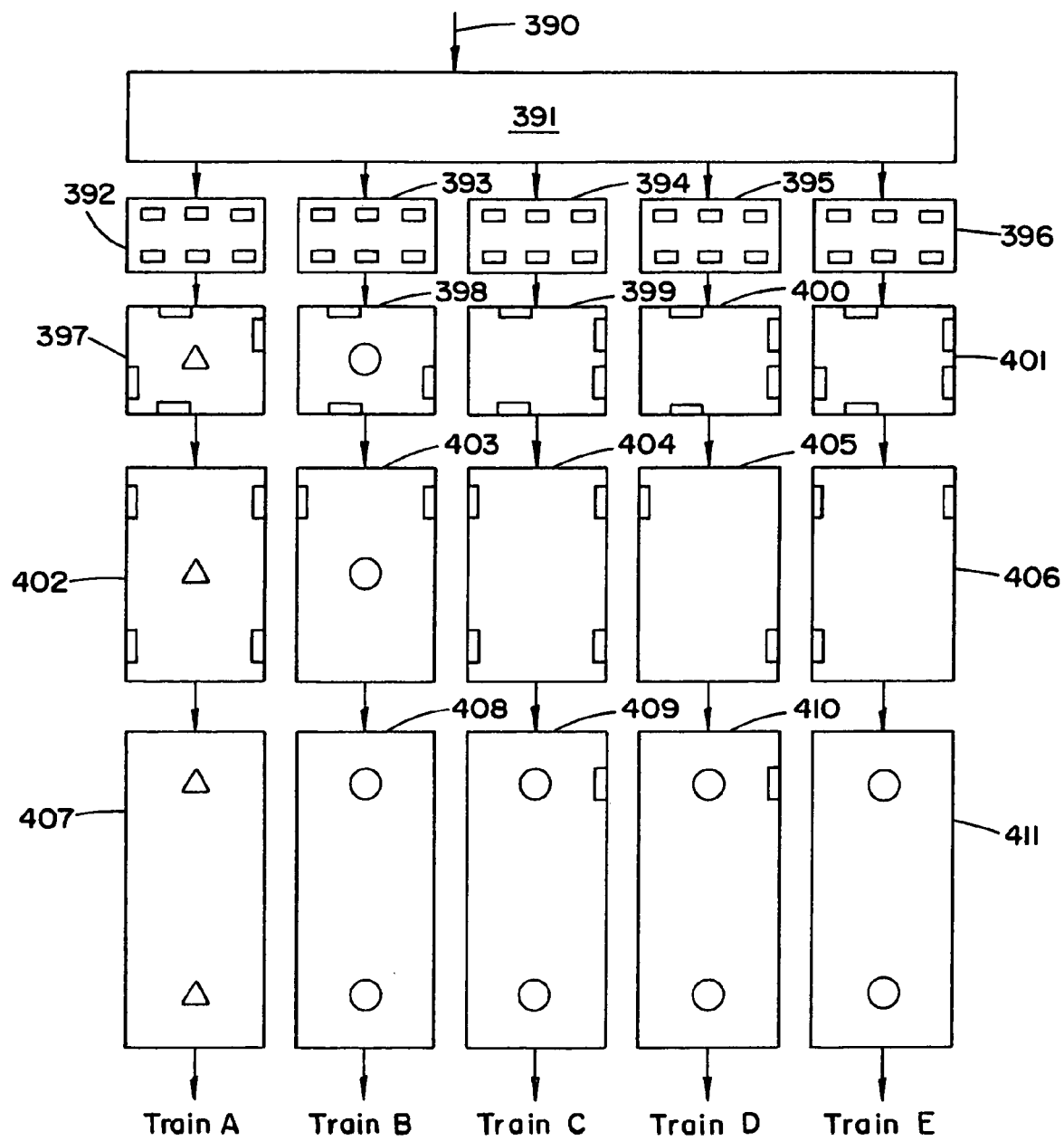
FIG. 38 is a schematic representation of the municipal treatment system of Example 19.

The influent 390 was equalized in equalization tank 391 and fed uniformly into each train. Thus, equal volume of waste were fed into upstream lagoons 392, 393, 394, 395 and 396 of the five trains. Each of these upstream lagoons, which were each 150 feet long, were provided with six prior art rotary aerators. These aerators floated with only a portion submerged beneath the water subsurface. Their rotating motion provided fluid flow while their droplet formation dissolved oxygen therein. The power expenditure of these aerators, denoted in FIG. 38 by rectangles, was 360 hp in each upstream lagoon per day. The waste exiting from each upstream lagoon was conveyed downstream to the second downstream lagoon in each train. Thus waste from upstream lagoons 392, 393, 394, 395 and 396 were conveyed to second downstream lagoons 397, 398, 399, 400 and 401, respectively. Each of these lagoons were provided with three to five of the same prior art aerators, denoted by rectangles, employed in the upstream lagoons. Such aerators, it should be appreciated are also known as brush aerators. The left train lagoon, lagoon 397 also included a solar driven circulator, as indicated by the triangle. Solar driven circulators are defined in U.S. Pat. No. 6,439,853, incorporated herein by reference. The second train second downstream lagoon, lagoon 398, included a floating fluid circulator of the present invention, denoted by a circle. The third downstream lagoons: lagoons 402, 403, 404, 405 and 406, similarly received the waste from the upstream lagoon in the same train. Again, the left train lagoon, lagoon 402, was equipped with a solar driven circulator and the second train, adjoining lagoon 403, was provided with a floating fluid circulator of the present invention. Otherwise, each third downstream lagoon included 2 to 4 prior art aerators. Finally, fourth downstream lagoons 407, 408, 409, 410 and 411, fed with waste from the upstream lagoon of the same train, were each provided with two floating fluid circulators of the present invention except for the left hand train lagoon, lagoon 407, in which two solar powered circulators were disposed.

The second downstream set of 5 lagoons were each 300 feet long. The third downstream set of lagoons were each 600 feet long. The fourth and most downstream lagoons were each 1200 feet long. It is thus seen that each set of downstream lagoons in the five train system doubled in size, since each of the twenty lagoons were 400 feet wide.

The waste streams exiting each of the downstream lagoons, as well as the streams flowing into the lagoons from equalization tank 391, were analyzed. Additionally, the power expenditure in each of the lagoons as well as the individual power requirements of each brush rotary aerator, solar power circulator and floating fluid circulator of the present invention was determined.

The results of this analysis for a six-month period are summarized in Table 3, which as follows:

TABLE 3

|  | Avg. BOD | Avg. TSS | Avg. $NH_3$ | Avg Hp |
|---|---|---|---|---|
| Brush Rotary Aerator | 28 | 74 | 6 | 491 |
| Floating Fluid Circulator | 23 | 42 | 20 | 462 |
| Solar Powered Circulator | 75 | 100 | 22 | 495 |

ANALYSIS OF EXAMPLE 19

The prior art brush rotary aerator and solar powered circulator of the prior art required significantly high power requirements in operation than did the floating fluid circulator of the present invention. However, as far as waste treatment effectiveness is concerned, both produced inferior results.

Specifically, the solar-powered circulator was inferior in all three criteria of waste treatment effectiveness compared to the floating fluid circulator. The brush rotary aerator, although superior in nitrogen removal, was inferior in both BOD and TSS reduction compared to the floating fluid circulator.

EXAMPLE 20

Alleys covered with macerated manure at a dairy were flushed with well water. The excess fluid was discharged to a lagoon without solids removal. A floating fluid circulator with a surrounding boom was placed around the lagoon inlet. For about 6 weeks the lagoon waste removal operation improved. After 6 weeks, however, improvement ceased because the boom-enclosed area filled with solids.

ANALYSIS OF EXAMPLE 20

In lagoons provided with floating fluid circulators, the boom-enclosed area functions as a primary clarifier. That is, boom-deflected fluid flows down from the surface to the bottom, then ricochets back to the circulator inlet. This abrupt change in direction centripetally separates solids from liquid. This flow pattern was interrupted by the build-up of solids at a rate in excess of the rate of sludge digestion.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process of increasing biological activity in a waste treatment body of water comprising operating a floating fluid circulator provided with an impeller disposed in an annular space between nested frusto-conical surfaces in a waste treatment body of water.

2. A process in accordance with claim 1, wherein said circulator operates by rotation of said impeller in a unitary rotational direction wherein direction of flow from said annular space cycles.

3. A process in accordance with claim 1, comprising a floating boom at least partially disposed about said circulator defining a boom-enclosed zone, wherein fluid egress from said boom-enclosed zone to the remainder of said body of water is below the thermocline of said body of water.

4. A process in accordance to claim 1, comprising a floating boom at least partially disposed about said circulator defining a boom-enclosed zone, wherein fluid egress from said boom-enclosed zone to the remainder of said body of water is below the waterfall created by said operation of said circulator.

5. A process in accordance with claim 3, wherein said boom completely surrounds said circulator in said body of water.

6. A process in accordance with claim 3, wherein said boom is circular, polygonal or straight.

7. A process in accordance with claim 3, wherein said boom includes a float from which a mesh screen is maintained in extended disposition by a corrosion resistant metal chain connected the bottom of said boom.

8. A process in accordance with claim 7 wherein said boom comprises a plastic pipe float from which a nylon mesh screen is extended which is connected to a stainless or galvanized steel chain.

9. A process in accordance with claim 1, wherein said impeller is notched.

10. A process in accordance with claim 1, wherein said circulator includes a pair of impellers.

11. A process in accordance with claim 2, wherein said circulator comprises a conduit in communication with the atmosphere and said annular space wherein air is drawn to said annular space when said impeller rotates.

12. A process of reducing the specific gravity of a waste treatment body of water comprising operating a floating fluid circulator in communication with a fluid generated from a gas-liquid mixing station, wherein said gas-liquid mixing station is an impingement mixer wherein fluid from said body of water forms streams which impinge each other forming a stream of a two-phase microbubble air-water fluid which stream flows to a circulator provided with an annular space between nested frusto-conical surfaces.

13. A process of treating animal manure in a waste treatment body of water comprising:
  introducing animal manure into a waste stream at the inlet of a waste treatment body of water; and
  operating a first floating fluid circulator provided with a unidirectional rotating impeller disposed in an annular space formed between nested frusto-conical surfaces, said circulator surrounded by a boom, defining a first boom-enclosed zone, at said inlet of said waste treatment body of water; wherein said boom-enclosed zone comprises less than about 5% of the surface area of said waste treatment body of water.

14. A process in accordance with claim 13, wherein said first boom-enclosed zone comprises less than about 2% of the surface area of said waste treatment body of water.

15. A process in accordance with claim 13, comprising operating a second floating fluid circulator provided with a undirectional rotating impeller disposed in an annular space formed between nested frusto-conical surfaces, said circulator surrounded by a boom, defining a second boom-enclosed zone, at said outlet of said waste treatment body of water, wherein said boom-enclosed zone comprises less than about 5% of the surface area of said waste treatment body of water.

16. A process in accordance with claim 15, wherein said second boom-enclosed zone comprises less than about 2% of the surface area of said waste treatment body of water.

17. An aerator device for aerating and/or mixing liquids while arranged in a floating mode in a liquid, said aerator device comprising:
  an upper float chassis having a frusto-conical configuration with a lower wider base thereof being equipped with an annular liquid outflow lip at essentially the surface level of the liquid;
  a sectional diverter for liquid being arranged in a lower portion of said upper float chassis;
  said sectional diverter having a lower diverter portion including diverter means for said liquid, said diverter means having an upper portion fastened to a bottom lip of said upper float chassis and forming a spacing between the bottom lip of said upper float chassis and an upper end of said sectional diverter to facilitate a generally horizontal laminar outward flow through said spacing along the surface of the liquid in which the aerator device floats; and
  motor-driven means being mounted on said upper float chassis connected to a rotatable impeller aspirating liquid into a lower open end of said aerator device for effectuating a flow of said liquid therefrom towards said spacing between the bottom lip and the upper end of said diverter.

18. An aerator device as claimed in claim 17, wherein said sectional diverter has the configuration of an inverted frusto-conical lower float chassis having the upper wider base facing towards said upper float chassis; and an opening structure being arranged at the bottom apex thereof for the intake of liquid into said device.

19. An aerator device as claimed in claim 18, wherein said opening structure comprises a connector for a downwardly extending apertured tube member forming an intake for said liquid into said aerator device.

20. An aerator device as claimed in claim 19, wherein said apertured tube member includes liquid intake ports along surface portions thereof.

21. An aerator device as claimed in claim 20, wherein said apertured tube member has a rigid cylindrical structure.

22. An aerator device as claimed in claim 20, wherein said apertured tube member is a constituted of a flexible structure facilitating an axial accordion-like retraction or expansion thereof.

23. An aerator device as claimed in claim 22, wherein power means effectuate the axial retraction or expansion of said flexible apertured tube member.

24. An aerator device as claimed in claim 17, wherein at least portions of the space between the interior of said upper float chassis frusto-conical surface and said parabolically-curved sectional diverter are filled with a closed-cell polymeric foam material to impart an increased buoyancy and leak resistance to said aerator device.

25. An aerator device as claimed in claim 17, wherein said rotatable impeller possesses a plurality of circumferentially spaced radial values for directing the laminar flow of said liquid radially outwardly from said aerator device through the spacing between said upper float chassis and said sectional diverter.

26. An aerator device as claimed in claim 17, wherein said motor-driven means comprises a motor mounted on the apex of said frusto-conical upper float chassis, and a drive shaft extending downwardly from said motor through said upper float chassis and sectional diverter to connect said motor means with said impeller so as to impart rotational motion to said impeller.

27. An aerator device as claimed in claim 26, wherein said motor means comprises an electrical motor.

28. An aerator device as claimed in claim 26, wherein said motor means is connected with said impeller through an electrical drive.

29. An aerator device as claimed in claim 26, wherein said motor means is connected with said impeller through a reduction drive.

30. An aerator device as claimed in claim 26, wherein said motor means includes a reverse drive for imparting selective counter-rotative motion to said impeller.

31. An aerator device as claimed in claim 26, wherein said drive shaft is supported for rotation by support structure and bearings arranged in the interior of said upper float chassis.

32. An aerator device as claimed in claim 17, wherein an auxiliary floating apparatus is operatively connected with said aerator device to impart supplemental aeration thereto by pumping air and/or water containing micro bubbles into said sectional diverter so as to increase an absorption of oxygen in the liquid being processed through said device.

33. An aerator device as claimed in claim 32, wherein said auxiliary floating apparatus comprises a floating water pump positioned adjacent to said aerator device.

34. An aerator device as claimed in claim 33, wherein said floating water pump includes a venturi producing the micro bubbles being introduced into the liquid flowing through the device.

35. An aerator device as claimed in claim 32, wherein said auxiliary floating apparatus comprises an electric blower pumping air into said device.

36. An aerator device as claimed in claim 17, wherein the constituents of said device are selectively formed from corrosion-resistant metals and molded plastic components.

37. An aerator device as claimed in claim 17, wherein a plurality of said devices are spaced about the surface of a liquid body requiring aeration to be imparted thereto.

* * * * *